(12) United States Patent
Funseth et al.

(10) Patent No.: US 10,994,297 B2
(45) Date of Patent: *May 4, 2021

(54) HYBRID SPRAY APPARATUS

(71) Applicant: Deere & Company, Moline, IL (US)

(72) Inventors: Travis G. Funseth, Ankeny, IA (US);
Stacy L. Bullock, Ankeny, IA (US);
Richard A. Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/172,785

(22) Filed: Oct. 27, 2018

(65) Prior Publication Data

US 2019/0083992 A1    Mar. 21, 2019

Related U.S. Application Data

(63) Continuation of application No. 14/506,057, filed on Oct. 3, 2014, now Pat. No. 10,189,031.

(Continued)

(51) Int. Cl.
*B05B 12/12*     (2006.01)
*B05B 15/658*    (2018.01)
(Continued)

(52) U.S. Cl.
CPC .......... *B05B 12/126* (2013.01); *A01B 79/005* (2013.01); *A01G 25/16* (2013.01); *A01M 7/006* (2013.01); *A01M 7/0089* (2013.01); *B05B 1/083* (2013.01); *B05B 1/169* (2013.01); *B05B 1/1645* (2013.01); *B05B 1/20* (2013.01); *B05B 1/30* (2013.01); *B05B 1/3053* (2013.01); *B05B 12/06* (2013.01); *B05B 15/658* (2018.02)

(58) Field of Classification Search
CPC .. A01M 7/005; A01M 7/0053; A01M 7/0057; A01M 7/0071; A01M 7/0089; A01M 7/0096; A01G 25/16; A01G 25/162; A01G 25/165; A01B 79/005
See application file for complete search history.

(56) References Cited

U.S. PATENT DOCUMENTS

| 3,826,431 A | 7/1974 | Telge |
| 3,866,832 A | 2/1975 | Noguchi |

(Continued)

FOREIGN PATENT DOCUMENTS

| CN | 1499158 A | 5/2004 |
| CN | 103096714 A | 5/2013 |

(Continued)

OTHER PUBLICATIONS

Combo-Rate [online product brochure]. Wilger Industries Ltd. [retrieved on Sep. 25, 2014]. Retrieved from the Internet: <http://www.heartlandag.com/assets/images/parts/wilger/nozzle/pdf_83.pdf>.

(Continued)

*Primary Examiner* — Alex M Valvis

(57) ABSTRACT

Embodiments include individual physical spray nozzles that have passageways inside to combine fluids that flow out of the spray nozzles. The nozzles have at least two valves that are opened and closed in an interleaved manner. The nozzles have multiple outlets. Such nozzles are mounted on a variety of implements including agricultural or industrial spray booms.

3 Claims, 35 Drawing Sheets

Related U.S. Application Data

(60) Provisional application No. 62/050,530, filed on Sep. 15, 2014, provisional application No. 62/015,315, filed on Jun. 20, 2014.

(51) Int. Cl.

| | | |
|---|---|---|
| *A01B 79/00* | (2006.01) | |
| *B05B 1/08* | (2006.01) | |
| *B05B 1/16* | (2006.01) | |
| *B05B 1/20* | (2006.01) | |
| *B05B 1/30* | (2006.01) | |
| *B05B 12/06* | (2006.01) | |
| *A01M 7/00* | (2006.01) | |
| *A01G 25/16* | (2006.01) | |

(56) References Cited

U.S. PATENT DOCUMENTS

| | | |
|---|---|---|
| 3,967,783 A | 7/1976 | Halsted et al. |
| 4,004,733 A | 1/1977 | Law |
| 4,058,260 A | 11/1977 | Lestradet |
| 4,232,707 A * | 11/1980 | Sturman ............. A01G 25/162 137/624.2 |
| 4,649,818 A | 3/1987 | Switall et al. |
| 4,749,126 A | 6/1988 | Kessener et al. |
| 4,907,516 A | 3/1990 | Rogers |
| 5,134,961 A | 8/1992 | Giles et al. |
| 5,267,690 A | 12/1993 | Gazzoni |
| 5,278,423 A | 1/1994 | Wangler et al. |
| 5,296,702 A | 3/1994 | Beck et al. |
| 5,356,077 A | 10/1994 | Shames et al. |
| 5,441,203 A | 8/1995 | Swan et al. |
| 5,475,614 A | 12/1995 | Tofte et al. |
| 5,518,181 A | 5/1996 | Shames et al. |
| 5,539,624 A | 7/1996 | Dougherty |
| 5,653,389 A | 8/1997 | Henderson et al. |
| 5,763,873 A | 6/1998 | Beck et al. |
| 5,793,035 A | 8/1998 | Beck et al. |
| 5,873,647 A | 2/1999 | Kurtz et al. |
| 5,878,960 A | 3/1999 | McInerney, II et al. |
| 5,938,123 A | 8/1999 | Heitzman |
| 6,021,960 A | 2/2000 | Kehat |
| 6,126,088 A * | 10/2000 | Wilger ............. A01M 7/0089 239/159 |
| 6,193,166 B1 | 2/2001 | Miller et al. |
| 6,325,302 B1 | 12/2001 | Guzowski et al. |
| 6,444,090 B1 | 9/2002 | Wolf et al. |
| 6,596,996 B1 | 7/2003 | Stone et al. |
| 6,675,988 B2 | 1/2004 | Cline et al. |
| 6,877,675 B2 | 4/2005 | Benneweis |
| 6,918,757 B2 | 7/2005 | Nakamura et al. |
| 7,066,402 B2 | 6/2006 | Goebel et al. |
| 7,280,047 B2 | 10/2007 | Giles et al. |
| 8,109,448 B2 | 2/2012 | Giles |
| 8,191,795 B2 | 6/2012 | Grimm et al. |
| 8,523,085 B2 | 9/2013 | Grimm et al. |
| 8,636,175 B2 | 1/2014 | Smith |
| 2001/0000611 A1 | 5/2001 | Cline et al. |
| 2005/0000277 A1 | 1/2005 | Giles |
| 2006/0108456 A1 | 5/2006 | Beeren |
| 2006/0255176 A1 | 11/2006 | Yeiser |
| 2006/0273189 A1 | 12/2006 | Grimm et al. |
| 2009/0184182 A1 | 7/2009 | Beeren |
| 2009/0194604 A1 | 8/2009 | Smith |
| 2010/0032492 A1 | 2/2010 | Grimm et al. |
| 2010/0237165 A1 | 9/2010 | Krueger |
| 2012/0168532 A1 | 7/2012 | Giles |
| 2012/0228395 A1 | 9/2012 | Needham et al. |
| 2013/0161419 A1 | 6/2013 | Funseth et al. |
| 2013/0168473 A1 | 7/2013 | Langkamp |
| 2013/0284826 A1 | 10/2013 | Funseth et al. |
| 2013/0284827 A1 | 10/2013 | Humpal et al. |
| 2015/0075655 A1 | 3/2015 | Otarola Olguin et al. |
| 2015/0289443 A1 * | 10/2015 | Garuti ............. B05B 1/1645 239/444 |

FOREIGN PATENT DOCUMENTS

| | | |
|---|---|---|
| CN | 202933798 U | 5/2013 |
| CN | 203164717 U | 8/2013 |
| DE | 19715136 A1 | 10/1998 |
| DE | 102007008787 A1 | 8/2008 |
| DE | 202007018966 U1 | 12/2009 |
| DE | 202011003270 U1 | 4/2011 |
| EP | 0362241 B1 | 6/1994 |
| EP | 2227949 A1 | 9/2010 |
| EP | 1961300 B1 | 3/2011 |
| EP | 1961299 B1 | 6/2011 |
| EP | 2522432 A1 | 11/2012 |
| EP | 2522433 A1 | 11/2012 |
| EP | 2606722 A1 | 6/2013 |
| GB | 2165469 A | 4/1986 |
| GB | 2337984 A | 12/1999 |
| SU | 1544333 A1 | 2/1990 |
| WO | 1998057539 A1 | 12/1998 |
| WO | 2001062399 A1 | 8/2001 |
| WO | 2013109272 A1 | 7/2013 |
| WO | 2014067785 A1 | 5/2014 |

OTHER PUBLICATIONS

Combo-Rate Nozzle Bodies [online product brochure]. Wilger Industries Ltd. [retrieved on Sep. 25, 2014]. Retrieved from the Internet: <http://www.wilger.net/images/downloads/COMBO_RATE_Nozzle_Bodies.pdf>.

Electronic Modules, Electronics Packaging [online]. Interplex Industries, Inc., 2014 [retrieved on Oct. 2, 2014]. Retrieved from the Internet: <http://www.interplex.com/electronic-packaging>.

Grisso, Robert; Alley, Mark; Thomason, Wade; Holshouser, David; Roberson, Gary T. Precision Farming Tools: Variable-Rate Application [online]. College of Agriculture and Life Sciences, Virginia Polytechnic Institute and State University, 2011 [retrieved on Sep. 25, 2014]. Retrieved from the Internet: <http://pubs.ext.vt.edu/442/442-505/442-505_PDF.pdf>.

Hypro Duo React [online]. Pentair LTD, 2014 [retrieved on Sep. 25, 2014]. Retrieved from the Internet: <http://www.hydropumps.com/resources/images/27793.pdf>.

Insert Molding [online]. Interplex Industries, Inc., 2014 [retrieved on Oct. 2, 2014]. Retrieved from the Internet: <http://www.interplex.com/insert-molding>.

Lebeau, Frédéric; Verstraete, Arnaud; Schiffers, Bruno; Destain, Marie-France. Evaluation of Real Time Spray Drift Using RTDrift Gaussian Advection-Diffusion Model. Communications in Agricultural and Applied Biological Sciences, vol. 74 (1), pp. 11-24. Gembloux Agricultural University, Belgium, 2009.

QJ360 Nozzle Body Series for Dry Boom [online]. TeeJet, 2014 [retrieved on Sep. 25, 2014]. Retrieved from Spraying Equipment Supply on the Internet: <http://www.sprayingequipmentsupply.com/teejet/multiple-nozzle-bodies.html>.

Sprayer Nozzles for Agriculture and Turf Spraying Systems [online]. Greenleaf Technologies, 2014 [retrieved on Sep. 25, 2014]. Retrieved from the Internet: <http://www.greenleaftech.com/>.

Brazilian Office Action issued in counterpart application No. 102015014890.9 dated Mar. 25, 2020 (04 pages).

* cited by examiner

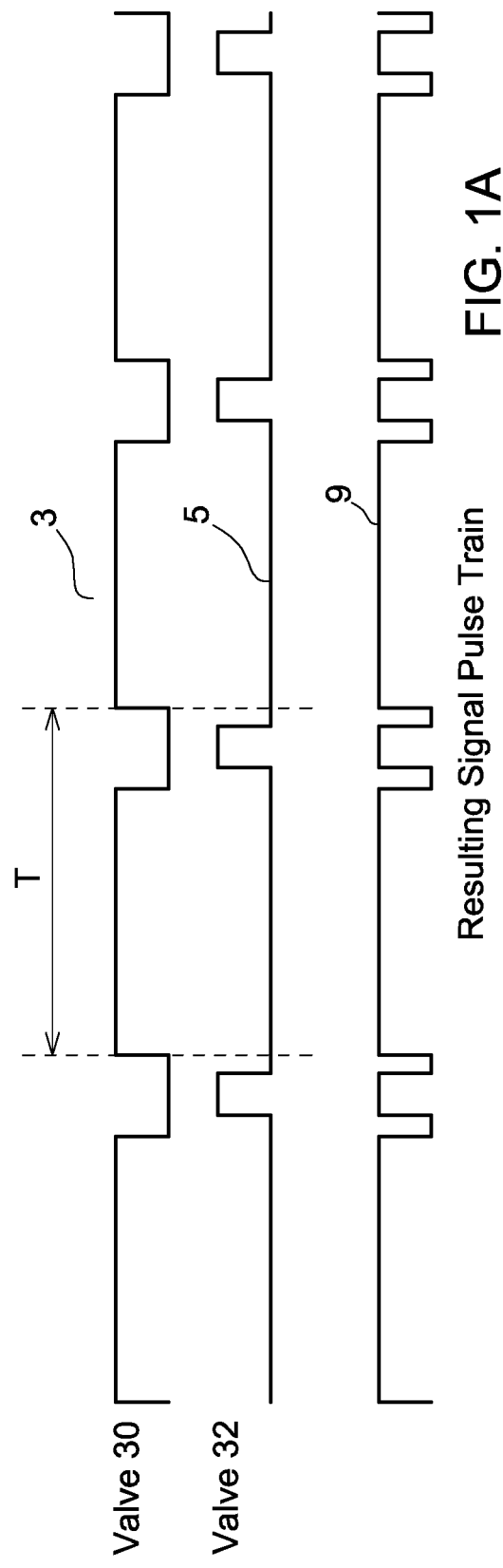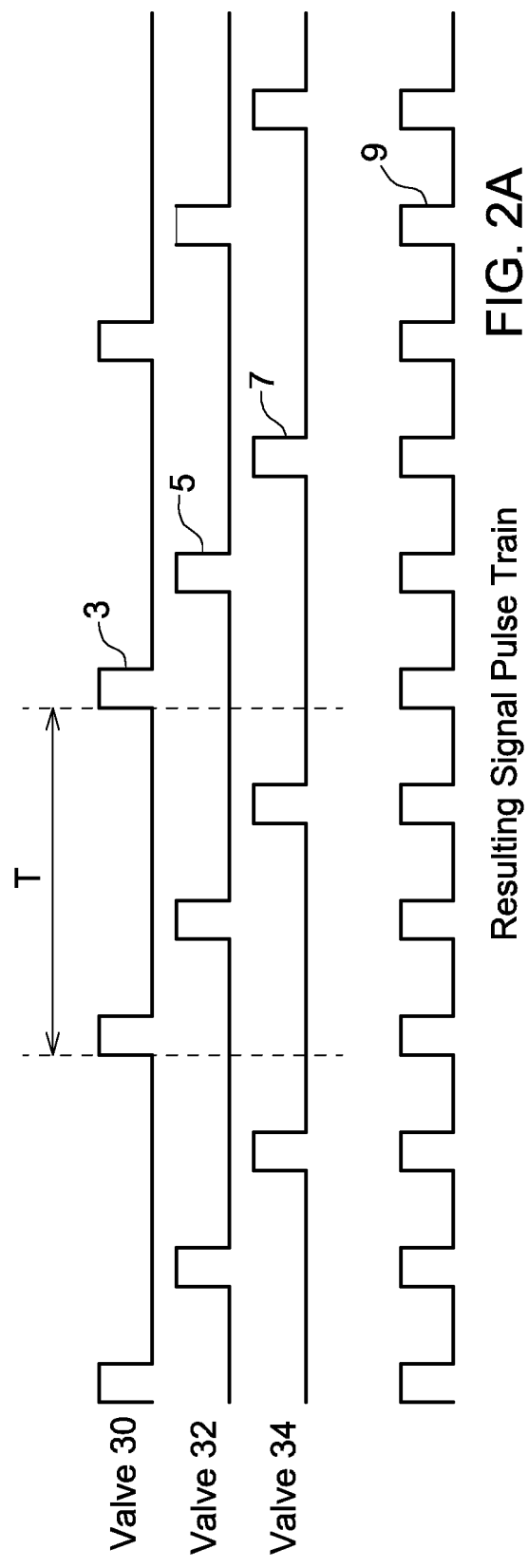

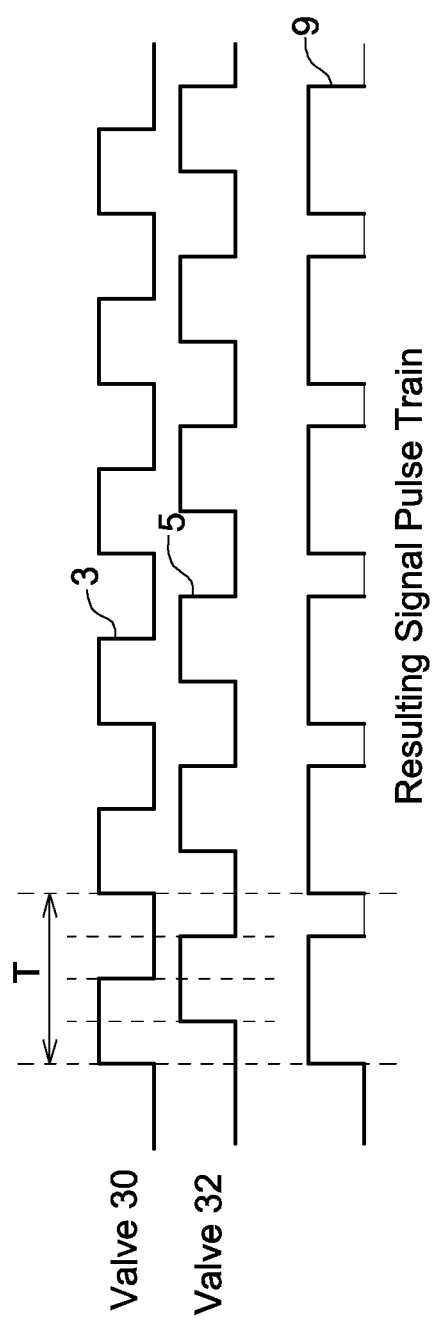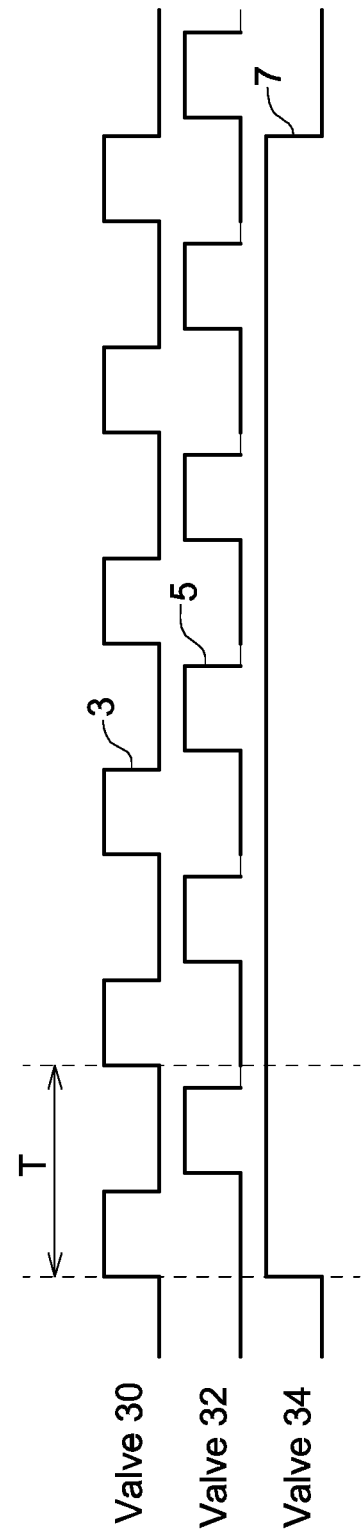

HYBRID SPRAY APPARATUS

RELATED APPLICATIONS

This patent application is a continuation application of U.S. Utility patent application Ser. No. 14/506,057 filed Oct. 3, 2014, titled HYBRID FLOW NOZZLE AND CONTROL SYSTEM, the disclosure of which is incorporated by reference in here in its entirety. U.S. Utility patent application Ser. No. 14/506,057 claims the benefit of U.S. Provisional Patent Application Ser. No. 62/050,530, filed Sep. 15, 2014, and entitled, TIME VARYING CONTROL OF THE OPERATION OF SPRAY SYSTEMS, and also claims the benefit of U.S. Provisional Patent Application Ser. No. 62/015,315, filed Jun. 20, 2014, and entitled, HYBRID FLOW NOZZLE AND CONTROL SYSTEM, the contents of which are incorporated in here in their entirety.

FIELD OF THE DISCLOSURE

This disclosure relates generally to the operation and design of liquid spraying systems having spray nozzles.

BACKGROUND OF THE DISCLOSURE

Over twenty-five years ago, a method of using a pulse signal to actuate a valve was introduced to control the flow rate and fluid pressure of liquids through a spray nozzle. Since then, this technique has remained largely the same or unused because it results in spotty spray patterns due to long dead times. The actuator for the valve cannot respond fast enough even if the frequency of the pulse signal is increased; the fluid leaks, which creates problems such as in an agricultural setting (e.g. crops, plants, trees, vegetables, winery), where sprayers are used to apply prescribed amounts of nutrients, herbicides, insecticides and water. In manufacturing settings, sprayers are used to apply coatings of paint colors and layers of chemicals, and ink on surfaces such as plastic, paper, semiconductors, metals, and so on. In food industries, spray nozzles clean equipment and surfaces.

When pulse signals have been used to control the spray of fluids, the ejection of fluid from conventional single nozzles has been controlled by a single pulse stream. The voltage polarity of the pulse signal is arbitrarily selected so that when the pulse is at a high value, then liquid is dispersed by the nozzle, and when the pulse is at a low value, no liquid is dispersed. The ON state is arbitrarily chosen to refer to when liquid is propelled or ejected, and the OFF state to no liquid. The duration of the ON or OFF pulse can be varied (PWM, pulse width modulated) to generate to vary the flow rate.

SUMMARY OF THE DISCLOSURE

Embodiments include individual physical spray nozzles that have passageways inside or interconnects on the exterior wall of the nozzles to combine fluids. The nozzles have at least two valves that are opened and closed in an interleaved manner. Such nozzles are mounted on a variety of implements including agricultural or industrial spray booms. Other features and embodiments are disclosed in the detailed description, accompanying drawings and claims.

BRIEF DESCRIPTION OF THE DRAWINGS

The details of one or more implementations are set forth in the accompanying example drawings, the description and claims below.

FIG. 1A depicts an example timing diagram to operate the nozzle topology of FIG. 1.
FIG. 2A depicts an example timing diagram to operate the nozzle topology of FIG. 2.
FIG. 3A depicts an example timing diagram to operate the nozzle topology of FIG. 3.
FIG. 5A depicts an example timing diagram to operate nozzle topology of FIG. 5.

DETAILED DESCRIPTION

Figure 1:
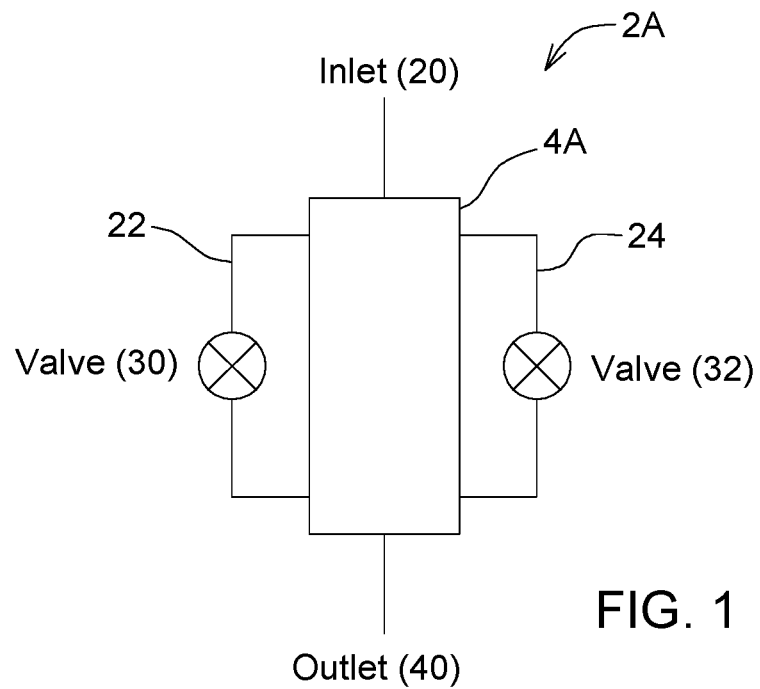
FIG. 1 depicts an example nozzle topology.

Compared to conventional nozzles, the disclosed example spray nozzles accommodate a wider range of operational circumstances (e.g. slower or faster spray, more uniform coverage, different nozzle tips) without having to change the nozzle tips to avoid spotty spray coverage especially in the direction of travel. Further, proper control of the spray characteristics should not only provide coverage but also minimize off-target drift and waste of the spray to adjacent areas.

The example embodiments include locally or remotely controlled (e.g. electronic or wireless) sprayer nozzle bodies that have the flexibility to automatically or manually switch among a multiple number of physical configurations, and yet still disperse droplets or aerosols either continuously or under pulse width modulation (PWM) control. The method of PWM control is interleaved to increase spray speed and spray uniformity. The physical implementation of a nozzle that can properly accommodate interleaved pulsing is difficult. After much experimentation and re-design to avoid interference effects as a result of interleaving the operation of valves and actuators in close proximity within a nozzle body, it was possible to create a hybrid version. One hybrid approach includes operating the nozzle bodies having both multiple heads, and also actuators under PWM control. The disclosed configurations also allow faster changes in the spray rate, more control over the droplet size, prevention of spray drift and skipping (dead time or all-OFF time). The example embodiments also provide better resolution in the incremental change in flow rate, and maintain nearly constant pressure (to better than 95%) to generate a uniform droplet size by varying the flow rates. In some embodiments, even when the duty cycle of the pulse width is below 50%, it is now possible to avoid a situation where none of the nozzle bodies are ON while the sprayer is traveling. Having a multitude of physical configurations on a single nozzle body along with multiple PWM control techniques allow flexibility to cover a wide range of frequencies and operating conditions.

This disclosure first presents the operation and physical configuration of an individual nozzle body or holder using idealized drawings. FIGS. 1-5 show example nozzle topologies 2A-2E for an individual nozzle body that includes at least one fluid inlet, valves to control fluid flow, and at least one fluid outlet. The valves are often located within a nozzle body, or just on the periphery even though the figures depict them as being outside. The outlet(s) are also part of a nozzle body, or just on the periphery; the outlet permits the release of the fluid. The topologies are simplified drawings to aid an understanding of the path of the fluid flow and the operational mechanism. After much testing and design revisions, certain physical implementations were found to work well, as described below.

FIG. 1 depicts an example nozzle topology 2A having a nozzle body 4A with two gates or valves 30 and 32 on paths 22 and 24, respectively. Nozzle body 4A selectively releases fluid and droplets to outlet 40. Nozzle topology 2A receives a liquid input from inlet 20, at least a portion of which flows to outlet 40 as controlled by opening and closing the valves 30 and 32. A fluid can travel either or both of the paths 22 and 24 as controlled by valves 30 and 32, respectively. Outlet 40 attaches to or may physically be covered by at least a turret body, nozzle tip or nozzle cap. Depending on the end-use purpose, nozzle body 4A may be of different shapes, including a hose, a pipe, a sphere, a single nozzle body with holes, or other geometries. FIG. 1 depicts a topology that may constitute an entire nozzle, or it may constitute only a portion of a single nozzle. The configuration of FIG. 1 is integrated into, as part of nozzle body 4E (e.g. left side of nozzle of FIG. 5) so that two valves open and close to transfer fluids from the inlet 20 to a single outlet 40. Moreover, valves 30 and 32 may be identical in design or different.

FIG. 1A depicts an example operation of nozzle topology 2A. Electric pulse signals 3 and 5 are applied to respective actuators (not shown or may be part of the valves) that open and close valves 30 and 32, respectively. For example, the actuator is a plunger-type actuator such as an in-line solenoid valve. Each valve 30 or 32 is opened and closed when an electric current flows through a solenoid (wrapped around a core) that creates an electromagnetic field to propel the core or poppet to move. The motion of the core or poppet pushes or pulls valve 30 or 32 associated with the core or poppet. Alternatively, linear voice coil actuators (e.g. hysteresis free, electromagnetic push-pull actuators), electrical-voltage powered, hydraulic or piston valves are used. Electrical valves include running electric power lines along the length of a spray boom to switch open or close the valve 30 or 32. In this disclosure, the polarity is arbitrarily chosen so that a high value of the signal corresponds to valve open or ON, and a low value of the signal corresponds to valve closed or OFF. In FIG. 1A, during a full period T of operation of nozzle body 4A, pulse signal 3 is ON more than 50% of the duration of period T (over 50% duty cycle), while pulse signal 5 is ON for less than 50% of the duration of period T (less than 50% duty cycle). The duty cycle generally refers to a percentage of time when fluid is released to a target object as compared to a total time of operation. In the example of FIG. 1A, valve 30 is open to let fluid flow for more than 50% of a period T and valve 32 is open to let fluid flow for less than 50% of a period T. The aggregate or resulting signal pulse train depicted in FIG. 1A has a frequency that is two times higher than the frequency of either pulse signal 3 or 5. Fluid droplets are sprayed twice as fast as that of a nozzle body 4A having only one valve operating under a pulse-width modulated signal.

In FIG. 1A, the width of the pulse signals 3 and 5 are fixed; to adjust the flow rate or fluid pressure, the widths are modulated, increased or decreased, depending on the duration and on the polarity (regardless whether open valve corresponds to ON or OFF). Also, for some types of chemicals or paints, a manufacturer specifies the optimal amount of fluid for best coverage. A corresponding fluid flow rate or flow rate range is preselected to achieve the coverage, which often involves modulating the pulse widths to keep within the specified range based on the speed of travel of the nozzle or vehicle to which nozzles are mounted. Further, to create a dithering effect or a more diffuse scattering of the droplets, the duration or frequency of each pulse signal 3 and 5 is varied or modulated rather than be fixed as shown in example FIG. 1A. The volume of fluid transferred or sprayed depends partly on the duty cycle or how long the valves 30 and 32 remain open. The example of FIG. 1A depicts an asymmetric operation and more fluid is released from valve 30 than from valve 32. In this example, pulse signals 3 and 5 are non-overlapping, and they are operating out of phase. If the entire period T is taken to represent 360 degrees, the leading edge of the pulse signals 3 and 5 are approximately 250-300 degrees apart or out of phase. Signals 3 and 5 are generated independently; otherwise, they come from the same parent signal. For instance, if signal 3 is the parent signal, it is replicated, then shifted to generate signal 5; or the leading edge of pulse signal 3 operates on valve 30, and the trailing edge of signal 3 operates on valve 32 (signal 3 is replicated by inversion to present the proper polarity to valve 32). In other examples of operation, the pulse signals 3 and 5 overlap or are more symmetric for more repetitive release of the liquid droplets due to either valve 30 or 32. In yet other examples, the signals 3 and 5 are a sinusoid or ramp rather than a pulse in order to have a more gradual turn on or turn off of the spray droplets or to apply pressure gradually to the valves to open and close them.

Figure 3:
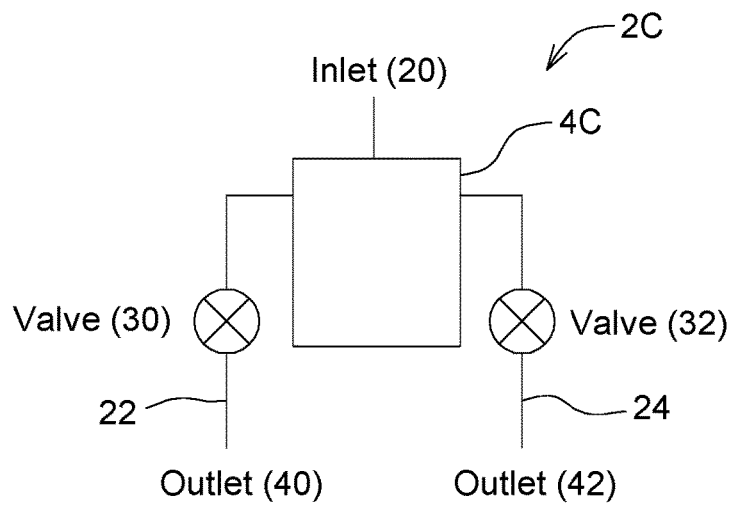
FIG. 3 depicts an example nozzle topology.

In a paint, nutrient, herbicide or pesticide application embodiment where there may be different types of fluids being sprayed, the asymmetric operation of the valves permits achieving different desired ratio of fluids sprayed. When asymmetric fluid spraying is desired, one example possibility is to create a divider in the inlet 20 of nozzle body 4A. The divider (not shown) separates different types of fluids so that they flow into different chambers within nozzle body 4A and then are propelled out of nozzle body 4A, separately, by the action of the respective valves 30 and 32. In other examples, when both fluids are mixed together or sprayed simultaneously, the pulse signals 3 and 5 overlap for at least a part of the duration of period T.

FIG. 2 depicts another example nozzle topology 2B having a single outlet. Nozzle topology 2B has a nozzle body 4B with three valves 30, 32 and 34 on paths 22, 24 and 26, respectively, paths that are drawn in parallel in this example. Nozzle body 4B selectively releases fluid and droplets to outlet 40. Nozzle topology 2B receives a liquid input from inlet 20, at least a portion of which flows to outlet 40 as controlled by opening and closing the valves 30, 32 and 34. Outlet 40 attaches to or may be covered by at least a turret body, nozzle tip or nozzle cap. Depending on the end-use purpose, nozzle body 4B includes a hose, a pipe, a sphere, a conventional single nozzle body with holes, or other geometries.

FIG. 2A depicts an example operation of nozzle topology 2B that particularly shows how the frequency of fluid release is increased. Electric pulse signals 3 and 5 and 7 are applied to respective actuators that open and close valves 30 and 32 and 34, respectively. In FIG. 2A, during a full period T of operation, pulse signals 3, 5 and 7 are each ON less than 50% of the duration of period T (less 50% duty cycle); they are ON about 10-20% of the period T and allow fluid to flow through each valve for less than 10-20% of a period T. The ON phase of the pulse signals 3, 5 and 7 are equal in amplitude and duration. The example three pulse signals 3, 5 and 7 are shifted in phase by 100-120 degrees so that the aggregate or resulting signal pulse train depicted in FIG. 2A has a periodic frequency that is three times higher than the periodic frequency of any of the individual pulse signal 3, 5 or 7. Accordingly, fluid droplets are sprayed three times higher frequency than that of a nozzle body 4B having only one valve operating under a pulse signal 3, 5 or 7 alone. To create a dithering effect or diffuse scattering of the droplets, the duration or frequency of one or all of the pulse signals 3, 5 and 7 can be varied (or modulated) rather than be fixed width and fixed frequency as shown in example FIG. 2A. Among other factors, the volume of fluid transferred or sprayed depends on the duty cycle or how long the valves 30 and 32 and 34 remain open. In the example of FIG. 2A, there is symmetric operation and the amount of fluid from the three valves is released uniformly. Since pulse signals 3, 5 and 7 are non-overlapping, the valves are operating out of phase, and if the entire period is taken to represent 360 degrees, the leading edges of the pulse signals 3, 5 and 7 are approximately 115-125 degrees apart or out of phase from the next one (3 from 5, 5 from 7, 7 from 3). In other examples, the pulse signals 3, 5 and 7 overlap or are asymmetric for more overlapping or diffuse spraying of the liquid droplets, respectively. In yet other examples, the signals 3, 5 and 7 are sinusoidal or ramped rather than a pulse in order to have a more gradual turn on or turn off of the spray droplets.

In the examples of FIG. 1A or 2A, other possible valve operations include at least some of the signals shown in FIG. 5A. For instance, valves 30 and 32 operate as shown in FIG. 2A, and valve 34 is ON continuously or its frequency of motion is lower or higher than either valves 30 or 32. Moreover, the signals include other forms of periodic or semi-periodic signals such as sine waves rather than pulses to create a more gentle turn on or turn off. Such mixture of operation for an individual nozzle body 4B or nozzle topology 2B is described in the aforementioned provisional patent applications when sequencing through multiple nozzle bodies 4B.

FIG. 3 depicts an example nozzle topology 2C having two outlets 40 and 42, at one end of paths 22 and 24, respectively. Nozzle topology 2C has a nozzle body 4C with two valves 30 and 32 on paths 22 and 24, respectively, paths that are drawn in parallel in this example. Valve 30 corresponds to outlet 40 and valve 32 corresponds to outlet 42. Nozzle body 4C selectively releases fluid and droplets to either or both outlets 40 or 42. Nozzle topology 2C receives a liquid input from inlet 20, at least a portion of which flows to either or both outlets 40 and 42 as controlled by opening and closing the valves 30 and 32, respectively. Each outlet 40 or 42 attaches to or may be covered by at least a turret body, nozzle tip or nozzle cap. Depending on the end-use purpose, nozzle body 4C includes a hose, a pipe, a sphere, a conventional single nozzle body with holes, or other geometries.

FIG. 3A depicts an example operation of nozzle topology 2C. For instance, the operations include electric pulse signals 3 and 5 being applied to respective actuators that open and close valves 30 and 32, respectively, to propel liquid out of outlets 40 and 42, respectively. Pulse signals 3 and 5 overlap partially within period T. During a full period T of operation of nozzle body 4C, pulse signals 3 and 5 are ON 50% of the duration of period T (50% duty cycle). The phases of pulse signals 3 and 5 overlap each other by about 90 degrees. Fluid is transferred at the same rate from inlet 20 to either outlet 40 and 42, and the fluid droplets are released at the same rate out of outlets 40 and 42, although the release from one lags the other. If the same fluid pressure is maintained as for continuous spraying, the overall volume of fluid sprayed under the control of both valves 30 and 32 as depicted in FIG. 3A would be about 25% less than from continuous spraying, but the spray pattern is more tunable and adjustable to suit an operator's needs.

If the outlets 40 and 42 are pointed towards different spray directions, their associated spray release have the same overlap as operating pulse signals 3 and 5 during a period T. The outlets 40 and 42 release spray independently. During the non-overlapping time durations of signals 3 and 5, only one of the outlets 40 or 42 releases droplets. In the example of FIG. 3A, the leading edge of pulse signals 3 and 5 are shifted by a constant phase within each period T. Alternatively, the width of pulse signals 3 and 5 are varied so that they differ in phase, or in the duration of the ON mode, or in frequency in order to achieve different spray coverage. In another alternative, if the outlets 40 and 42 are pointed toward the same spray direction, the aggregated pulse signal is indicative of the total amount of fluid released to the target area. The aggregate or resulting signal pulse train depicted in FIG. 3A has a pulse frequency that is the same as the frequency of either pulse signal 3 or 5, but the resulting signal has a pulse width that is wider than either pulse signal 3 or 5, alone, so that fluid is released effectively for a longer duration towards the target spray area. In yet other alternatives, one outlet 40 is spraying continuously, while outlet 42 is operated under a pulsed mode PWM or under a frequency modulated control (FM); or both outlets are spraying continuously. In a paint, nutrient, herbicide or pesticide application embodiment where there may be different types of fluids being sprayed, an asymmetric operation of the valves 30 and 32 permits achieving different desired ratio of fluids released from respective outlets 40 and 42. When asymmetric fluid spraying is desired, one example approach is to create a divider in the inlet 20 of nozzle body 4C. The divider (not shown) separates different types of fluids so that they flow into different chambers within nozzle body 4C and then are propelled out of nozzle outlets 40 and 42, separately, by the action of the respective valves 30 and 32. In other examples, when both fluids are mixed together or sprayed simultaneously, the pulse signals 3 and 5 overlap for at least a part of the duration of period T.

In addition to adjusting the time duration or frequency of operation of the valves 30 and 32, the location of the outlets on nozzle body 4C affects the spray pattern. For example, outlets 40 and 42 are pointed in different directions to generate a wider or more diffuse spray pattern; or outlets 40 and 42 are located parallel to each other but offset by a small distance (e.g. less than three inches) and their spray pattern overlaps and covers a more focused target region. Further, to create a dithering effect or a more diffuse scattering of the droplets, the time duration or frequency of each pulse signal 3 and 5 can be varied (or modulated) rather than be fixed as shown in example FIG. 3A. Another possibility is to dither the pulse signals 3 or 5 by adding a randomly generated signal to the pulse signals 3 or 5 in the time domain.

Figure 4:
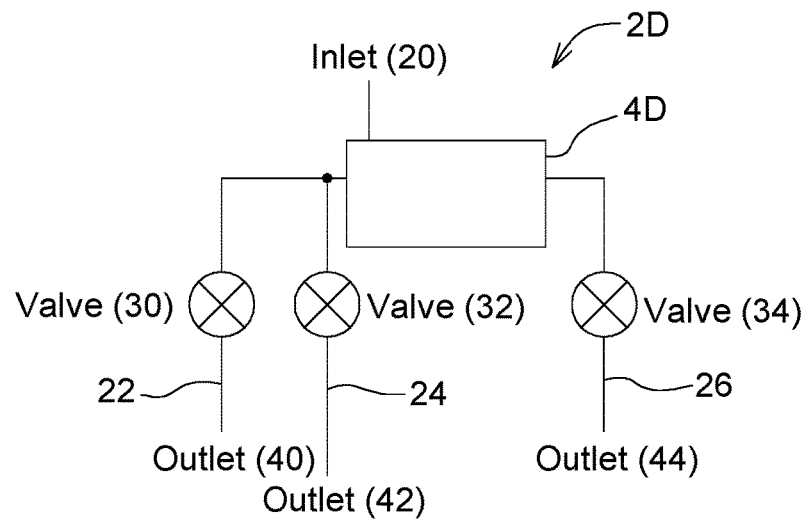
FIG. 4 depicts an example nozzle topology.

FIG. 4 depicts an example nozzle topology 2D having three outlets 40, 42 and 44, at one end of paths 22, 24 and 26, respectively. Nozzle topology 2D has a nozzle body 4D with three valves 30, 32 and 34 along paths 22, 24 and 26, respectively, paths that are drawn in parallel in this example. Nozzle body 4D selectively releases fluid and droplets to at least one of the outlets 40, 42 or 44. Nozzle 2D topology receives a liquid input from inlet 20, at least a portion of which flows to at least one of outlets 40, 42 or 44 as controlled by opening and closing the valves 30, 32 or 34, respectively. Each outlet 40, 42 or 44 attaches to or may be covered by at least a turret body, nozzle tip or nozzle cap. Depending on the end-use purpose, nozzle body 4D includes a hose, a pipe, a sphere, a conventional single nozzle body with holes, or other geometries.

The operation of nozzle topology 2D having three independent outlets 40, 42, 44 includes at least all of the operational possibilities described for nozzle topology 2C having two independent outlets 40 and 42. The third outlet 44 is optionally operating continuously or under pulsed mode or a combination of continuous and pulsed mode.

Figure 5:
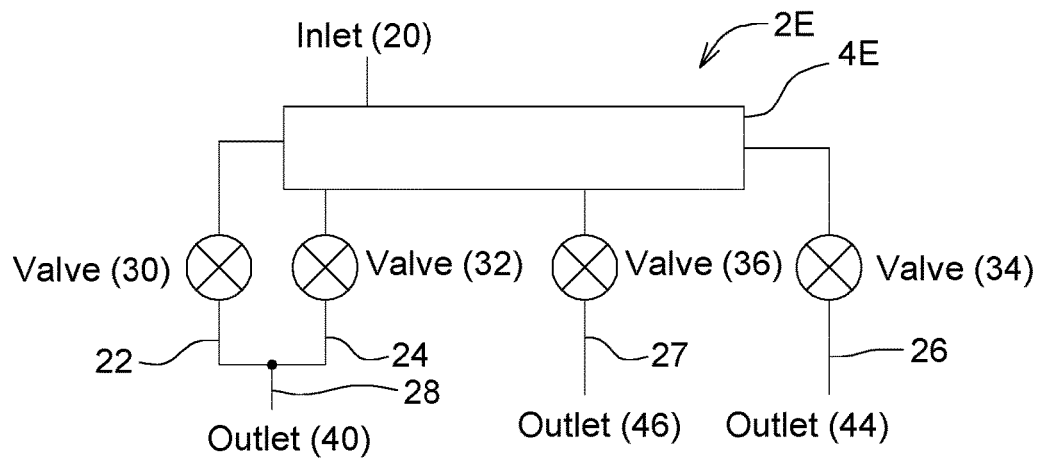
FIG. 5 depicts an example nozzle topology.

FIG. 5 depicts a mixed-topology of an example nozzle topology 2E having two outlets 40 and 44, at one end of paths 28 and 26, respectively. Nozzle 2E has a nozzle body 4E with three valves 30, 32, and 34 along paths 22, 24 and 26, respectively, paths that are drawn in parallel in this example. In the arrangement of FIG. 5, paths 22 and 24 merge into path 28 before reaching outlet 40 ("combined" outlet 40). Nozzle body 4E optionally has a third outlet 46 (associated with valve 36). Nozzle body 4E releases fluid and droplets to at least one of the three outlets 40, 44 or 46 depending on which valves are open and on the internal configuration of body 4E. Nozzle topology 2E receives a liquid input from inlet 20, at least a portion of which flows to at least one of outlets 40 or 44 or 46 as controlled by opening and closing the valves (30 or 32) or 34 or 36, respectively. The parentheses around "30 and 32" are in reference to fluid at the outlet 40 being dependent on the action of both valves 30 and 32. Each outlet 40 or 44 or 46 attaches to or may be covered by at least a turret body, nozzle tip or nozzle cap. Depending on the end-use purpose, nozzle body 4E includes a hose, a pipe, a sphere, a conventional single nozzle body with holes, or other geometries.

Figure 6:
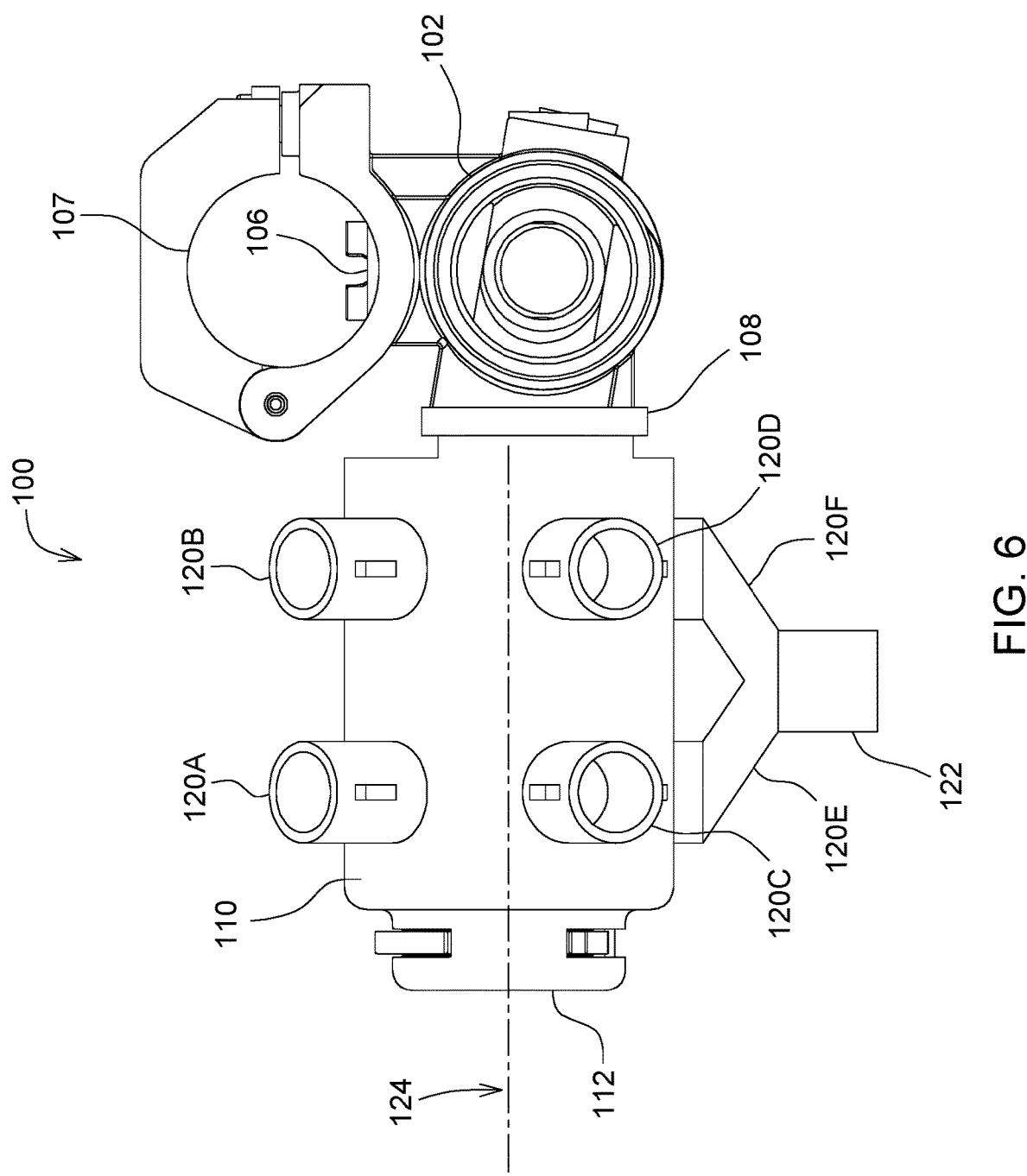
FIG. 6 depicts an example nozzle.

FIG. 5A depicts an example operation of nozzle topology 2E. The combined outlet 40 nozzle body 4E includes electric pulse signals 3 and 5 being applied to respective actuators that open and close valves 30 and 32, respectively, to propel liquid out of outlet 40. In this example, outlet 44 or 46 or both are releasing fluid continuously or nearly continuously according to electric pulse signal 7. Such a nozzle body 4E provides faster pulse mode operation and extra spray coverage, especially if outlets 40 and 44 (or 46) are positioned to point in the same spray target area. Alternatively, if the spray trajectories of the outlets (e.g. 40) follow one another in the direction of travel of the spray vehicle, this provides more complete spray coverage in the path traveled. In another embodiment, both the combined outlet 40 and the individual outlets 44 or 46 are all operating in pulse mode, whether in phase or out of phase. The spray coverage varies depending on the pointing direction of the outlets, the type of tip on the outlets or filters near the nozzle tip or within the nozzle body 4E, or the shape of the orifices, and so on.

Different scenarios determine whether one or additional nozzle outlets are releasing fluid together in FIGS. 3-5. For instance, if the pressure and fluid flow is above a preset threshold as measured by a pressure or flowmeter, an additional outlet releases fluid and all the outlets are operating at a more tolerant fluid pressure (e.g. for the delivery of a particular amount of chemical specified to supply sufficient nutrients or herbicide or paint coverage). To change pressure or flow rate, the pulse width of the applied electric signals is varied so that more or less liquid is released. Alternatively, the frequency of the pulses is varied. Another scenario where additional nozzle outlets release fluid involves the use of air induction nozzles together with continuous fluid release rather than pulse width modulated signals, so that more than one outlet is in operation to accommodate different types of nozzles. Yet other scenarios include whether the vehicle is making a turn or re-spraying an area for missed spray spots, which would involve different nozzles to be utilized depending on the desired pattern. For instance, on a turn, the fluid release frequency is correspondingly reduced if the vehicle slows down.

In the configurations of FIGS. 1-5, only one fluid inlet 20 is shown and the fluid is distributed among the different outlets depending on the valve positions and inner configuration of the nozzle body. In another configuration of the topologies, rather than one fluid inlet 20, there are two or more fluid inlets. For instance, in FIGS. 1-5, inlet 20 channels fluid to outlet 40, while another inlet (not shown) channels fluids to output 44 or 46. Such additional inlets permit, for example, mixing different chemicals, maintaining different or similar fluid pressure, separate control of droplet sizes and so on. In one example, two inlets are positioned offset to each other so that different fluid pipes or conduits feed the two inlets.

The aforementioned example topologies are implemented in physical nozzles such as the one shown in FIG. 6. Example nozzle 100 is used, for example, in an agricultural environment for crops, plants and trees, or in industrial applications for coating. Nozzle 100 has a nozzle tube 102 (shown on its end) surrounding or is concentric about a hole or opening for valve 104A (not shown, protruding out of the plane of the paper). Another valve 104B is located behind valve 104A that is not shown in FIG. 6. Also not shown in FIG. 6 are the devices located outside of the nozzle tube 102 for opening and closing the valves 104A and 104B. For example, the devices include an electromagnetic spring coil, magnetic valves, pneumatic lever, bellows, actuator, and so on, to move valves 104A and 104B. The other end of the opening/closing motion devices includes electrical wires or wireless circuits (with a receiver and power source (e.g. solar or battery)) to communicate with sprayer controller circuits or central controller consoles that determine when to open and close the valves 104A and 104B. An example size for nozzle 100 is 110-120 mm from the bottom of outlet 122 to the top of the ring 107, and about 135 mm from one end of the nozzle tube 102 to its other end (including the magnetic valves). Nozzle 100 is about 130-160 mm from the endcap 112 to the outer perimeter of the ring 107.

Figure 35:
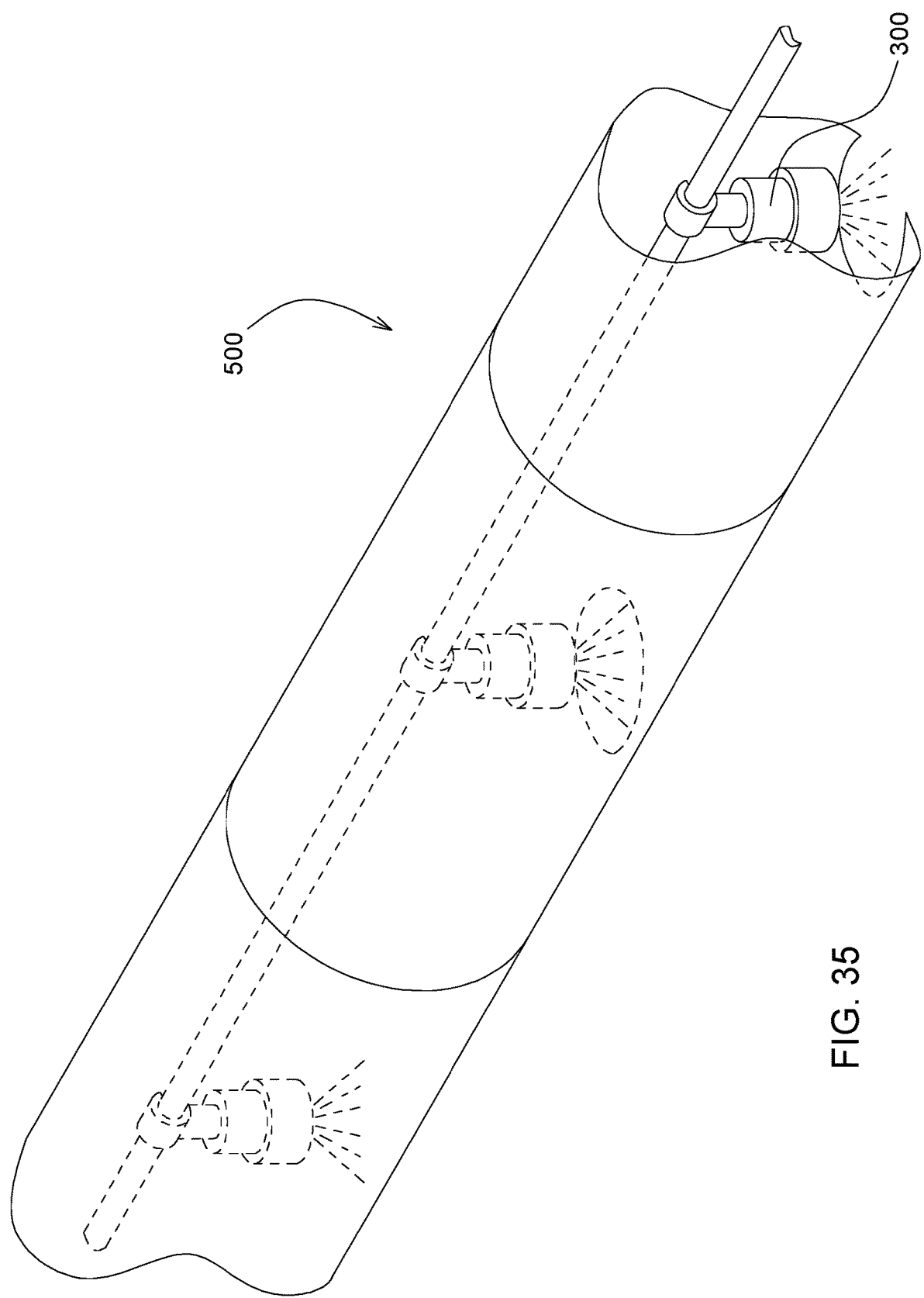
FIG. 35 depicts example nozzles mounted on an example sprayer boom or arm.

Nozzle tube 102 has an inlet 106 for fluids that is located above nozzle tube 102 in this example. Inlet 106 is located between valve 104A and valve 104B, either symmetrically (centered) or asymmetrically (off centered). If the fluid enters the system from another direction, inlet 106 is oriented in that direction instead. In other embodiments, there are also extra inlets for alternative liquids, for example for spraying different types of plants co-existing in the same field, or for spraying different coatings on a material. Nozzle tube 102 is mounted to a fluid distribution pipe (not shown) having holes positioned along the pipe that mate with the inlet 106 (i.e. so that fluid distribution pipe injects liquids into the inlet 106). For instance, one way to mount the nozzle tube 102 to a fluid distribution system (e.g. pipe) is by inserting the pipe through the circular ring 107 above the inlet 106. Fasteners (not shown) connect the ring 107 to the distribution pipe. The fluid distribution pipe or spray line or "plumbing" inserts into the ring 107. Depending on the span length of the fluid distribution pipe, one to a hundred nozzles 100 hang off and are distributed along the length of the fluid distribution pipe (e.g. FIG. 35).

Nozzle tube 102 also has a nozzle tube output 108 that is positioned approximately 90 degrees counterclockwise from inlet 106, as shown in the example of FIG. 6. The radial orientation of nozzle tube output 108 around the cylindrical surface of nozzle tube 102 may be other than 90 degrees, but instead depend on the application (e.g. location of the target or type of turret), and the location generally does not coincide with or affect the location of inlet 106. At the nozzle tube output 108, nozzle tube 102 connects to an example second nozzle body or segment such as a turret 110 that is akin to a versatile, large nozzle tip. Turret 110 is tubular in this example, but may also be spherical, cubical or some other shape. In the example of FIG. 6, turret 110 has an end cap 112 that in other embodiments includes a fluid outlet instead. Turret 110 is rotatable around its longitudinal axis 124, which permits the selection of different nozzle topologies 2A-2E. The selection is performed either manually or automatically through electronic or remote control. For example, when the turret 110 is mounted on a spindle or rotatable ledge, it easily rotates and locks into a new position via electronic control.

In FIG. 6, turret 110 has multiple types of outputs, individual outlets 120A, 120B, 120C, 120D, 120E, and 120F. In FIG. 6, end-point nozzle tips (not shown) are attached to or caps the outlets 120A-120F; the opening pattern of such end nozzle tips determine or affect the spray pattern, flow rate and droplet size. Although drawn as having the same size in FIG. 6, in other embodiments, outlets 120A-120F are different sizes in order to provide a different spray pattern or to source different amounts of spray; alternatively, the outlets have different strainers inside so as to provide different droplet sizes if the strainers have an irregular or particular hole pattern to serve both as a sieve for debris to avoid plug-ups and as a mechanism to shape the droplets. Outlets 120E and 120F joins together into a combined outlet 122. In other geometries, turret 110 combines or separates fluid flowing through a large single outlet hole that opens to two passageways. The individual outlets 120A-120F are grouped together in pairs or aligned in a row, with each outlet 120A-120F being perpendicular to a center axis 124 of the cylindrical turret 110. Alternatively, if nozzle 100 is an implementation of nozzle topology 2D or 2E, there are additional individual outlets 120A-120F grouped together. Outlets 120A-120F are grouped together in alternative patterns other than as side-by-side pairs, depending on the end-use application and/or on a desired spray pattern (e.g. location of the crops or other targets). However, when outlets 120A-120F are grouped in pairs, the nozzle 100 configuration readily functions as any one or a combination of the nozzle topologies 2C, 2A, 2B, or 2E if the fluid passage way inside the turret 110 is correspondingly appropriately configured.

Figure 7:
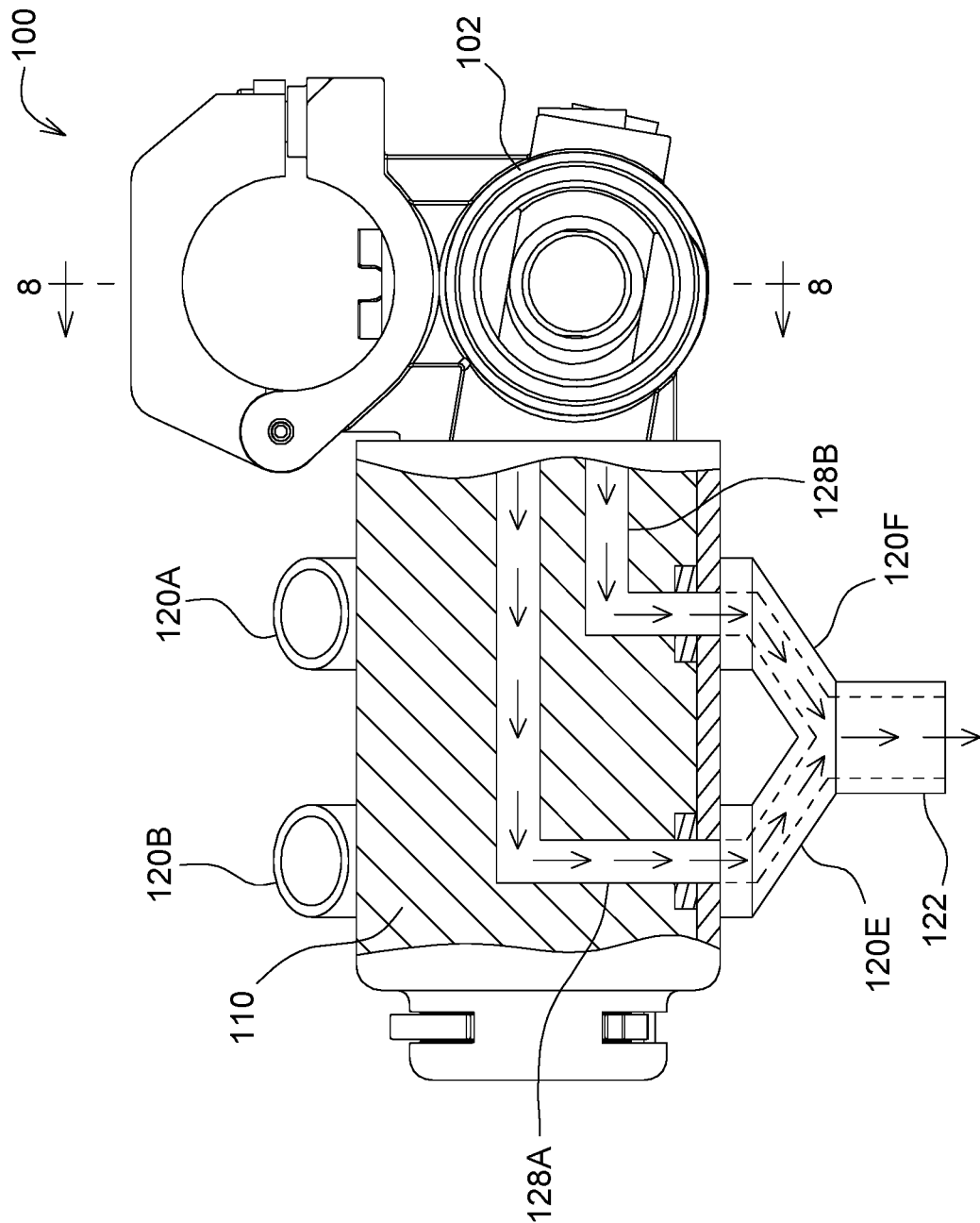
FIG. 7 depicts a cross sectional view of an example turret of a nozzle.

FIG. 7 depicts a cross section of nozzle 100 of FIG. 6, exposing a side view of an example turret 110 having several passageways such as ducts 128A and 128B that transport liquids or mists. Individual ducts 128A and 128B go from the nozzle tube 102 to the outlets 120E and 120F, respectively. Liquids or mists separately traverse the ducts 128A and 128B. In another embodiment, the ducts 128A and 128B join together or intersect within the turret 110 rather than as drawn in FIG. 7, where the outlets 120E and 120F join together into combined outlet 122. By not joining ducts 128A and 128B together within the turret 110, the turret 110 instead can be rotated into another nozzle topology such as 2C where the outlets 120E and 120F are completely separate.

Figure 8:
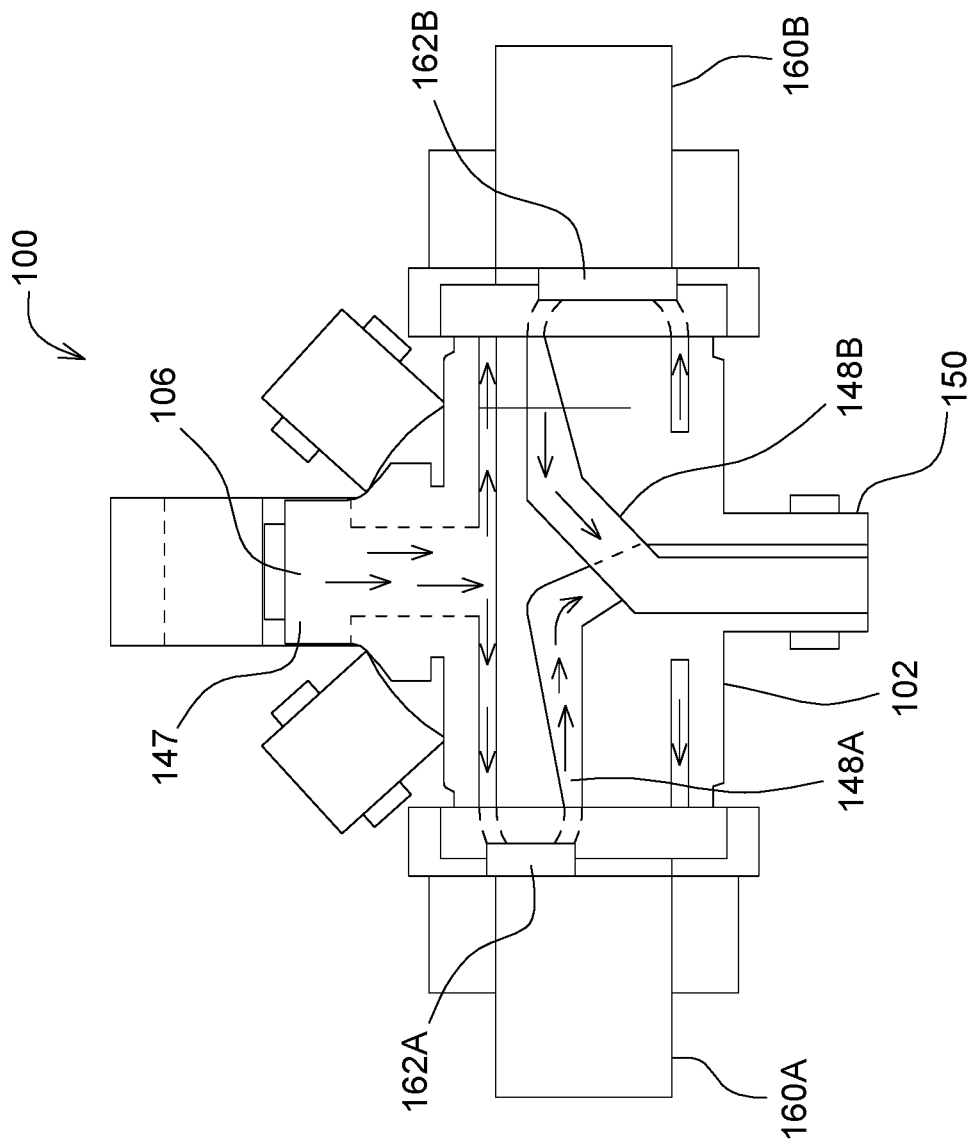
FIG. 8 depicts a cross sectional view of a side of an example nozzle tube.

In FIG. 7, duct 128A connects the nozzle tube 102 to outlet 120E of turret 110; duct 128B connects nozzle tube 102 to outlet 120F. As shown, each duct 128A and 128B is "L" shaped, having a right angle bend. In other embodiments, the tubular ducts have larger or smaller cross-sectional radii tailored to the particular types of liquids. For example, viscous fluids benefit from larger diameter tubes. Also, in yet other embodiments, the right angles are instead beveled or rounded to avoid friction and current crowding at a sharp 90 degree turn. Also depending on the relative sizes of the inlet versus outlet openings or on other factors such as in-rush flow, the diameter of the tubular ducts 128A or 128B varies along the length of the turret 110 (e.g. like in FIG. 8 for the tube body 102). Alternatively, rather than ducts, there are concentric or off-centered cylinders layered such that liquid may travel between the walls of two adjacent cylinders (see FIG. 8B, showing a conceptual end view section of a turret 110 or a tube body 102), where there are ducts from one wall to an outlet. In FIG. 7, ducts 128A and 128B may be offset from a longitudinal axis of turret 110 in order to accommodate other ducts (not shown). Other embodiments also includes a duct connecting between nozzle tube 102 to an output at the end of turret 110 (see FIG. 11); this permits additional release of spray such as to alter the pattern or to overcome possible misses or skips in the spray pattern ejected from outlet 120E. Although not shown, some of the ducts have endpoint tips, strainers or filters so as to control the spray pattern, create finer or coarser spray droplets or mists. Alternatively, some of the ducts are flared or tapered so that the output opening is larger than the input opening. In yet another embodiment, duct 128A has a fork or branch so as to eject fluid simultaneously to both outlet 120E and to another outlet or to the end of turret 110.

Figure 9:
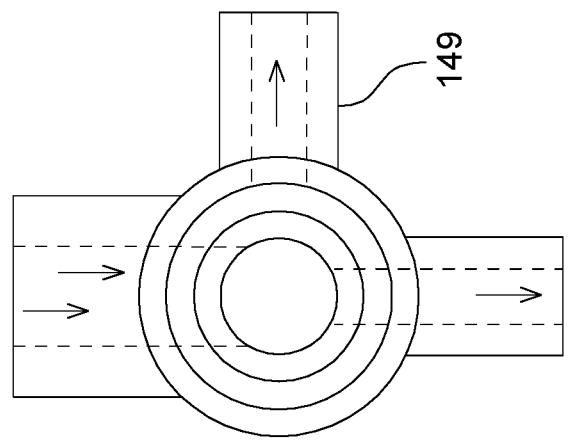
FIG. 9 depicts an end view section of an example nozzle tube or an example turret.

FIG. 8 depicts an example nozzle 100 of FIG. 6, exposing an idealized cross-sectional side view of nozzle tube 102 having a vertical fluid conduit 147 that couples to passageway of tube ducts 148A and 148B that transport liquids. Alternatively, rather than tubular ducts, 148A and 148B are concentric or off-centered cylinders layered such that liquid may travel between walls of two adjacent cylinders (FIG. 9), and there are tube outlets 149 from one of the walls to a corresponding duct 128A or 128B in the turret 110. FIG. 8 depicts example flow patterns showing liquid coming in from inlet 106, traveling down vertical fluid conduit 147, and traveling through tube ducts 148A or 148B or between cylindrical walls. After leaving fluid conduit 147, the liquid travels to the left and to the right in the particular instance of FIG. 8. The liquid has a return path down to turret ducts 148A or 148B, unless its corresponding valve 160A or 160B is closed and blocks the path of fluid flow. For example, plugs 162A and 162B that correspond to valves 160A and 160B, respectively, are actuated by any number or combination of ways to prevent or allow fluid to flow from (spray line) inlet 106 to the turret 110. Actuation mechanisms include local or remote control that allow either continuous or modulated spray flow. For electro-mechanical modulated (e.g. PWM) fluid flow, plugs 162A and 162B are connected to solenoids having open and close positions corresponding to the motion of a steel or iron piece that moves when an inductive coil surrounding the piece has current flowing in one direction or the opposite direction in the coil. The motion of the steel or iron piece provides a mechanical force to open and close plugs 162A or 162B. A controller circuit that is local to the nozzle or to the spray line or located remotely (e.g. cab of a sprayer or tractor or at a farmhouse) executes algorithms to open and close the plugs 162A and 162B to operate and eject a particular spray pattern. Alternative actuation mechanisms include hydraulically or pneumatically actuated valves. Other confined and cost effective actuation mechanisms have a speed of operation up to 60 Hertz.

Figure 10:
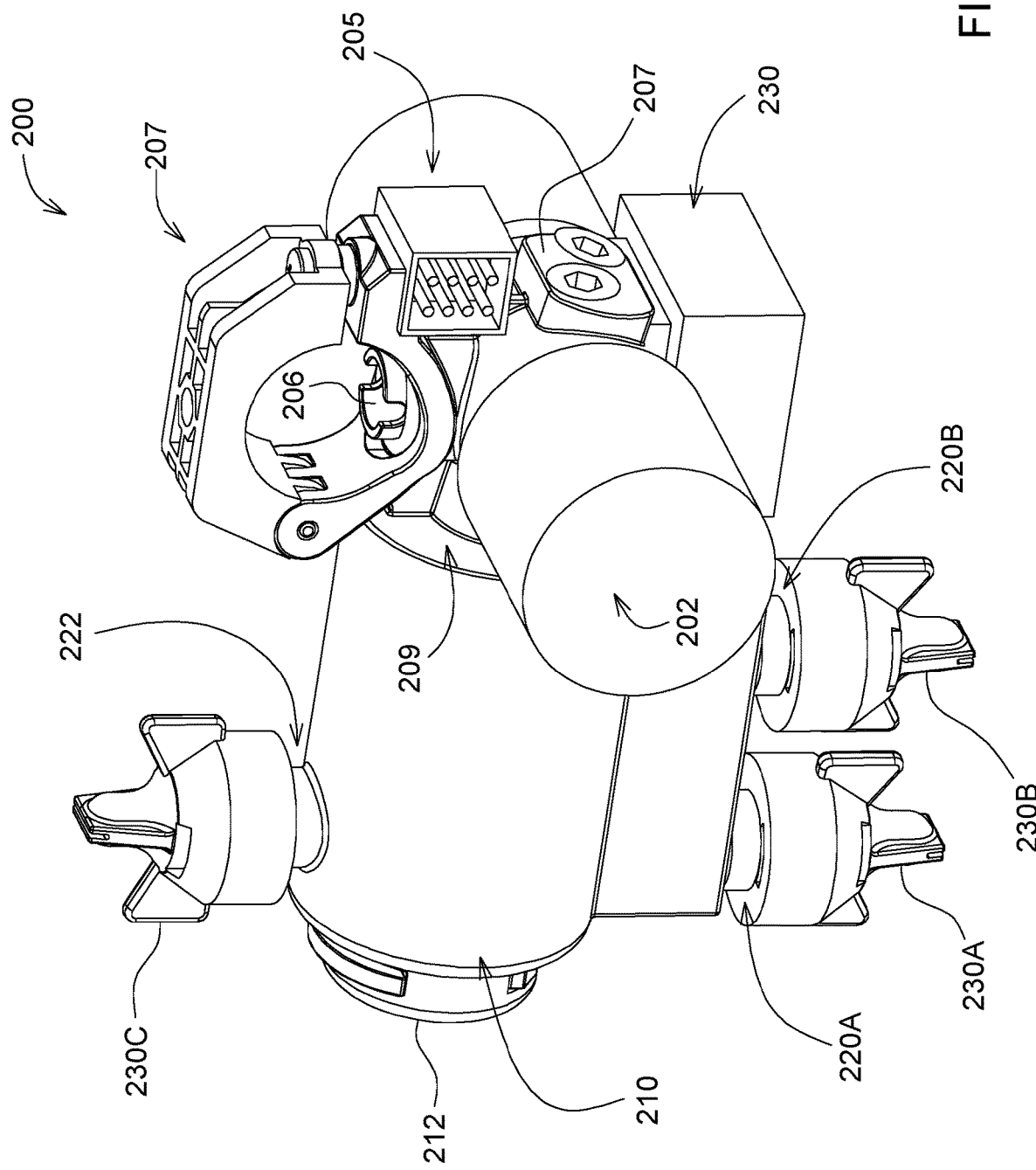
FIG. 10 depicts a drawing of another example nozzle.

FIG. 10 depicts a perspective view of an example nozzle 200 having a nozzle tube 202 that receives liquids at inlet 206 at the top of nozzle tube 202. Nozzle 200 is mounted on a liquid distribution pipe (spray line, not shown in FIG. 10) that is inserted in the mount ring 207 above the inlet 206. The liquid distribution pipe has holes that mate to an orifice or opening of nozzles 200 (at inlet 206) in order to release fluids into inlet 206. Some embodiments include a valve between the liquid distribution pipe and the inlet 206; alternatively, inlet 206 itself includes a valve to prevent or allow fluid flow into nozzle 200. Fluid selectively travels from nozzle tube 202 to turret 210 that is connected to an output of nozzle tube 202.

Example turret 210 has individual outlets 220A and 220B shown at the bottom of turret 210. Outlets 220A and 220B are covered by nozzle tips 230A and 230B, respectively. Turret 210 also has a combined outlet 222 (combination type outlet) that is covered by nozzle tip 230C. The nozzle tips 230A, 230B, 230C are depicted as being the same in FIG. 10, but in other embodiments, they are different in order to accommodate different types of fluids in each nozzle tip or different amounts of fluids (e.g. flow rates) in each nozzle tip, different spray quality parameters (e.g. mist or large droplets) or different spray patterns and orientations. In some embodiments, nozzle tips 230A, 230B, 230C include an orifice and there is a wall that divides the orifice into two or more compartments such that different liquid substances are ejected from the different compartments when there are multiple fluid distribution pipes to inject different fluids into a nozzle 200. Alternatively, even in embodiments where the nozzle 200 is similar in appearance on the outside, there are different spray endpoint tips or filters or walls on the inside to direct the droplets to different directions or to control the size of the droplets. As another alternative, the nozzle tips 230A-230C also have internal closing disks (OFF positions) to alter the spray pattern or so that no liquid is ejected. Turret 210 has an end cap 212 that in other embodiments includes additional nozzle tips to spray fluids or to add to the spray pattern. Turret 210 includes either manual or remote control (e.g. automatically rotated) so that fluid can spray from one or any combination of the nozzle tips 230A, 230B or 230C. Between the turret 210 and nozzle tube 202 is a rotatable platform to which the turret 210 is attached so that turret 210 can rotate when, for example, a stepper motor is powered to move clockwise or counterclockwise. Rotatable actuators (not shown) include electric stepper motors, servo motors, rotary solenoids or piezo based rotators. In some embodiments where the actuators are wirelessly controlled, the actuators are also powered wirelessly. For example, local solar cells are in contact with the actuators in the nozzles 100 in order power the motor when a signal is wirelessly sent to rotate turret 210. In some embodiments, the nozzle tips 230A-230C have closable strainers or closing disks (OFF positions) so that no liquid is ejected.

In FIG. 10, nozzle 200 has example local electronic circuits to control the fluid flow. Nozzle 200 has a turret 210 connected to nozzle tube 202 that surrounds or is concentric or symmetric about a hole or opening for fluid inlet 206. To communicate with the nozzle 200, electric wires that carry CAN-bus communication signals from a centralized boom or nozzle controller (e.g. in the cab) are connected to the electronic leads or pins in receiver housing 205. Signal traces are printed on small circuit boards mounted inside connector 207 or embedded in a wall of the nozzle body (e.g. 4A) or nozzle tube 202. Plastic and/or epoxy or other insulating material covers the traces to prevent corrosion or electrical shorts. The traces or leads run or connect into circuit box 230 that contains electronic circuits including clock circuits (to control timing), comparators to check if a fluid pressure is over a threshold, buffers to generate pulse signals to the valves, memory circuits to hold look-up tables, logic unit to compute or select the nozzle outlets 220A, 220B or 222, phase lock loop circuits that provide feedback to control and synchronize the performance of different nozzles 200 or nozzle outlets 220A, 220B or 222, electronic noise filters, and so on. In some embodiments, circuit box 230 also contains sensors to detect flow rate, temperature, evidence of plug detection, or other problems. When the sensors detect an over-threshold condition, the circuits in circuit box 230 operate to stop or revise the release of fluid by adjusting the pulse width of PWM signals to the valves. In some embodiments, monitoring sensors are also implemented in the circuit box 230 to provide performance feedback to an end-user, which requires digitizing the analog signals, and transmitting the information to a central controller or computer or cloud data storage device. An alternative to CAN-bus or wired signals is wireless operation using Bluetooth, WIFI or some other wireless protocol. In this alternative, there is no receiver housing 205 or connector 207, but the circuit box 230 contains more circuitry for amplifying and filtering (or removing jitter on) signals and transmitting and receiving wireless signals to and from a remote end-user or controller device. In one embodiment, there is also nozzle selection circuitry that rotates a stepper motor in circuit box 230. The motor rotates a disk 209 on which turret 210 is mounted. Based on a remote or local command signal, disk 209 rotates one or more of the nozzle outlets 220A, 220B or 222 to point to the targeted spray location.

Figure 11:
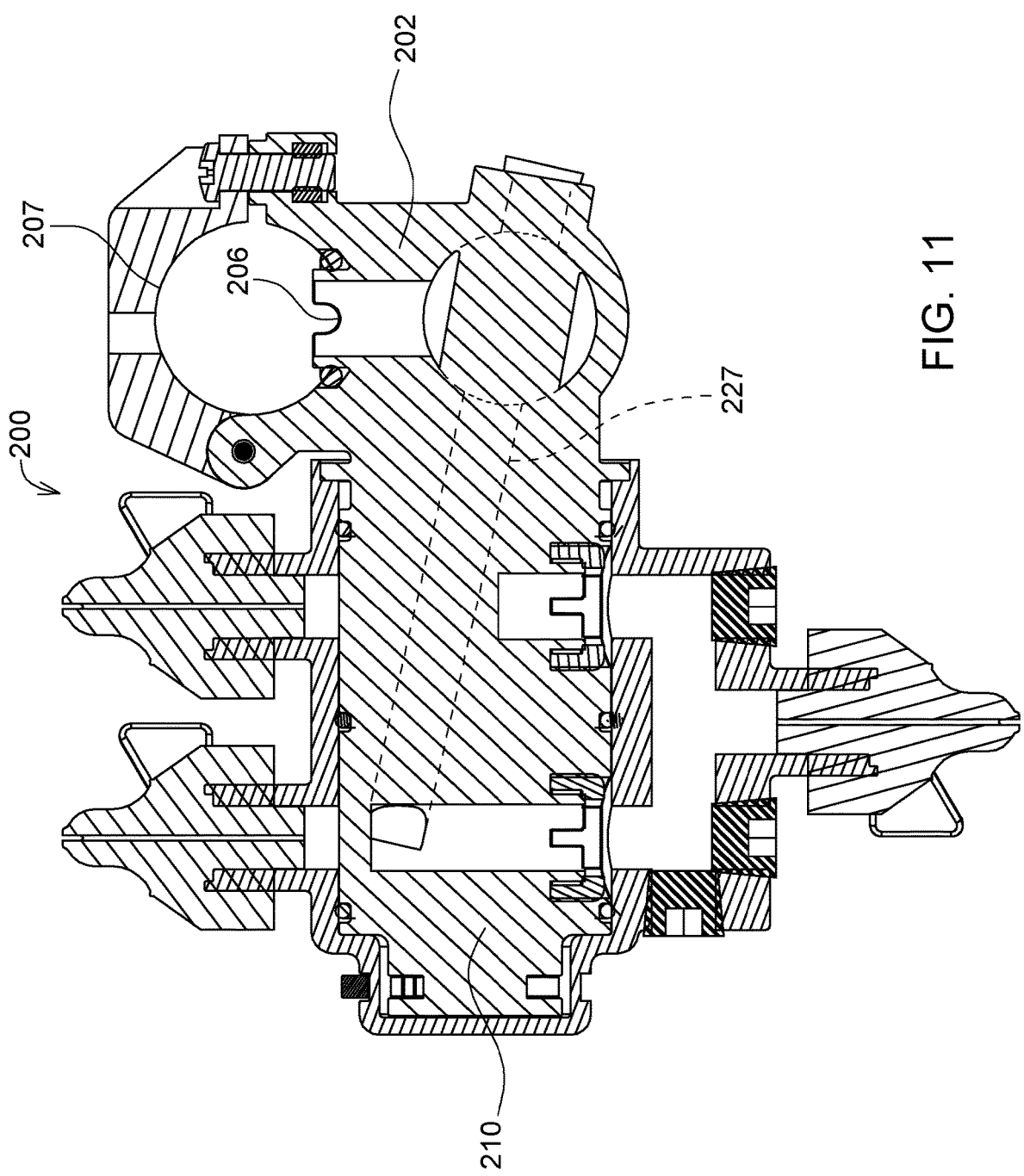
FIG. 11 depicts a cross sectional view of the example nozzle of FIG. 10.

As an aid to understanding the fabrication of these nozzles, FIG. 11 depicts a cut-away view of the example nozzle 200, showing example fluid passageways inside the nozzle. The passageway 227 shown in dashed lines is an idealization of an arbitrary path to transport fluid from the nozzle tube to turret 210. Nozzle 200 has the following dimensions when used for spraying plants, crops and trees from a motorized vehicle sprayer (e.g. self propelled sprayer, tractor towed sprayer). For agricultural applications, nozzle 200 ranges about 1-10 inches; turret 210 ranges about 1-5 inches in length and has a radius of about 0.5-5 inches. The combination of a cap and outlet 230C (or 230A or 230B) ranges about 0.5-3 inches in height (except in cases where drop nozzles and extensions increase this length to up to 40 inches) and has a radius of about 0.3-2 inches. Similar or scaled versions of nozzle 200 are used in industrial settings. For example, for large area spraying or primer painting, nozzle 200 is of comparable size for increased coverage and ability to spray closer with less build up. For smaller areas or for fine exterior paints or enamels, the size of the nozzles 200 is smaller to achieve a sharper spray pattern or to reduce overspray and so on. As for the material, nozzle 200 and turret 210 are made of brass, aluminum, stainless steel, plated steel, or durable plastic or nylon, fiber, latex and so on. Outlets 40, 42 and 50 are made of one of these example materials as well. In some embodiments, the entire nozzle 200 is made of plastic or nylon that can withstand acids and harsh liquids. The O-rings located at the connections (e.g. at the nozzle tube outlet 108) are made of rubber or elastomers that provide a good seal.

Nozzle 200 or its components are made from introducing material into a mold or from 3-D printing. Under a 3-D printing method of manufacture, the passageways and endcaps are gradually formed as part of the printing process of depositing layers of plastic material. Under one possible 3-D printing technique, a three dimensional digital model of nozzle 200 is converted into two-dimensional mask images, and stereolithography is applied to form the layers of material, somewhat akin to semiconductor manufacturing. Under a mold technique, the mold process creates the formation of passageways and the holes (outlets). Sheets of plastic are heated to a forming temperature and stretched over a surface. Alternatively, under injection molding, liquid plastic or resin material is injected into a mold; after product formation and cooling, the center styrofoam or soft mold material is pulled out of the passageways, yielding a nozzle 200 with emptied holes and passageways. Another mold technique is to introduce liquid plastic into a mold with two halves, suction the liquid so that liquid remains close to the walls of the mold and leaves passageways clear, and to pull apart the halves after the plastic-like material cools, leaving the formed nozzle 200. In yet another technique, which is used by itself or together with a mold technique, nozzle 200 is formed with either a mold or 3-D process and the passageways are subsequently drilled or machined in the tool. In addition, a nozzle can be fabricated as a single piece where the outer nozzle tips form a single piece with the body (e.g. FIG. 6) or as separate pieces that are integrated later. For instance, the next-described configurations involving a turret and outer interconnects can be manufactured as separate pieces and then the turret is mounted inside.

Figure 13:
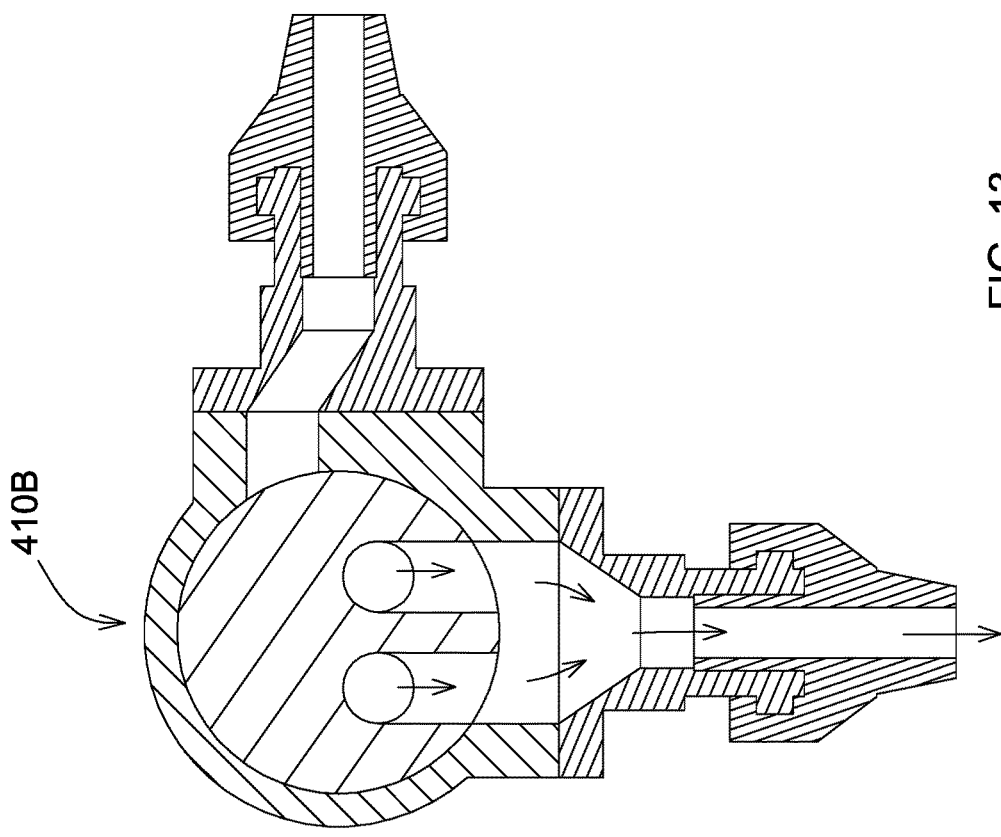
FIG. 13 depicts a cross sectional view of an example nozzle that includes a combined outlet spray.
Figure 12:
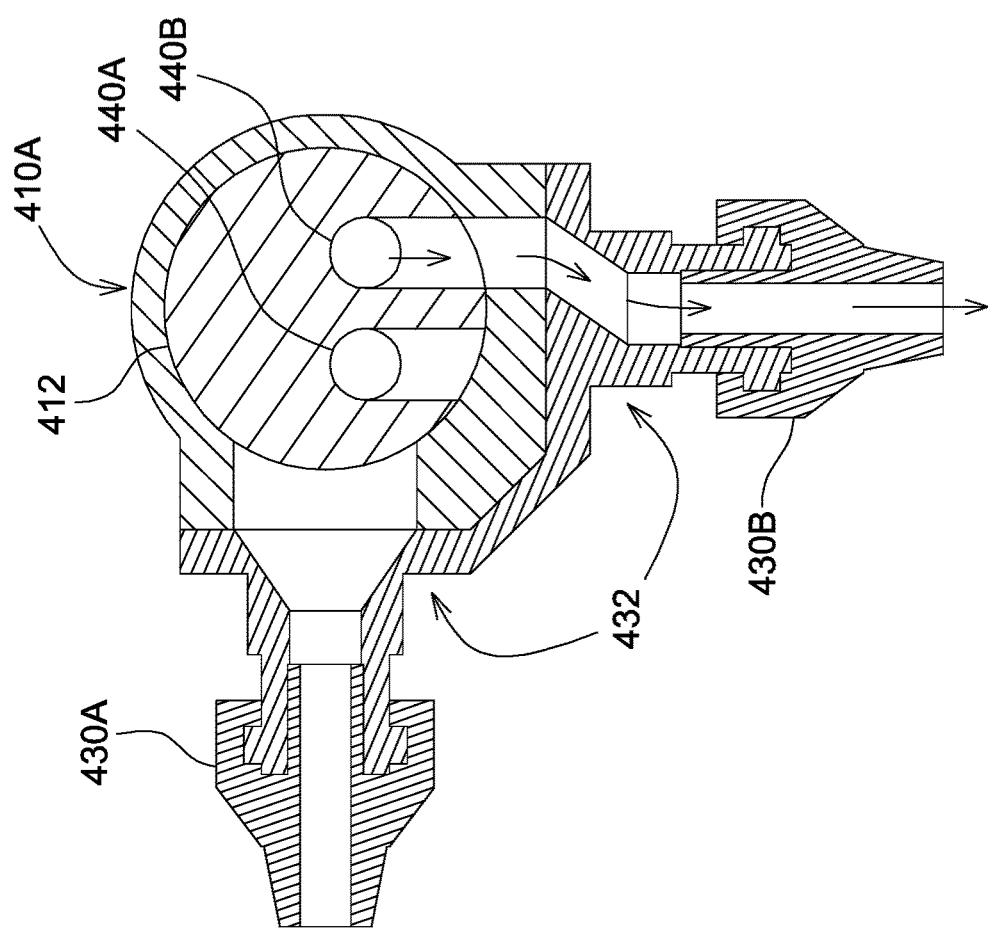
FIG. 12 depicts a cross sectional view of an example nozzle that includes a single outlet spray.
Figure 14:
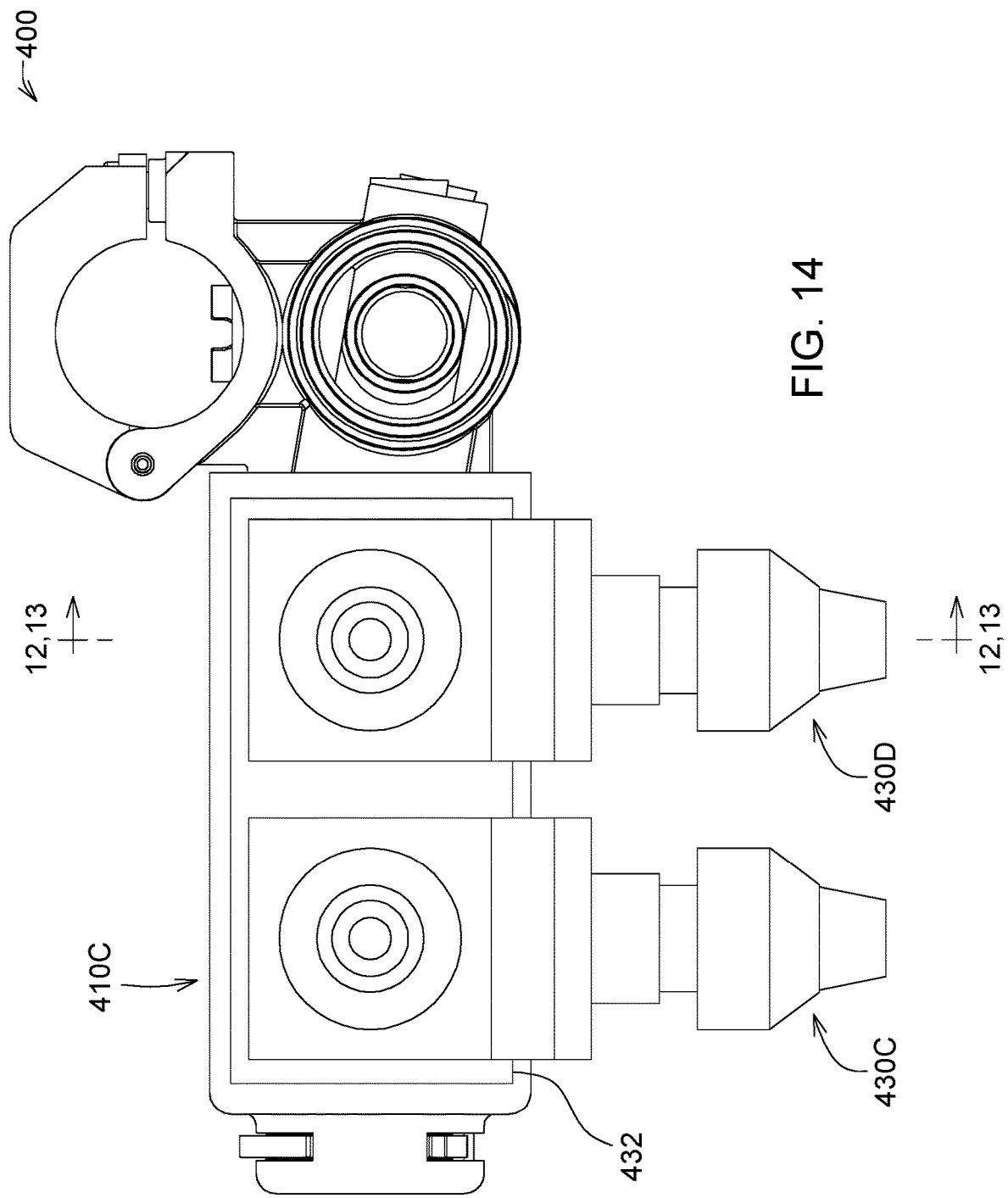
FIG. 14 depicts an example nozzle with multiple combined outlets.

Several configurations and methods to combine and/or separate the fluid flow from two or more valves are possible. The nozzle configurations 400 include a turret having inner passageways that either combine or separate the flow from the valves. Another embodiment includes a rotatable turret that mates to a selectable outer interconnect. FIG. 12 depicts an embodiment of the cross section of an example turret 410A having output nozzle tips 430A and 430B, and an example outer tip interconnect 432. The fluid travels inside the turret 410A along two interior passageways 440A and 440B. Tip 430B includes a single tip that is an outlet for a single source of fluid from either passageway 440A or 440B. Tip 430A includes an outlet for multiple sources of fluids (combined), such as from a combination of the passageways 440A and 440B. In this example, the interconnect 432 between the turret 410A and the spray tips 430A and 430B combines or separates the fluid from the individual passageways 440A and 440B depending on which turret position is selected by rotating the turret 410A to a particular interconnect 432 outside turret 410A. Inner turret cylinder 412 rotates. Alternatively, the inner turret cylinder 412 is stationary and the outer turret 410A rotates. Thus, the interior passageways such as 440A and 440B are not dedicated to either single or combined fluid flow (unlike in FIG. 7); rather, a suitable interconnect 432 contains a single conduit to release fluid from only one turret interior passageway, or the interconnect 432 contains forked conduits (e.g. FIG. 7) to join fluid from multiple passageways. Alternatively, the delivery of interior passageways 440A and 440B are made the same among FIG. 7, FIG. 11, and FIG. 12, but having a difference in the proximity of the outlet holes and the ability to use a single conduit. FIG. 13 depicts an example having a turret 410B where the interconnect 432 contains a forked conduit to combine fluids. FIG. 14 depicts an example having a turret 410C where the interconnect 432 contains separate conduits that go to individual nozzle tips 430C and 430D. In yet another alternative, both the interconnects 432 and the interior passageways 440A and 440B work together to combine or segregate fluid flow; for instance if the interior passageways are multiple cylindrical walls having many single or multiple holes lined around the periphery of each cylinder (e.g. FIG. 9).

Figure 15:
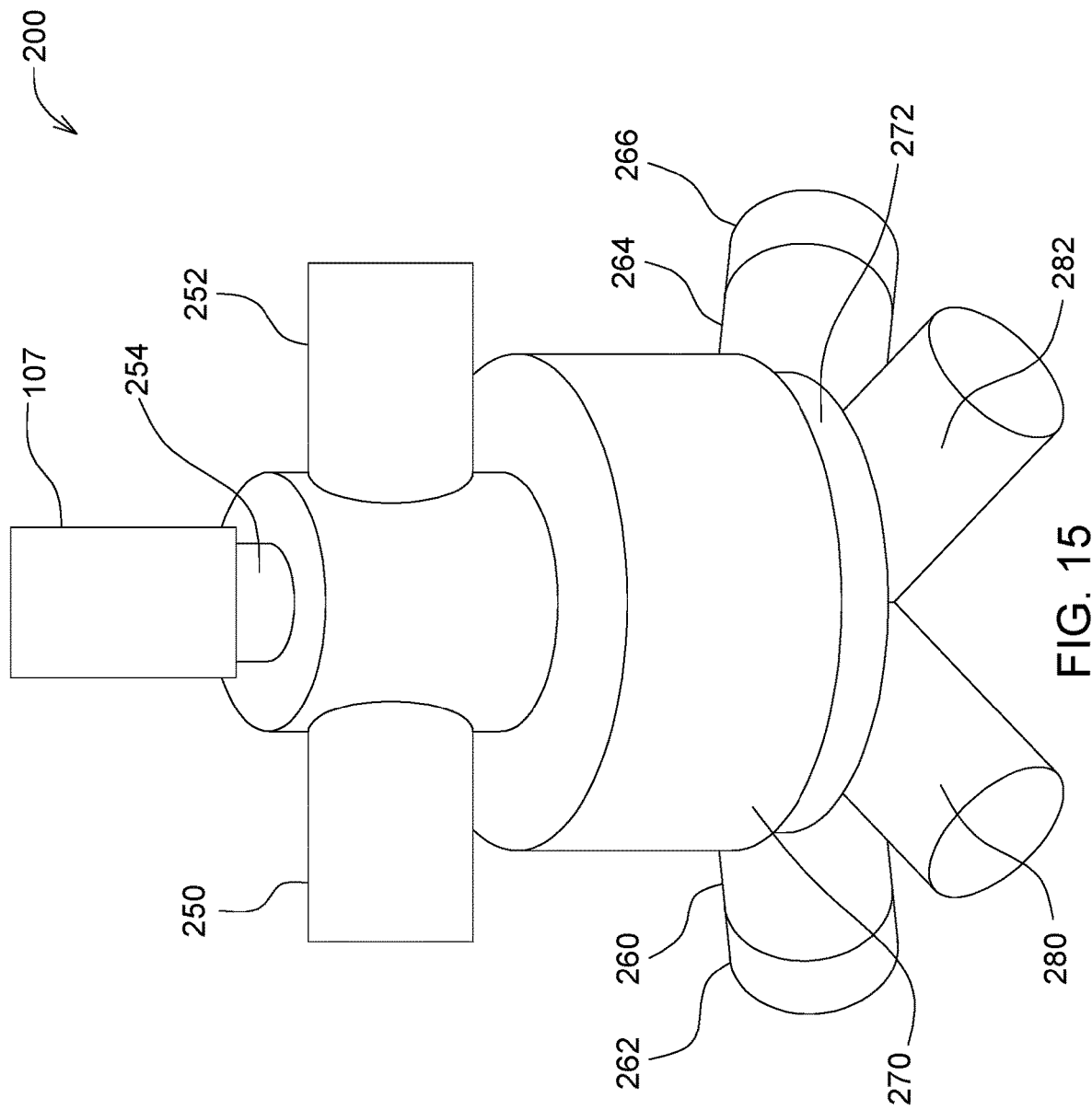
FIG. 15 depicts an example nozzle with multiple inputs.

FIG. 15 depicts another example nozzle 200 having a nozzle body 270, above which are multiple fluid inputs, input 254 plus at least one additional one 250 or 252 that is perpendicular to or adjoins input 254. Input 254 is the main input and connects to a fluid pipe mount ring 107. Fluids from any of the three inputs 250, 252, 254 flow into the chamber for input 254. Although inputs 250 and 252 are depicted as being opposite to each other in FIG. 15, they are closer together or adjacent to each other in other versions of nozzle 200. Alternatively, inputs 250 and 252 adjoin the peripheral wall of the nozzle body 270 and fluid from inputs 250 or 252 flow directly into the main chamber inside nozzle body 270. Nozzle tubes 260 and 264 protrude out of the nozzle body 270. Nozzle tubes 260 and 264 have actuator or solenoid endcaps 262 and 266, respectively, that open and close gates to permit fluid to flow from the inputs 250, 252 or 254 to the main nozzle body 270 and then to outlets 280 and 282. Turret 272 is rotatably attached to the nozzle body 270 and nozzle outlets such as 280 and 282 are mounted to and located on the outer bottom of turret 272. Although depicted as protruding at an angle with respect to each other, outlets 280 and 282 are pointing in the same direction in other versions of nozzle 200. Outlets 280 and 282 are either combination-type outlets that receive fluid from more than one input (250, 252, 254) or single outlets. Turret 272 is manually rotatable (clockwise or counterclockwise) with respect to nozzle body 270. Alternatively, turret 272 is attached to an electrically-operated plate or turntable and automatically rotated based on a command signal sent to the plate (e.g. stepper motor); and a spindle or central shaft of the plate is driven by a motor to rotate on command, mate the inputs to the outlets 280 or 282, and position a selected nozzle outlet 280 or 282 to a desired spray direction.

Figure 16:
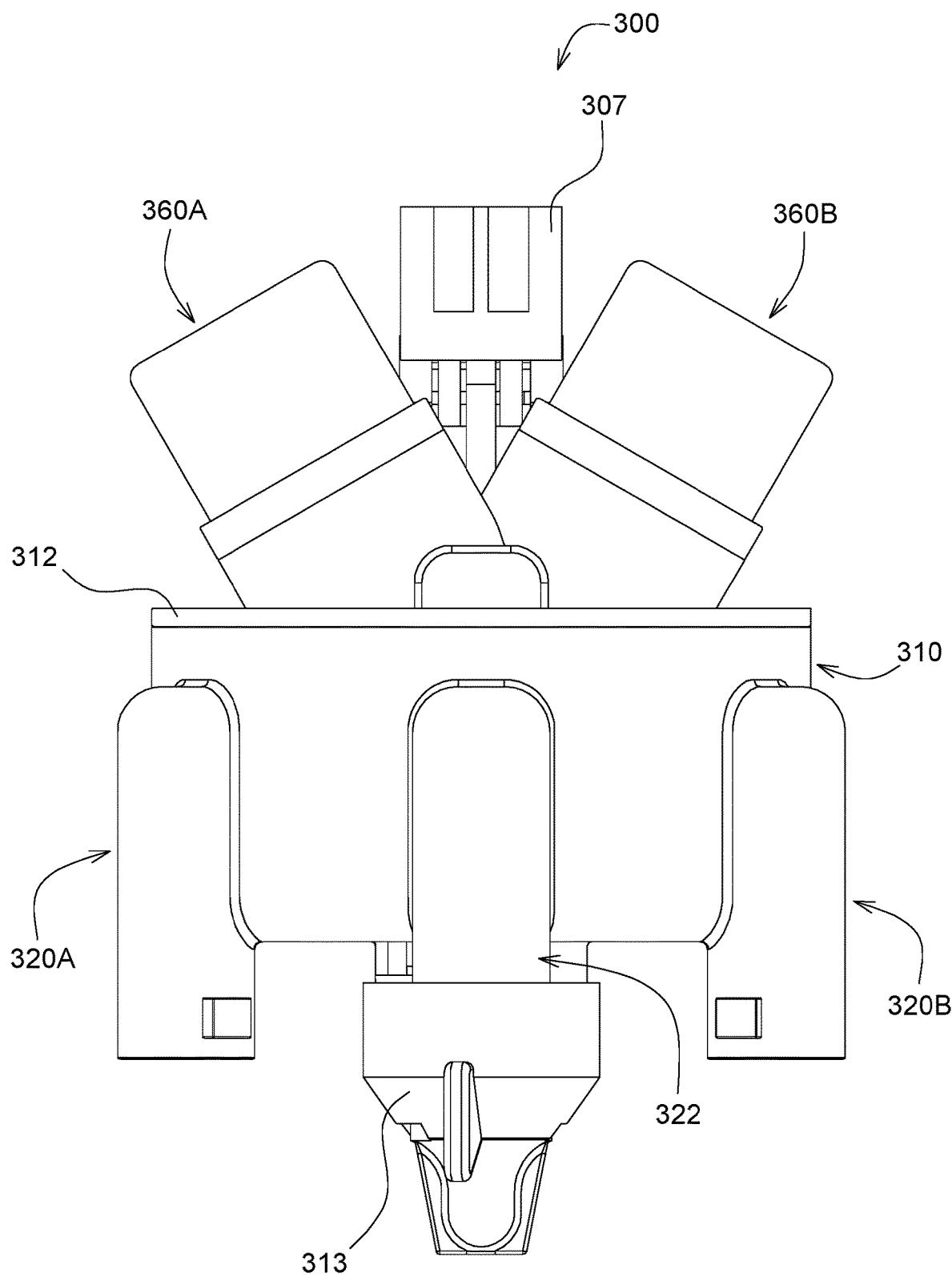
FIG. 16 depicts an example nozzle.

FIG. 16 depicts another example nozzle 300 having nozzle tube 360A and 360B (collectively "360") that are at an angle with respect to each other and rather than being perpendicular to the pipe-mounting circular ring 107. Alternatively, the central axis of tubes 360A and 360B is parallel to the vertical axis of mount ring 307 so that tubes 360A and 360B are upright and parallel to each other in FIG. 16, like twin towers adjacent to each other and projecting out at 90 degrees from the plate 312. Turret 310 is attached to the nozzle tube 360. In one example described below, turret 310 includes an inner turret mate (e.g. 314) and an outer turret receptacle (e.g. 310A); the turret mate is attached to the nozzle tube 360 while the outer turret receptacle is rotatable about the turret mate. Nozzle outlets such as 320A, 320B and 322 are located on the periphery of turret 310 or turret receptacle such as 310A. Outlet 322 is a combined outlet that receives fluid from more than one outlet (e.g. outlet 122 combining outlets 120E and 120F in FIG. 6). Turret 310 is manually rotatable (clockwise or counterclockwise) with respect to nozzle tube 360. Alternatively, turret 310 is attached to an electrically-operated plate or turntable and automatically rotated based on a command signal sent to the plate; and a corresponding spindle or central shaft of the plate is driven by a motor to rotate on command and position a selected nozzle outlet to a desired spray direction. In yet another embodiment, the plate or turntable operates with additional degrees of freedom. For example, the spindle or shaft moves or swings up or down (in or out of the page, or left and right of the circular ring 107) to re-position the direction of the turret 310 with respect to the plane formed by nozzle tube 360 (plane of the page depicting 360A and 360B).

Figure 17:
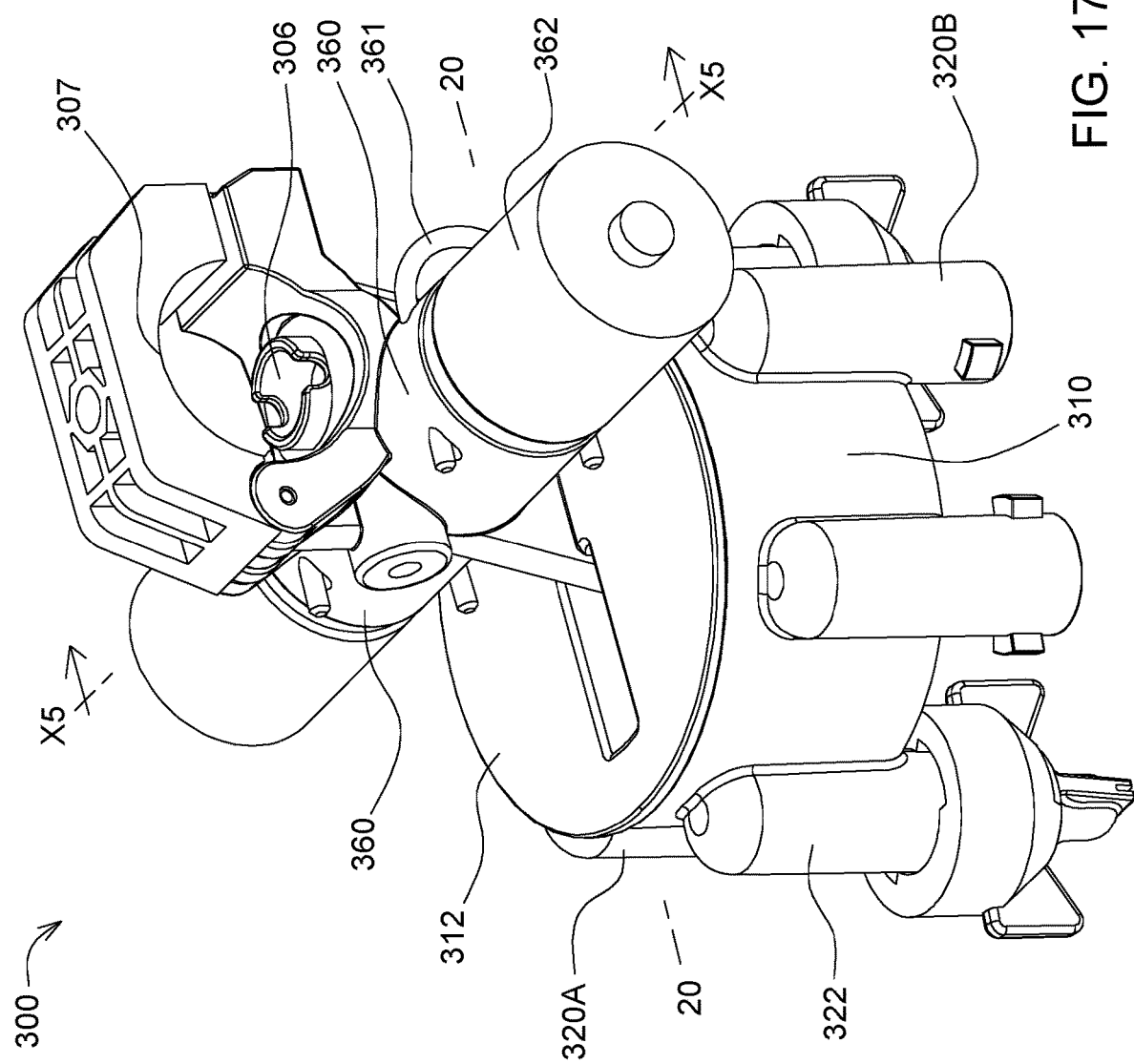
FIG. 17 depicts an example nozzle.

FIG. 17 depicts another example embodiment of nozzle 300 having nozzle tube 360A and 360B (collectively "360"); 360A and 360B have a common central axis and tube 360 is perpendicular to the pipe-mounting circular ring 107. Nozzle tube 360 contains valves or other walls on each end of the tube 360. There are actuators acting on the valves; example actuators include solenoid valves, electromagnetic spring coil, pneumatic lever, bellows, and so on. U-shaped pins 361, socket connectors, retaining clips or other contact pins hold the actuators in place to the nozzle tube 360. Turret 310 is again attached to the nozzle tube 360; alternatively, turret 310 is attached to a rotatable plate 312 that is electronically controlled. Turret 310 is a squat cylindrical with a central axis height that is comparable or smaller than the diameter of the cylinder, as depicted in FIG. 17. Turret 310 contains electronic circuits to operate sensors, the turret rotation, or an optional LED 380 located at the bottom of turret 310. Turret 310 also contains passageways that channel fluid from the nozzle tube 360 to nozzle outlets. Nozzle outlets such as 320A, 320B and 322 are located on the periphery of turret 310. Turret 310 is manually rotated if there is no plate 312 or automatically rotated if there is plate 312 and a corresponding motor to turn plate 312 (e.g. stepper motor). The selected nozzle outlet(s) is positioned to receive fluid from the nozzle tube 360.

Figure 18:
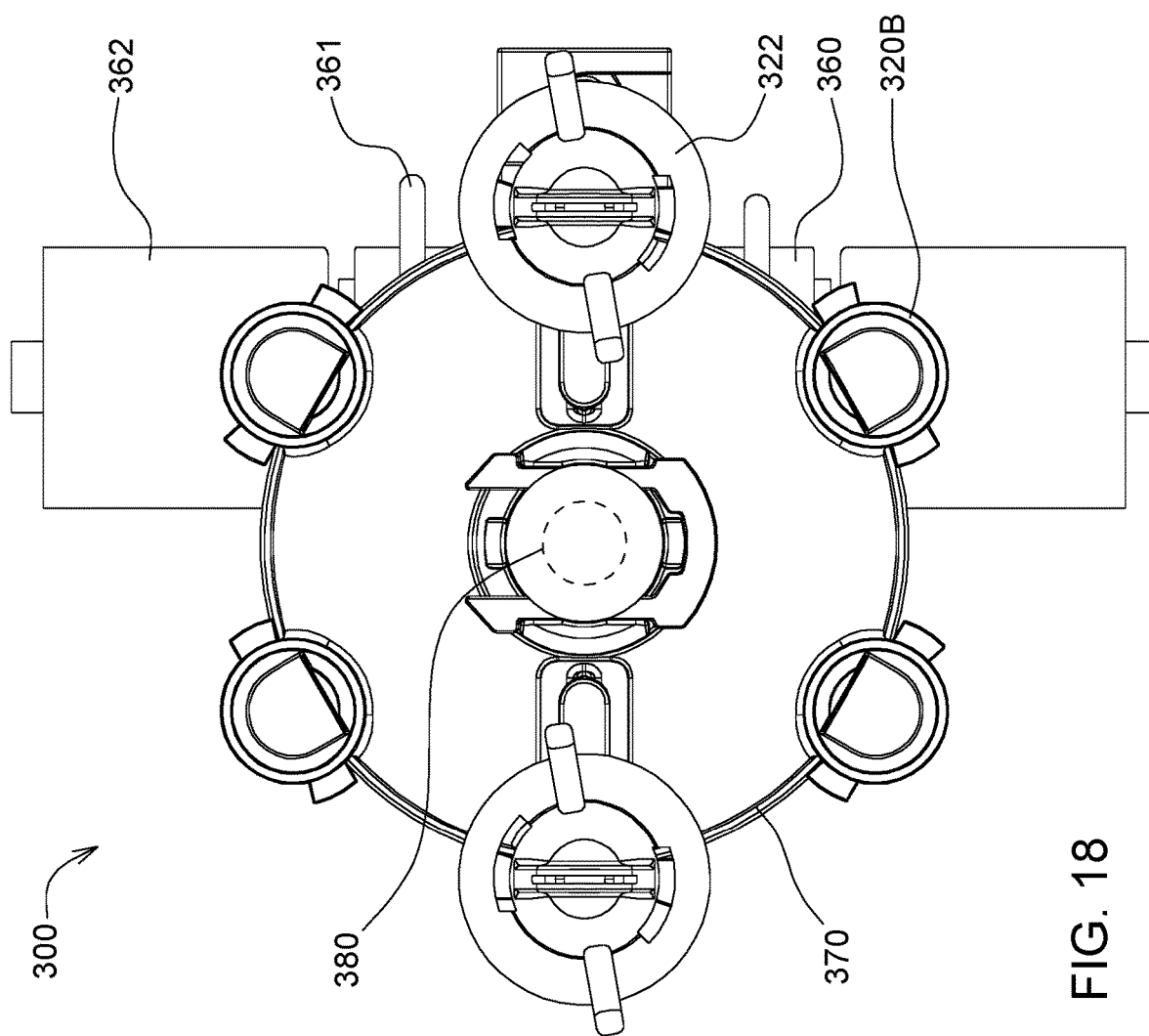
FIG. 18 depicts a bottom view of the example nozzle of FIG. 17.

FIG. 18 illustrates an example bottom cover 370 of the turret 310. In this example, there are six outlets, four of which are exposed outlets such as 320A and 320B and two that are covered by a nozzle tip cap, such as on outlet 322. Any of these outlets can be designed and setup as a combined outlet (e.g. 122 in FIG. 6) or as a single outlet (having a single input source of fluid). At the center of bottom cover 370 is a light source such as an LED that connects to wires or electric traces inside turret 310 of the nozzle 300 or embedded in the outer wall of nozzle 300; the LED is turned on by electronic signals carried by the wires or traces. Alternatively, the LED is operated wirelessly and the LED is connected to a transmitter receiver circuit that is compatible with WIFI or some other communication protocol.

Figure 19:
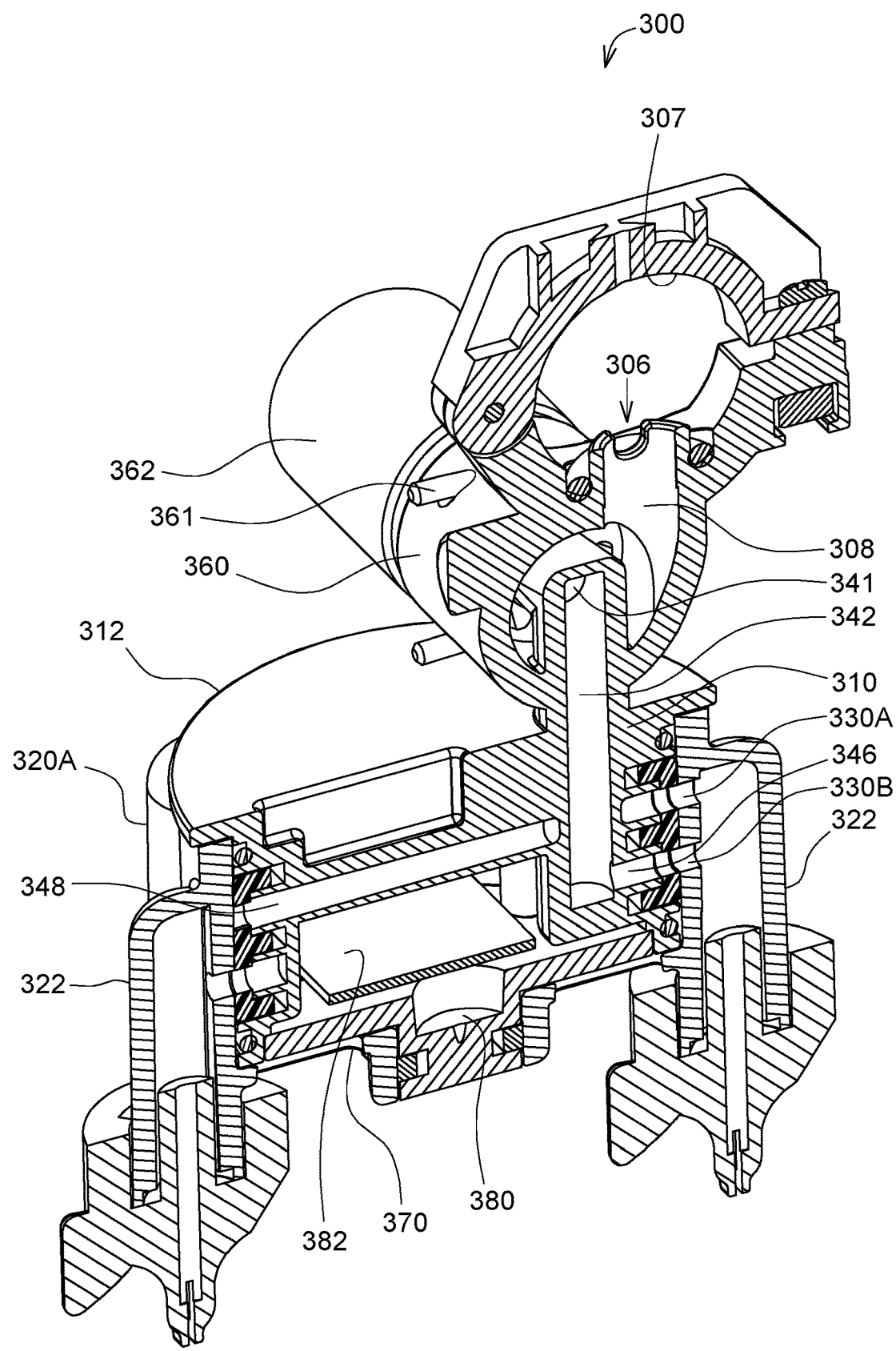
FIG. 19 depicts a cross sectional view of the example nozzle of FIG. 17.
Figure 21:
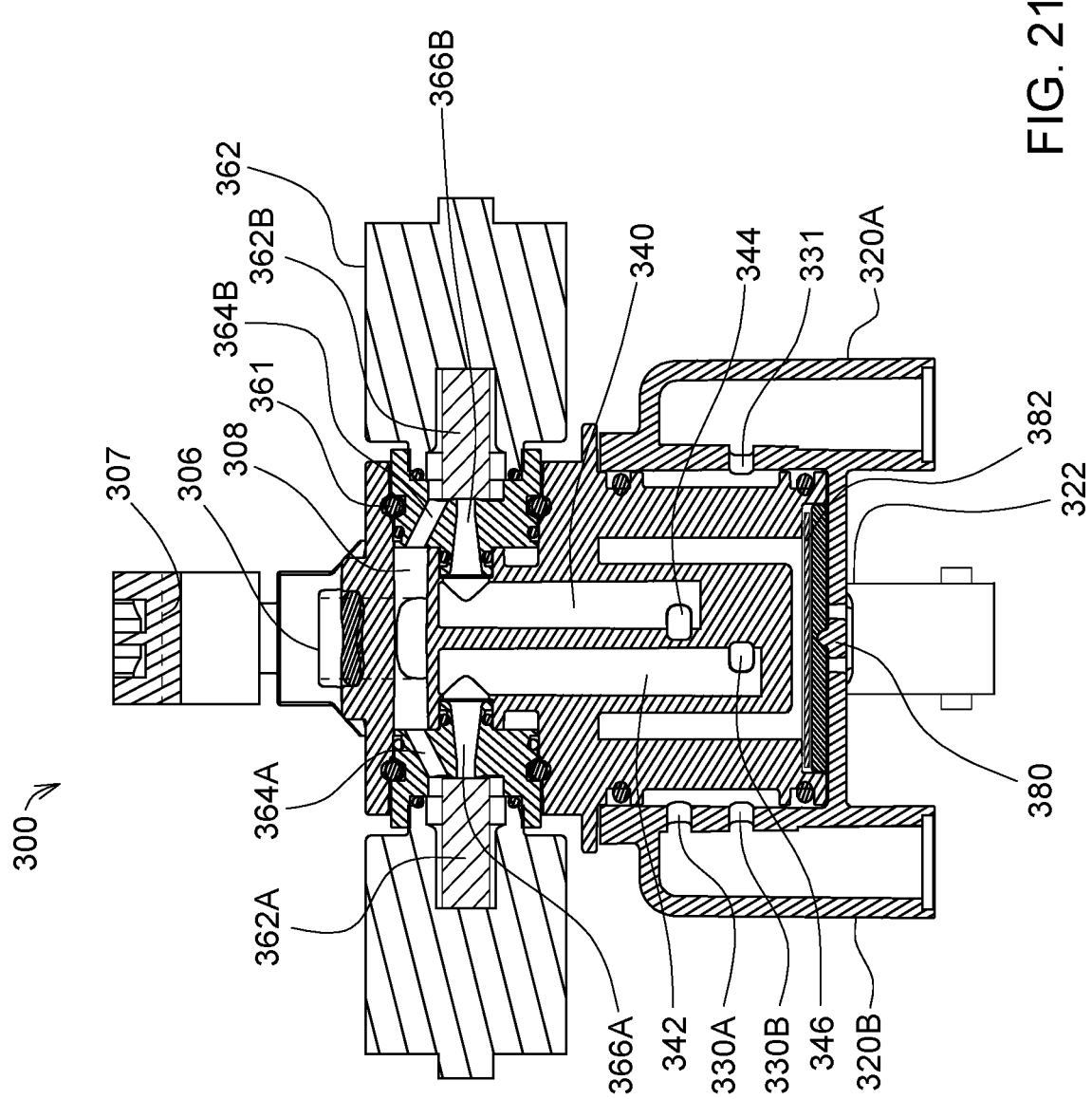
FIG. 21 depicts another cross sectional view of the example nozzle of FIG. 17.

FIG. 19 illustrates a cross section of the example nozzle 300, exposing the nozzle 300 at a plane that is slightly to one side of the center of nozzle tube 360 across the short axis or diameter of the nozzle tube 360 (compare with FIG. 21, another cross sectional view of an example nozzle 300, exposing a plane of the nozzle tube 360 across its long axis). Circular mount ring 307 permits mounting nozzle tube 360 associated with nozzle 300 to a fluid distribution pipe. Nozzle tube 360 has an inlet 306 that is located above nozzle tube 102 in this example. Inlet 306 is located between two valves (362A and 362B, FIG. 21) that are each capped by an actuator such as a plunger-type solenoid 362. Inlet 306 is connected to an orifice 308 that splits to two ducts 364A and 364B on either side of orifice 308; and the orifice 308 connects to the two ducts 364 (e.g. FIG. 21). The ducts 364A and 364B connect to their respective neighboring ducts 366A and 366B, respectively (FIG. 21), unless valves 362A and 362B are closed and create a blockage between the two connections (364A and 366A, 364B and 366B). Valves 362A and 362B are plunger type or other electric-mechanically operated walls. As depicted in FIG. 21, there is an open (longitudinal) space behind each of the valves 362A (to the left) and 362B (to the right) in which each valve 362A or 362B can move to cause the passageway to open or close between ducts 364A and 366A, or between 364B and 366B. Ducts 366A and 366B join to connection ducts 342 and 340, respectively. Connection ducts 342 and 340 form outputs from nozzle tube 360 and serve as inputs into the turret 310. The vertical connection ducts 342 and 340 have release holes 346 and 344, respectively, that are located near the lower end of connection ducts 342 and 340. Depending on the position in which turret 310 is rotated, the release holes 346 and 344 mate with horizontal channels (346A and 344A) that mate with one or more apertures (330A, 330B, 331) in the nozzle outlets 320A, 320B or 322. The horizontal channels are not shown in the cross section view of FIG. 21, but the vertical height of release hole 344 lines up with the aperture 330A; release hole 346 lines up with the apertures 330B or 331. When the turret 310 is rotated to an appropriate position, the fluid travels from release hole 344 to aperture 330A and from release hole 346 to either aperture 330B or 331. In other embodiments of nozzle 300, the ducts 364A and 364B are pockets or spaces between cylindrical walls such that the space wraps around or partially wraps around the central core of the tube-shaped nozzle tube 360.

Figure 20:
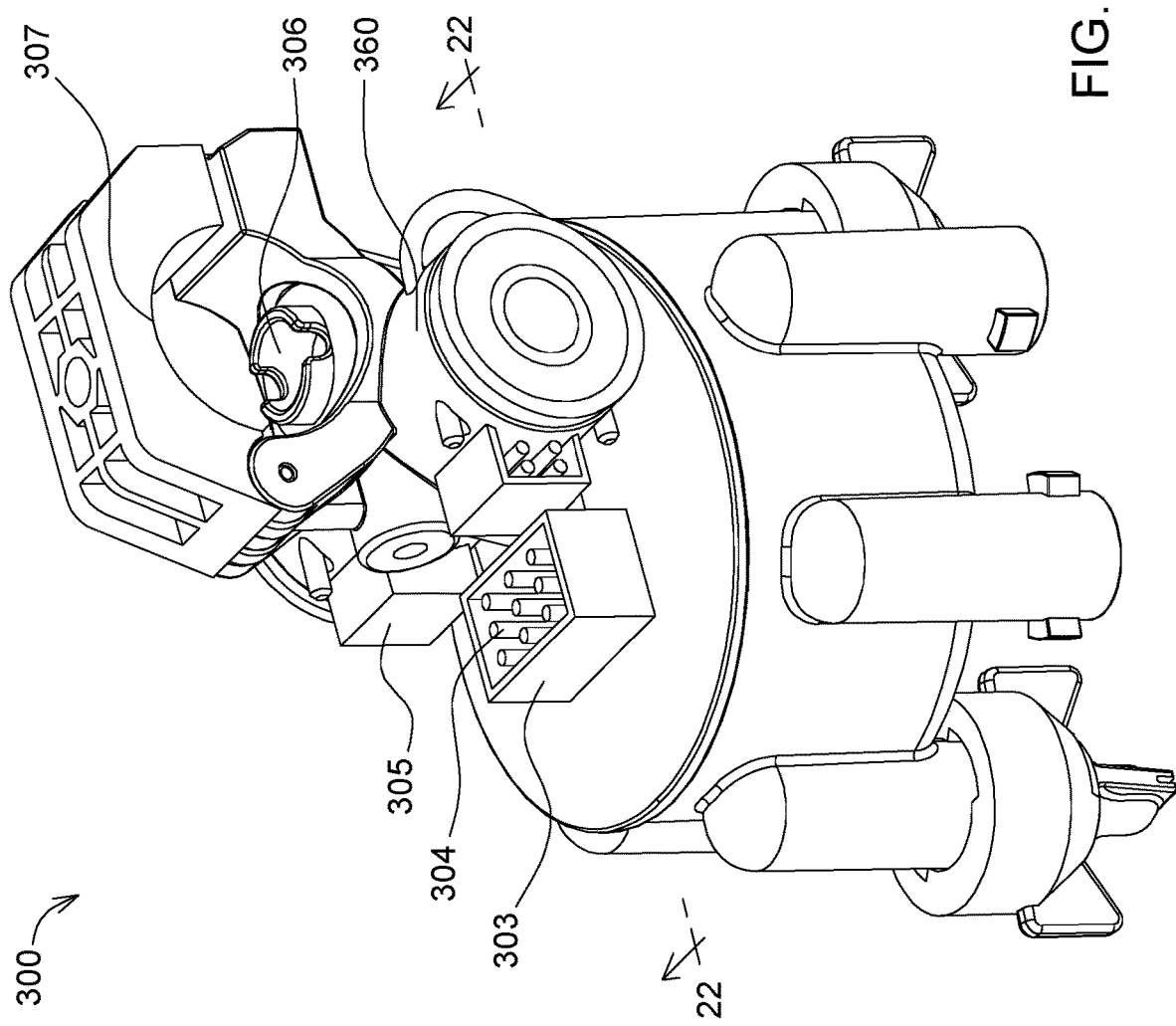
FIG. 20 depicts an example nozzle.

In FIG. 19, the example turret 310 is cylindrical and has couplings between the connection duct 342 and the nozzle outlets 320A, 320B or 322 when turret 310 is rotated to an appropriate mated position (e.g. hole 346 to aperture 330B). In some instances, connection duct 342 has more than one release hole 346 in order to mate with more than one outlet aperture (e.g. 330A). If selected outlets (for mating with connection duct 342) are non-adjacent to each other, there is a duct or channel 348 to bridge the distance across the turret 310 and enable sharing of fluid for spraying. Turret 310 also has a compartment to hold electronics such as a small printed circuit board PCB 382. The circuits on PCB 382 communicate wirelessly or wired (e.g. CAN-bus) with a central controller (e.g. in the cab or at a farm site) or cloud server. The circuits on PCB 382 include receivers for incoming signals, amplify and/or clean (e.g. filter or remove jitter or recover the clock from incoming signals), or generate the signals to operate the LED 380. In one embodiment, the LED 380 (sometimes covered by a lens) is also soldered to the bottom side of the PCB 382 and there is a matching hole in the turret receptacle 310A through which LED 380 shines when the LED 380 is turned on. Optional sensors (e.g. sense vibration) or pressure transducers are included on PCB 382 to monitor the spray performance, take data or store information, or to ionize the spray. If communications are performed wirelessly, PCB 382 includes receivers for incoming instruction signals, signal conditioning circuits to process weak incoming signals, amplifiers and/or filters to extract the electronic signal from electronic noise, clock signals to coordinate the timing to operate the nozzle 300 (clock recovery of incoming timing signals), then signal generators for the PWM signals drive the actuator or energize the magnet to open and close the valves 362A and 362B, and then transmit any sensor signals back out the central controller that commands the operation of the nozzles (filter/clean and buffer the sensor signal data, use a line driver or amplifier to transmit the signals). If the PCB 382 communicates wired, electrical traces are embedded, stamped or printed in the walls of turret 310. The traces or wires (e.g. 304) are fed to or fanned out to a relay box 303 shown in FIG. 20 depicting another embodiment of nozzle 300. Likewise, relay box 305 contains signal leads to communicate electrical signals with nozzle tube 360. In the example of FIG. 20, the relay boxes are located near the valves 362A and 362B inside nozzle tube 360. The pins 304 in the relay boxes 303 or 305 mate to standard pin connectors that are wired to the CAN bus (not shown) wires that run along the length of the fluid pipes from one end of the spray boom to the boom suspension chassis and then to the central nozzle controller.

In the example of FIG. 21, there are two valves 362A and 362B in the nozzle tube 360, each valve of which is capped by an actuator such as an in-line solenoid 362. Inlet 306 opens to an orifice 308 that is connected to two ducts 364A and 364B. The orifice 308 is a single rectangular chamber in the example FIG. 21, but alternatively it has an irregular shape of a chute and air gap surrounding a cylindrical inner tube (see e.g. FIGS. 19 and 20). The ducts 364A and 364B connect to their respective neighboring ducts 366A and 366B if the valves (or other plunger) 362A and 362B are pulled back towards the direction of the endcap solenoids 362 (i.e. 362A towards the left and 362B towards the right in FIG. 21). Alternatively, there are valve plugs 390 (FIG. 23) that enable or disable the channeling of fluids from ducts 364A to 366A, and 364B to 366B. For example, valve plugs 390 include valve seat pieces that interface with a poppet from the solenoid actuator for form a stopper or seal. Ducts 366A and 366B connect to vertical connection channels or ducts 340 and 342 in the turret 310 as discussed above in relation to FIG. 19. For agricultural nozzles that are mounted on a fluid distribution pipe, nozzle 300 has approximate height dimensions of 110-120 mm from the bottom of outlets 320A or 320B to the top of the circular mount ring 307. Nozzle 300 has width dimensions of about 130-140 mm from one end of the solenoid 362 to the end of the other solenoid 362. For more powerful actuators or for more outlets, the dimensions of nozzle 300 can be scaled up. By contrast, the longest dimension of the turret 110 (FIG. 6) is approximately 130-160 mm, but it is more narrow having a diameter of about 50 mm. If there are space constraints such as due to where a nozzle is mounted to a fluid distribution pipe or due to limitations of the support boom, one of the turrets 110 or 310 may be more suitable to the allocated space. For agricultural sprayers, the spray booms and fluid distribution pipes are folded, which makes it desirable to have smaller nozzles dimensions. On the other hand, interleaving valve operations may cause interference if the nozzles are too small and the valves 362A and 362B are too close together. Aside from space constraints, the distance between the two valves 362A and 362B should be far apart enough that their opening and closing action does not impact one another, which depends on the amount of pressure applied by the valves 362A and 362B, the amount of isolation provided by the configuration of the ducts such as 364B, 366B, and the amount of fluid moving around. Alternatively, by performing experiments and obtaining test results, a look up table is formulated such that the PWM signals are applied with a particular duration and non-overlap (phase relationship) so that the valves 362A and 362B do not adversely impact one another (e.g. leakage of fluid, fibrillation).

Figure 2:
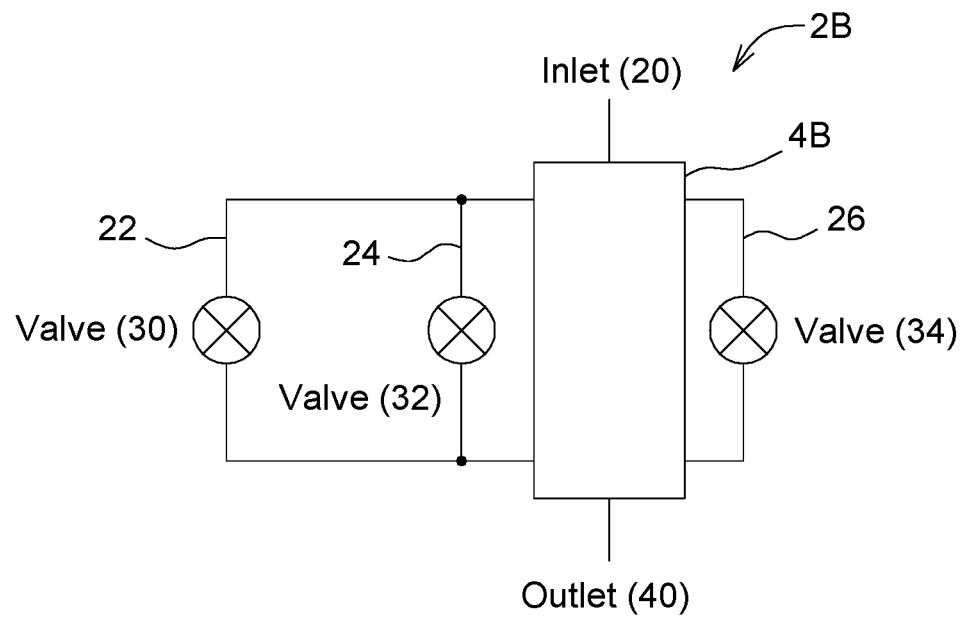
FIG. 2 depicts an example nozzle topology.
Figure 22:
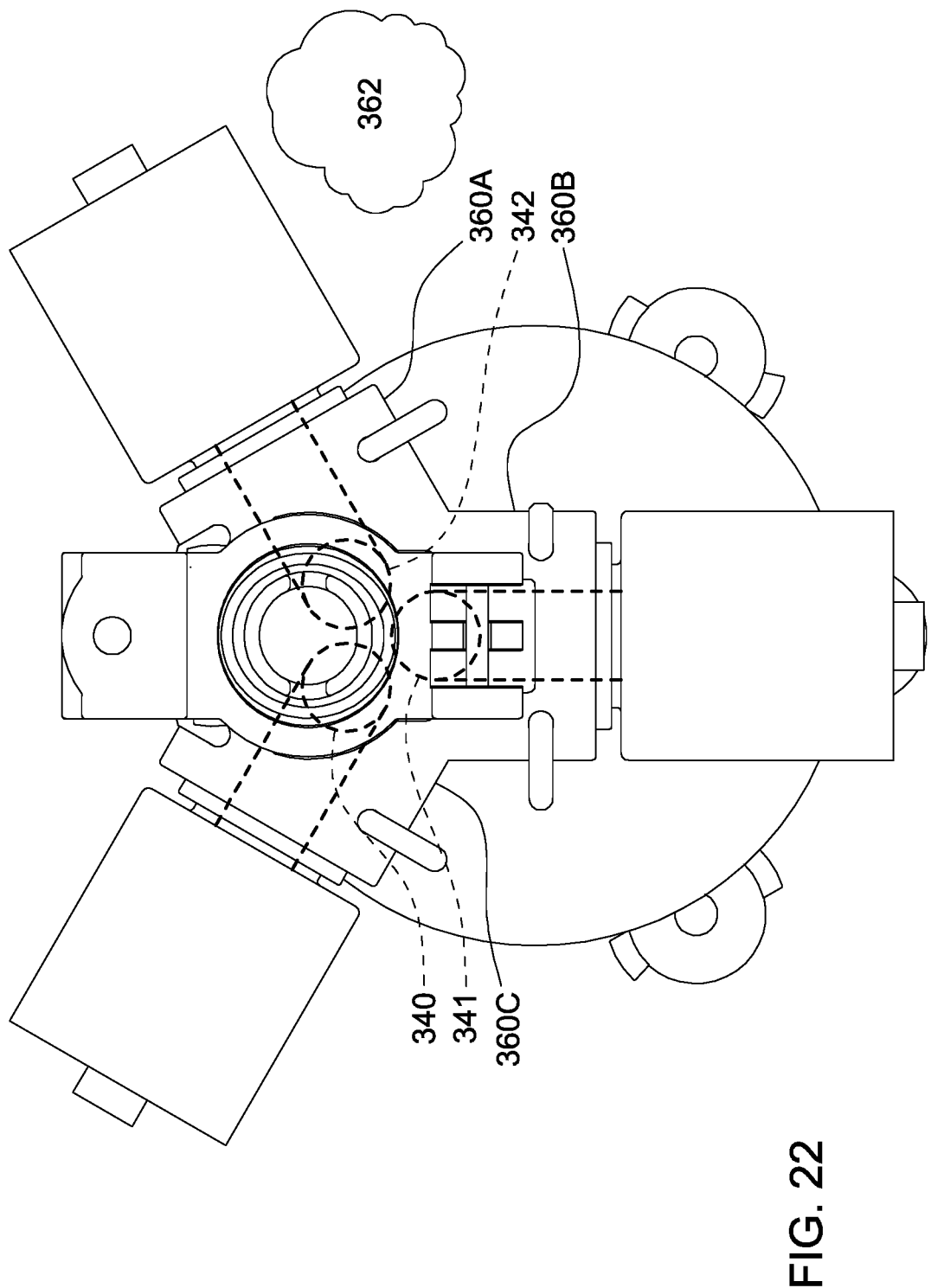
FIG. 22 depicts a top view of an example nozzle.

In another physical embodiment depicted in FIG. 22 that corresponds to the nozzle topology 2B of FIG. 2 and operation depicted in FIG. 2A, there are three or more valves, the nozzle tube is in the shape of a star or a wheel spoke so that a valve is mounted to each spoke. The operation of each valve (e.g. solenoid 362) is controlled by one of the three independent signals (e.g. for valves 30, 32 or 34 as depicted in FIG. 2A). There are three nozzle half tubes 360A, 360B and 360C, which is one more than the two protruding half nozzle tubes 360A and 360B as shown FIG. 16 or 17. There are also additional connection ducts 340, 341 and 342 corresponding to each spoke that operate as passageway from the nozzle tube to the turret. In addition, although FIGS. 16 and 17 depict a cylindrical nozzle tube 360, the tube is rectangular in cross-section in other embodiments.

Figure 23:
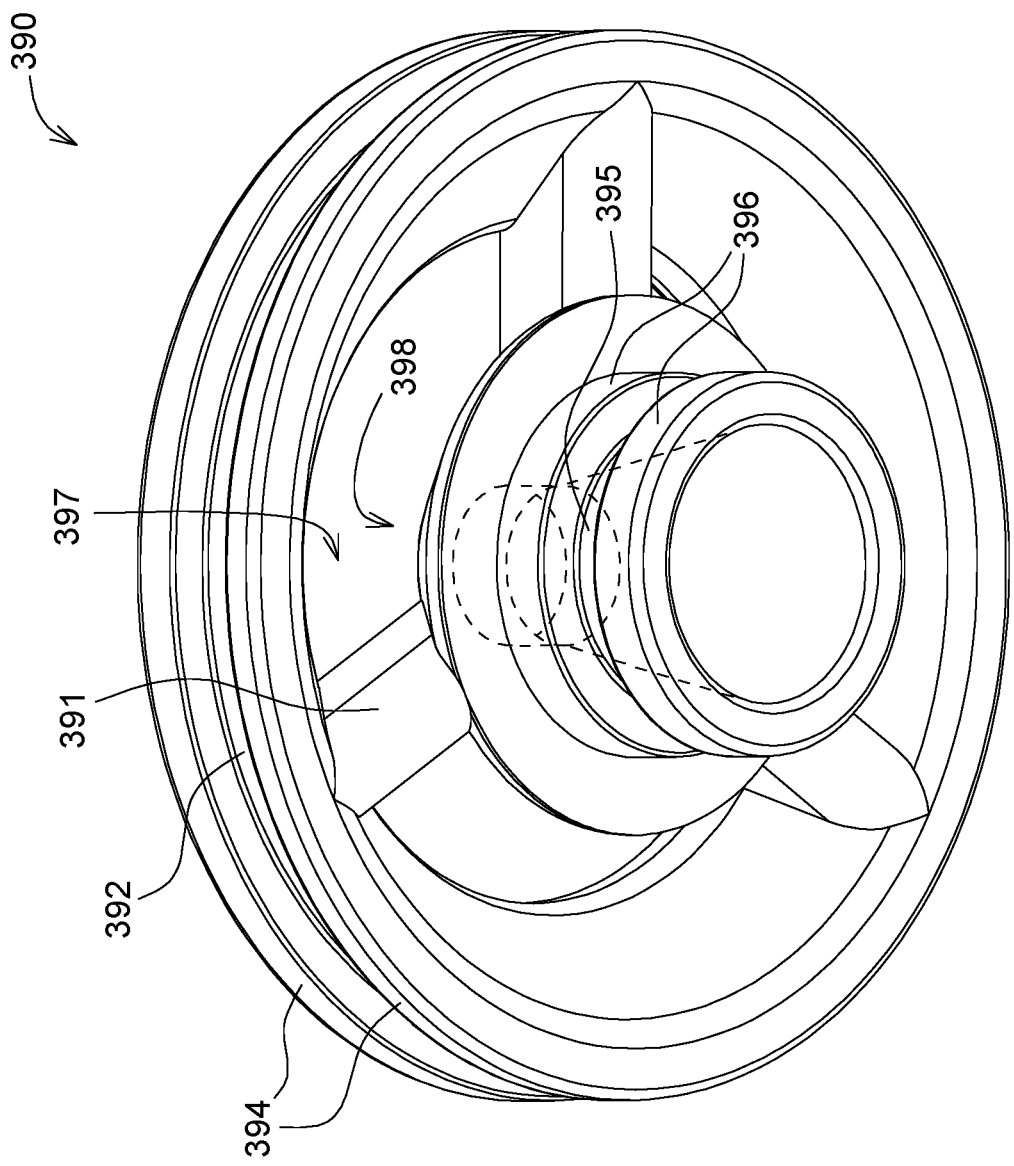
FIG. 23 depicts a perspective view of an example valve plug.

FIG. 23 depicts a perspective view of example valve plugs 390 associated with the solenoid valves. Plug 390 is circular with large stopper 394 situated on top of a small stopper 396. The small stopper 396 has a diameter that covers the ducts 366A or 366B (e.g. FIG. 21) that opens to connection ducts 340. The large stopper 394 is ring-shaped with spokes 391 in the ring and openings 397 between the spokes. The large stopper 394 side of the plug 390 mates to and interfaces to the solenoid 362. The large stopper 394 has a center hole 398 into which the solenoid 362 poppet (not shown) inserts into or clamps down to prevent fluid flow into the ducts 366A or 366B or 340 that go to turret 310 (or 110). When the solenoid 362 poppet is pulled back and does not cover the center hole 398, then fluid can flow into the ducts 366A or 366B (or 340) from ducts 364A or 364B, respectively. Fluid flows from the ducts 366A or 366B (or 340) from ducts 364A or 364B, respectively, through the openings 397 between the spokes 391. The small stopper 396 prevents fluid flow when it is pushed against and covers the ducts 366A or 366B or the connection duct 340.

Figure 24:
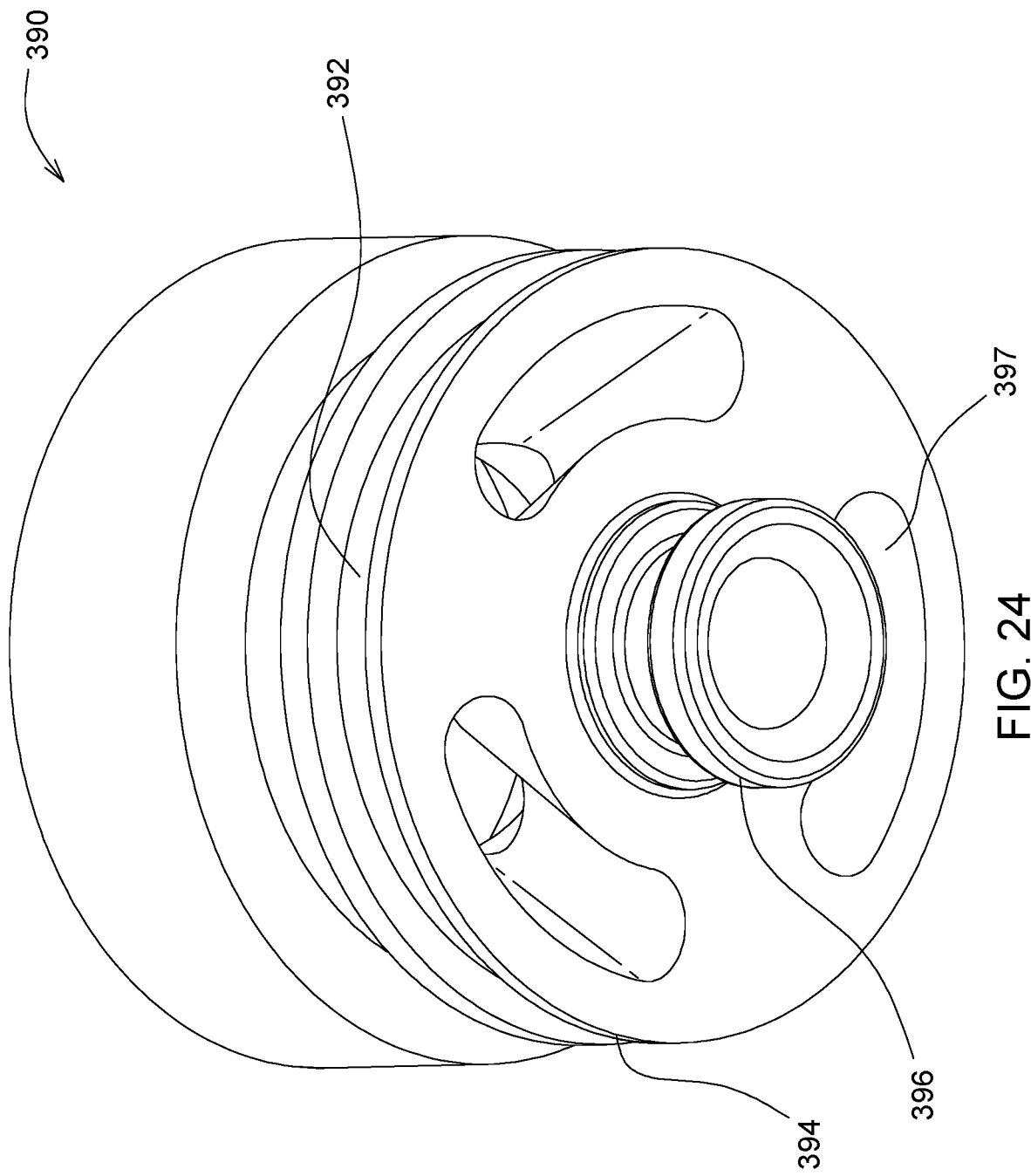
FIG. 24 depicts a perspective view of an example valve plug.
Figure 28:
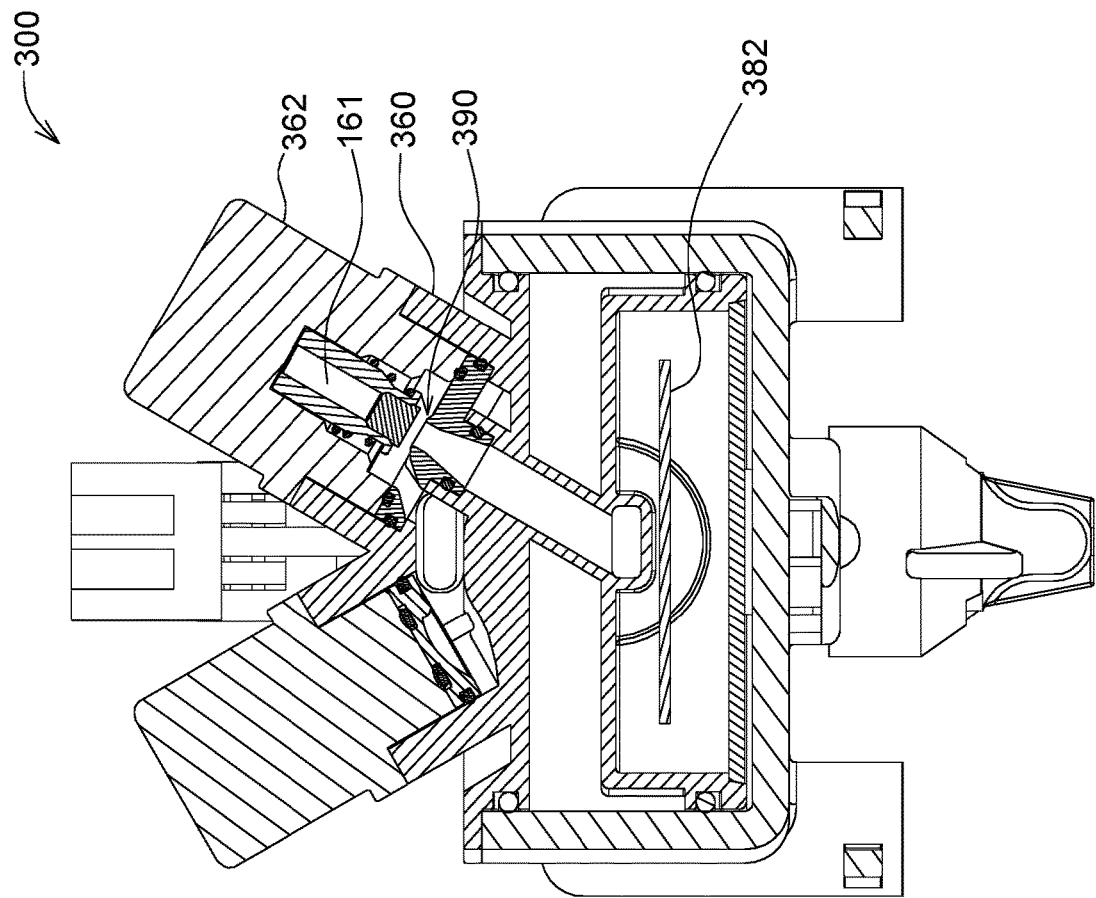
FIG. 28 depicts a cross sectional view of an example nozzle.

Another example plug 390 is shown in FIG. 24. Both this one and the one in FIG. 23 are made of rubber, polymer or other elastomers, or a combination of metal and polymers. In FIG. 24, the openings 397 are pod shaped and the spokes 391 are integral part of the membrane or layers 394. Having flexibility, plug 390 can compress and expand as shown in FIG. 28 (compressed on the left side, and returned to its normal uncompressed state on the right side). The larger stopper 394 includes a middle compression layer 392 that has a smaller diameter than that of the larger stopper 394 (e.g. FIG. 23). The smaller stopper 396 also includes a middle compression layer that has a smaller diameter than that of the smaller stopper 396. In other embodiments, there are additional layers such as a buffer layer positioned closest to or against the surface of the actuator or solenoid. Alternatively, plug 380 is a solid piece stopper or wall, in the shape of either a disc or a rectangle that can seal the ducts 362A and 364A or 362B and 364B to prevent fluid flow. On the other side of the solid piece stopper or wall, there is a protrusion stopper that mates to the ducts 362A and 364A or 362B and 364B. Such an alternative plug is made of a metallic material and optionally covered by or epoxied to a rubber or plastic and created as a single piece. For example, the alternative plug is a magnetic valve and actuator combination that is manufactured as a single piece.

Figure 25:
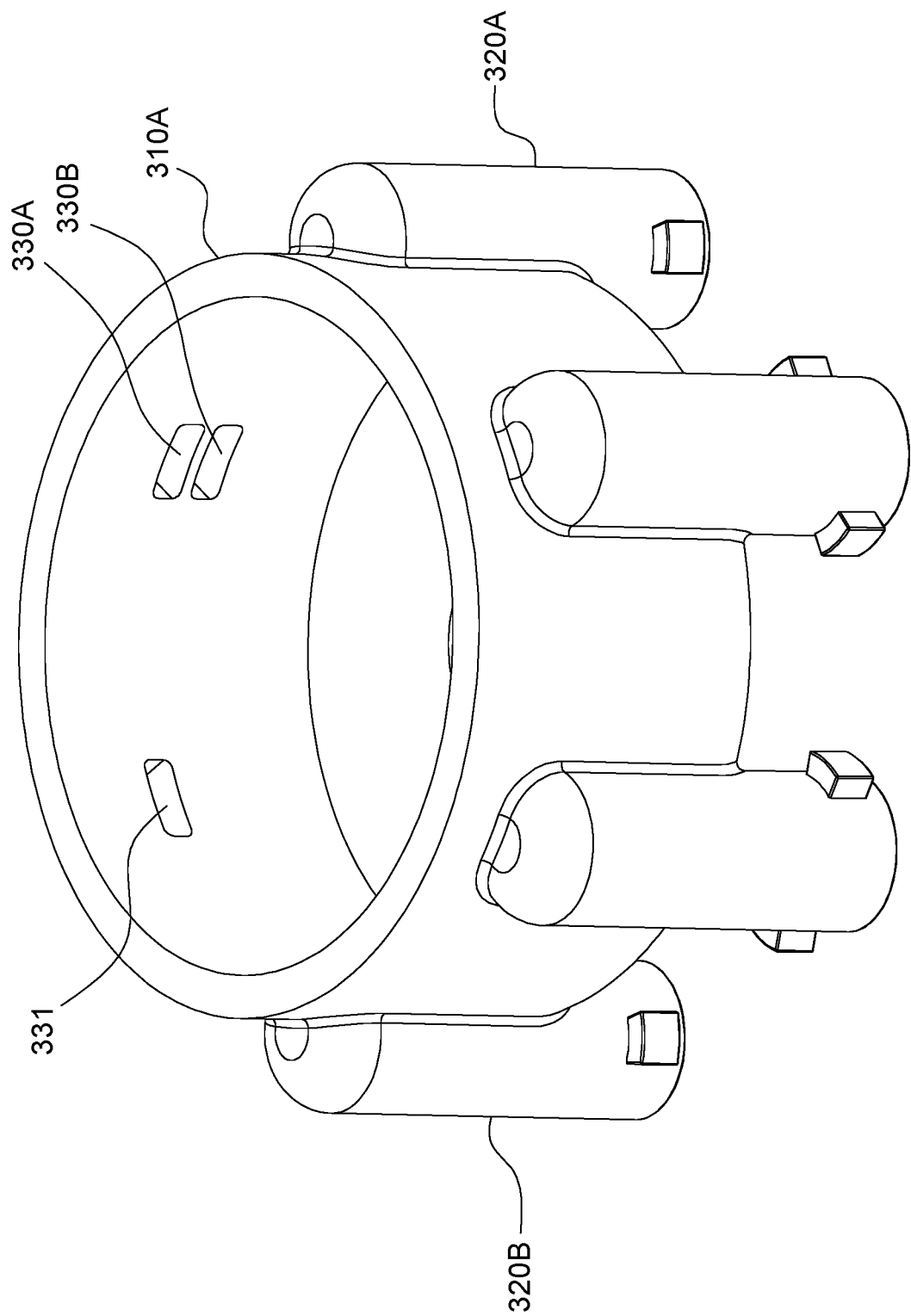
FIG. 25 depicts a perspective view of a turret receptacle.

FIG. 25 depicts an example turret receptacle 310A that has the form of an open cylinder or a cup. Other examples include a square, rectangle or half sphere. Receptacle 310A has nozzle outlets such as 320A and 320B around the periphery. There are pairs of apertures 330A and 330B and single apertures such as 331; the apertures mate to release holes such as 344 and 346 in the connection ducts 340 and 342. Although drawn as ovals, the apertures also come in other shapes such as a square or circle, and each hole may be a different size, for example, to accommodate different types of fluid viscosities. Pairs of apertures 330A and 330B are part of combination type outlets such as outlet 122 depicted in FIG. 6; or the pair of apertures 330A and 330B serve to channel fluid from two ducts into a single combined outlet such as 320B in FIG. 21. Single apertures 331 correspond to single outlets such as 120A or 120B in FIG. 6; or outlet 320A in FIG. 21. Receptacle 310A is made of plastic or polymer or metallic material and is smoothed or coated so that receptacle 310A can be readily rotated about the interior chamber of the turret 310, either manually or automatically (via electronic control if receptacle 310A is mounted on/as a turntable).

Figure 26:
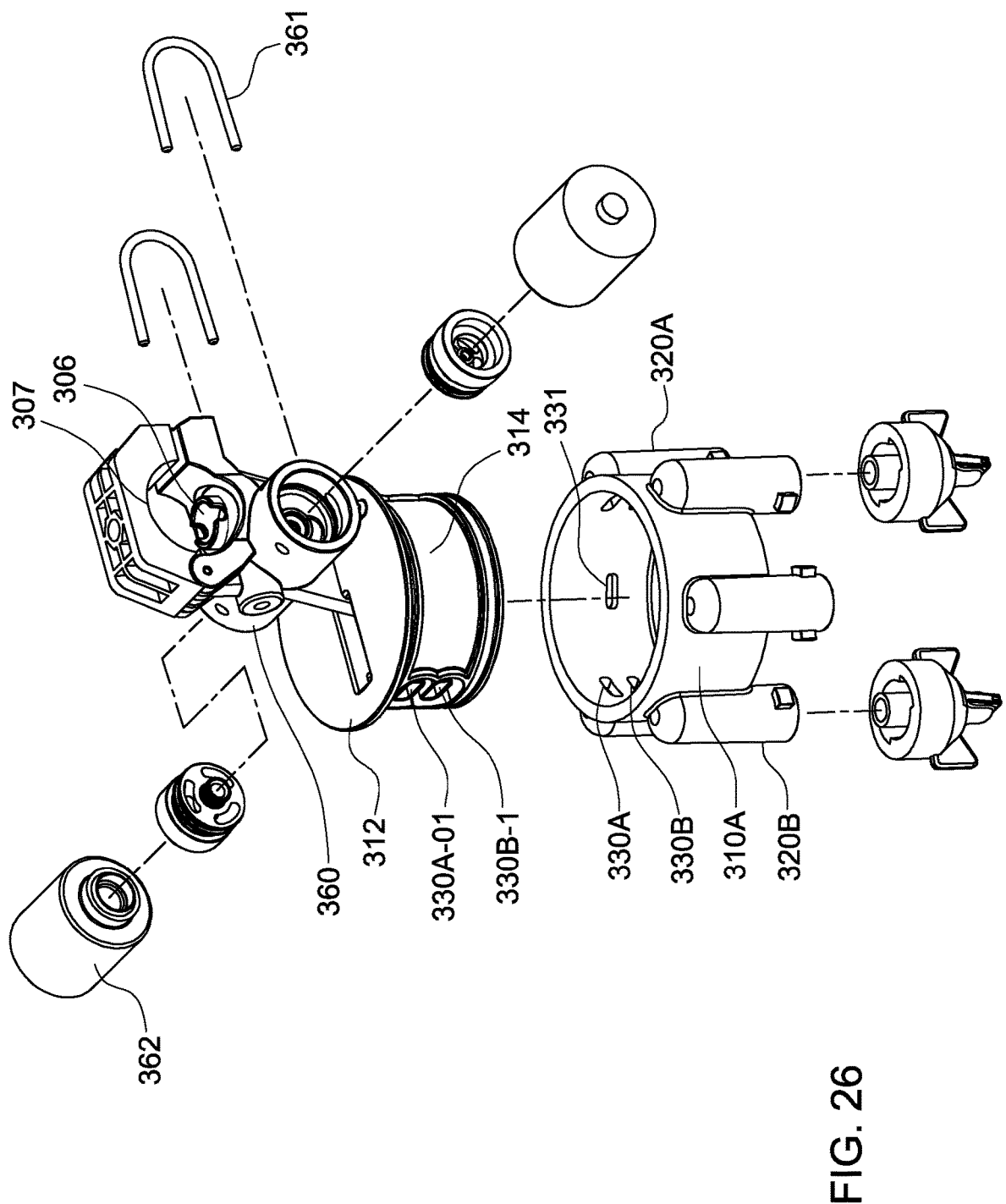
FIG. 26 depicts an exploded view of an example nozzle.

FIG. 26 depicts an exploded view of nozzle 300 having example nozzle tube 360 connected to turret mate 314 that are located above and mates to receptacle 310A when turret mate 314 is inserted into receptacle 310A. Nozzle tube 360 is positioned like a handle to turret mate 314 to manually (or electronically) turn turret mate 314 inside receptacle 310A. Turret mate 314 has a top surface 312 and a cylindrical wall having apertures such as 330A-1 and 330B-1 and single apertures such as 331-1; the apertures form the endpoint (receives fluid from) of release holes such as 344 and 346 in the connection ducts 340 and 342. The turret mate 314 slides into and is rotatable in the turret receptacle 310A; the two objects are coupled to each other through retaining nubs or clips (e.g. like medical bottle caps). The turret mate 314 couples to or rests on the inner topside of the turret receptacle 310A that has two holes 330A and 330B that can be positioned to mate to the openings 344 and 346 of the connection ducts 340 and 342 (and to mate to the apertures 330A-1 and 330B-1; or one of 330A-1 or 330B-1 is closed off if the two are mated to single aperture 331). Single apertures such as 331-1 can mate to the pairs of apertures 330A and 330B or to a single aperture such as 331, when the turret receptacle is rotated to mate with the apertures. Although drawn as ovals, the sets of apertures 330A, 330A-1; 330B, 330B-1; 331, 331-1 also come in other shapes such as a square or circle, and each hole may be a different size, for example, to accommodate different types of fluid viscosities. If turret mate 314 and turret receptacle 310A are operated manually (as opposed to electrically rotated into a desired position) there are external notches, markings and notations to guide a person to rotate the turret receptacle 310A to a desired and locked position. The interior of turret mate 314 includes the electronics and ducts as shown in examples FIGS. 19 and 21. Alternatively, the electronics and ducts are formed or mounted in the receptacle 310A as depicted in FIG. 27.

Figure 27:
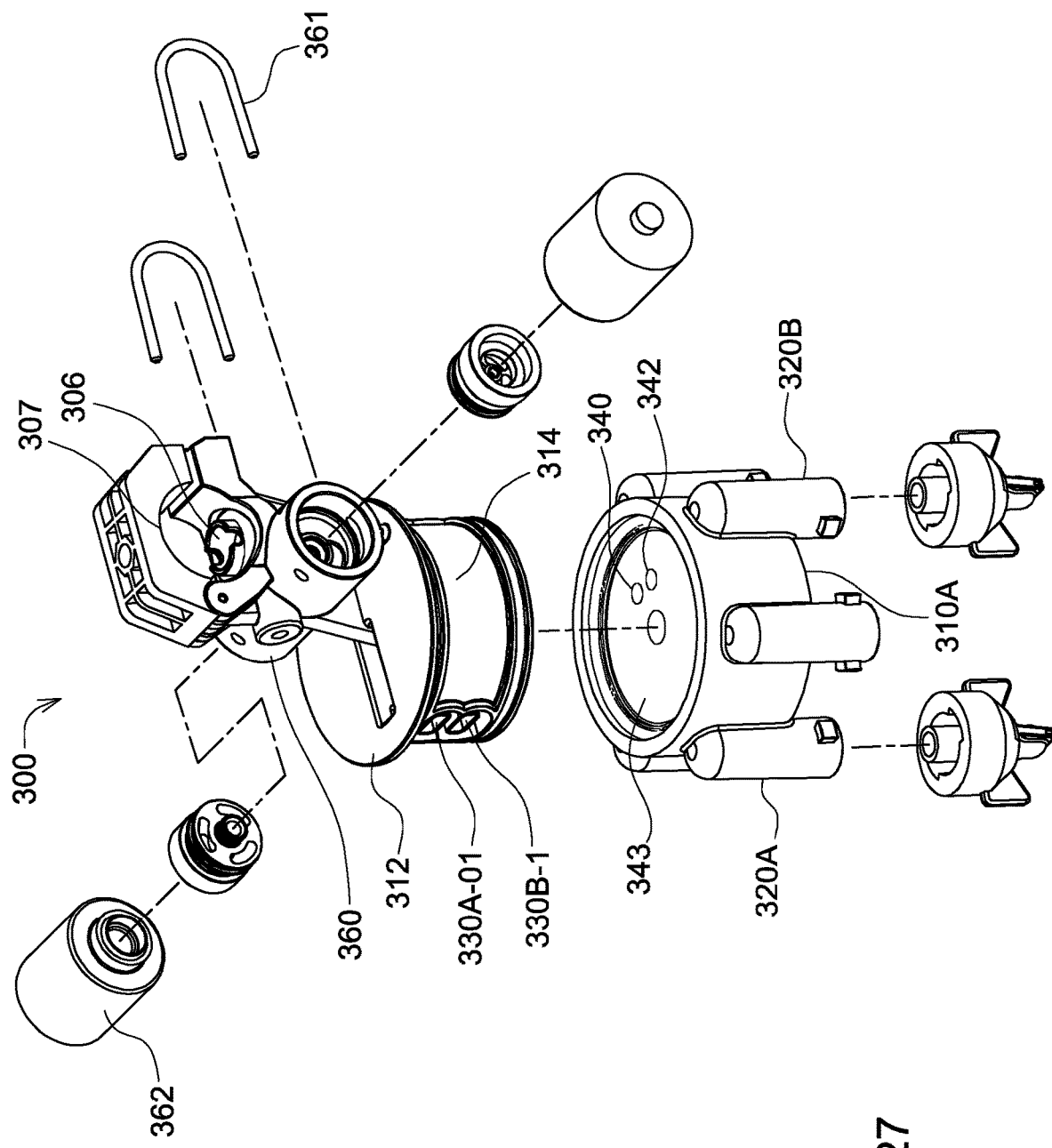
FIG. 27 depicts an exploded view of an example nozzle.

FIG. 27 depicts an exploded view of another nozzle 300 having example nozzle tube 360 that is located above and attached to a turret mate 314; the nozzle tube 360 is mounted like a handle to turret mate 314 to manually (or electronically) turn turret mate 314. Turret mate 314 has a top cover 312 and a cylindrical wall having apertures 330A-1 and 330B-1; the apertures form the endpoints of release holes such as 344 and 346 in the connection ducts 340 and 342. Unlike in FIG. 26, in FIG. 27, the turret mate 314 is now hollow and does not contain ducts or electronics. Rather the ducts and electronics are part of the turret receptacle 310A. The turret mate 314 slides into and is rotatable in the turret receptacle 310A. The cylindrical wall of the turret mate 314 inserts in between the wall of the turret receptacle 310 and the wall of inner cylinder 343, a compartment containing electronics and ducts lying inside or formed inside of the turret receptacle 310A. The turret mate 314 rests on top of the receptacle 310A that has holes (e.g. 330A, 330B and 331; the bottom lip of the cylindrical turret mate 314 rests on the bottom interior surface of the turret receptacle 310 or 310A) that mate to the connection ducts 340 and 342. Alternatively, the cover 312 rests on and overhangs the top lip of turret receptacle 310A. The apertures 330A-1 and 330B-1 and single apertures such as 331-1 optionally mate to the pairs of apertures 330A and 330B and single apertures such as 331, when the turret mate 314 is rotated to mate with the apertures of the turret receptacle 310A or 310.

FIG. 28 depicts a cross sectional view of another example nozzle 300. The half nozzle tubes 360 are protruding above the turret at an angle approximately 50-60 degrees from the horizontal surface of the turret, which makes for a narrower width nozzle body. Each of the nozzle tubes 360 is capped by an actuator or solenoid 362. There is a cavity 161 for the solenoid actuator to move to open or close the valve (e.g. 362A or 362B) that presses against the valve plug 390. On the right side of the diagram, valve plug 390 is uncompressed which allows for the flow of fluid from the inlet into the turret. On the left side of FIG. 28, the valve plug 390 is compressed and no fluid flows.

In an example operation, each nozzle 300 has circuits on PCB 382 to control and monitor its own performance. In a situation such as agricultural vehicles, the cab of the vehicle has a centralized computer operator or there is a remote operator who selects control options on a screen from his computer that are relayed to and translate into commands and data transfer to and from the local nozzle 300 circuits on PCB 382. In the example signals 3, 5 and 7 in FIG. 2A, the local circuits on PCB 382 generate the three signals independently within a time period T. A clock divider generates clock ticks based on the leading edge of the time period T. At the start of period T, signal 3 is generated; at T/3 signal 5 is generated; at 2T/3 signal 7 is generated. For even number of signal pulses within a period T, e.g. the signals 3 and 5 are readily generated independently by triggering off of the leading edge of period T for signal 3 and the trailing edge of T for signal 5. Alternatively, the signals 3, 5 and 7 that control the valves in a nozzle tube are generated sequentially. A pulse edge of T generates signal 3; the trailing edge of signal 3 triggers the generation of signal 5; the trailing edge of signal 5 triggers the generation of signal 7. Regardless whether the signals 3, 5, 7 are generated independently or causally, the time delay between signals and the pulse width of the signals are varying or modulated based on the desired target spray rate or pressure (pressure versus spray rate) for a particular speed of the vehicle and environmental conditions (e.g. wind and terrain).

Figure 29:
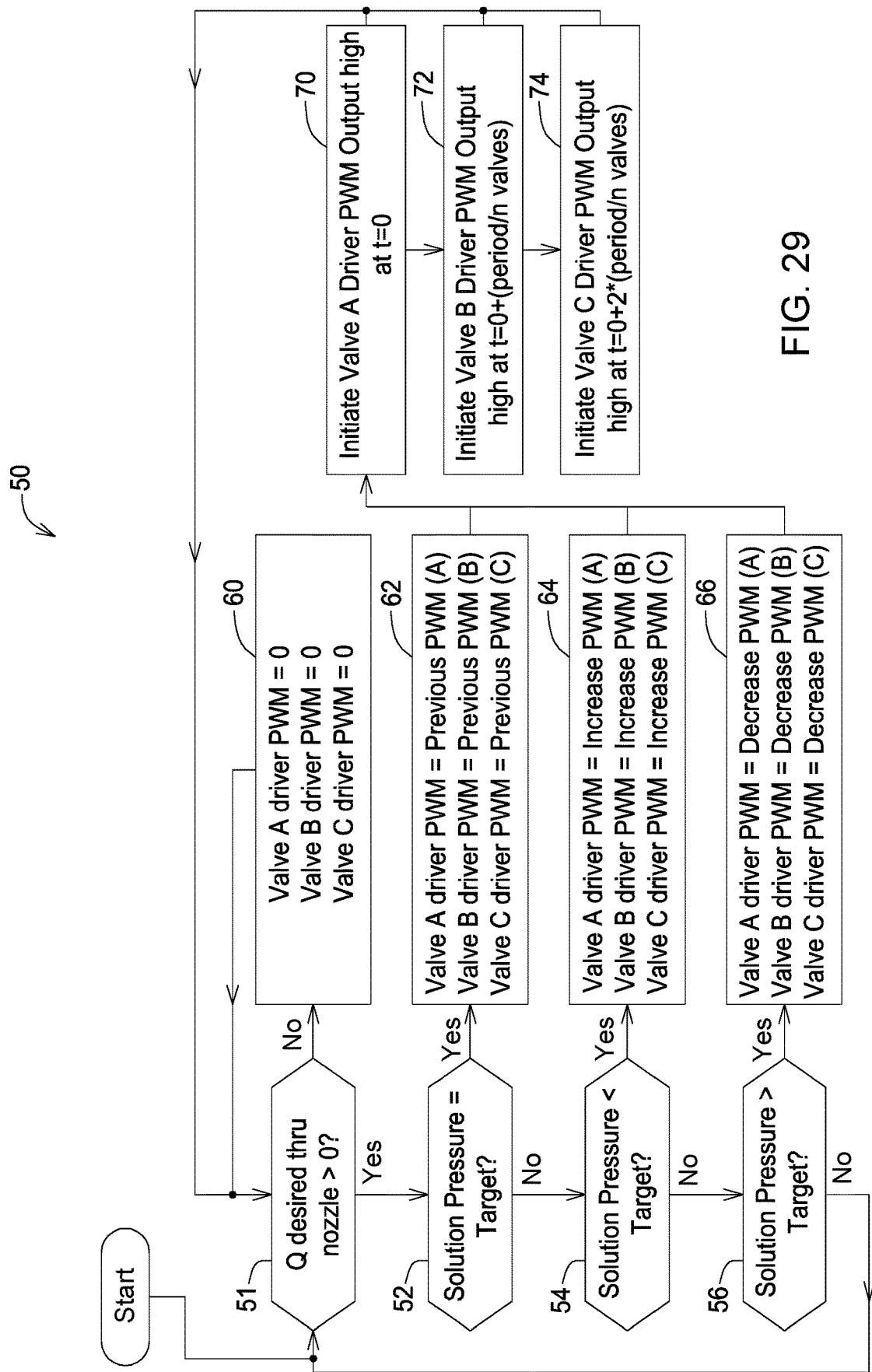
FIG. 29 depicts a flow chart of an example operation of a nozzle with multiple valve-actuators.

Further in operation, the valves in the nozzle bodies (e.g. 100, 200, 4A-4E such as those depicted in FIGS. 1-5) are actuated electronically (or hydraulically or electro-hydraulically). Using the example of three valves (e.g. FIG. 2 or 5), FIG. 29 is a flowchart of instructions for any of the nozzle bodies such as 2B or 2E. The instructions reside in the circuits or microcontrollers local to a nozzle body 2B or 2E or in central controller such as in the cab of a self propelled sprayer. The instructions are not limited to PWM type signals or to valves only, but the microcontroller executes the instructions to process data from sensors such as the speedometer of the vehicle, wind sensors, and pressure transducers in the fluid pipe distribution. The microcontroller checks look-up tables to verify if the spray is operating at a desired flow rate or if the fluid flows at a desired pressure. Then in the example procedure 50 of FIG. 29, in block 51, the microcontroller or other processing circuit verifies whether the nozzle 2E is ON. If it is not ON, the processing circuit continuously sleeps in block 60 and then wakes up to check whether the nozzle 2E has been turned ON. If nozzle 2E is ON, in block 52, the microcontroller checks if the fluid pressure/flow measurement is within range of a desired value (e.g. according to a fertilizer prescription). If the answer is positive in block 52, the electric signals that operate the actuators remain in the same state as before. If the answer is negative, in blocks 54 and 56, the microcontroller checks by computation or by the look-up table, whether the pressure or flow is too high or too low. If the answer is positive in any of the blocks 52 through 56, then in corresponding blocks 62 through 66, the pulse width (duration) of the signal controlling the actuators is adjusted for the valves to stay ON either the same, longer or shorter, respectively, so as to maintain, increase or decrease the fluid, respectively. If the blocks 52 and 54 reach a negative decision, the microcontroller arrives at the last query block 56, whether the fluid pressure is lower than some preset threshold. If the decision in block 56 is also negative, the microcontroller returns to the beginning of the loop to block 52. Due to jitter or electronic noise, it is possible that none of the conditions (less than, more than, equal to) is satisfied in one traverse of the loop. In some embodiments, hysteresis or windowing or averaging is implemented to avoid none of the conditions being satisfied and to avoid a state of constant looping to verify the status of the fluid pressure. After the microcontroller reaches a result and sets the pulse width of the pulses in block 62, 64, or 66, then one of these blocks sends its modulation values to block 70 to initiate the driver circuits to send command signals to valves. The actual command signals to the actuators for the valves are generated in blocks 70, 72 and 74. In FIG. 29, the example flowchart applies to three or n number of valves so that there are three or n number of pulse signals to be buffered to the output driver to a particular valve. In this example, the phase difference between the opening of each of the three or n valves is set symmetrically, e.g. 180 degrees apart for two valves, 120 degrees apart for three valves, 90 degrees apart for four valves and so on. Similarly the phase difference between the closing of each of the n number of valves is same the number of degrees apart. The phase difference is set by calculation as depicted in blocks 70, 72 and 74. Using the example timing diagram of FIG. 2A, the PWM pulse signals driving the valves 30, 32, 34 are delayed with respect to one another (the rising edges of the pulses are delayed and do not coincide in time). Returning to FIG. 29, there are three blocks 70, 72 and 74 because the signals to the valves are generated independently in this example.

Figure 30:
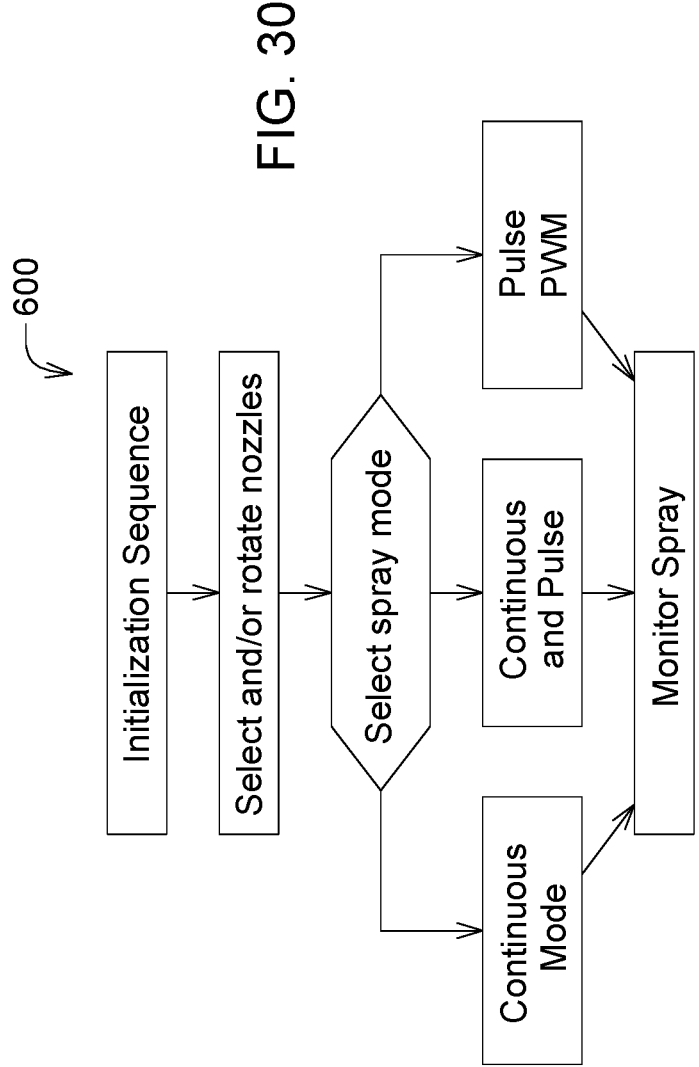
FIG. 30 depicts a flow chart of an example operation of a nozzle under PWM or continuous spray control or both.

FIG. 30 depicts a flowchart for an example operation 600 of a hybrid nozzle system that includes either PWM or continuous spray control. An initialization sequence begins in procedure 602, which includes testing the communication or data collection systems, calibration, sensing external conditions (e.g. wind direction, temperature), and selecting the type of liquid or mixture. Procedure 604 includes selecting the nozzles and nozzle tips that should be operated, setting the amount of overlap among adjacent nozzles or neighboring nozzles (e.g. second adjacent nozzle), rotating and positioning the nozzle (e.g. turret) or spray line, and testing the nozzles response and test spray pattern. Procedure 606 includes selecting the spray mode for the nozzles that are operational. The spray mode includes any of the configurations listed in Table I. Procedure 610 includes a continuous spray mode; procedure 612 includes both a continuous mode of operation for at least one nozzle or nozzle tip and a pulse mode for another nozzle or nozzle tip. Procedure 614 includes a PWM pulse mode of operation for a nozzle, having either one valve or two or more valves pulsing in or out of phase to allow higher flow rates or faster pulsing rates, respectively. Algorithms for any of the procedures 610, 612 or 614 may be programmed into the sprayer controller; for example, a state machine can check the status of the sprayer procedures. For agricultural sprayers, the state machine can also keep track of other issues such as monitoring the terrain, soil and environmental conditions, or position and speed of the vehicle. Finally, in FIG. 30, procedure 616 includes a method to monitor the spray pattern or quality (i.e. droplet size), involving sensors placed on the rear of or trailing behind the spray vehicle. An expected spray pattern or quality can be pre-loaded on the sprayer controller or computing devices. When the detected spray pattern does not match or deviates too much (e.g. by 5 or 6 sigma) from the expected spray pattern or quality, the sprayer controller adjusts the spray rate by changing the duration of the ON spray time (e.g. revise the ON pulse width). Alternatively, the sprayer controller can also stop, raise, lower, tilt, or rotate the spray line based on detected pressure in the spray line and/or based on a detected spray pattern. By providing pressure and detected spray feedback to the sprayer controller, the vehicle can properly respond. Similarly, in an industrial end use, a spray unit can respond to problems such as a clogged nozzle or overspraying.

Figure 33:
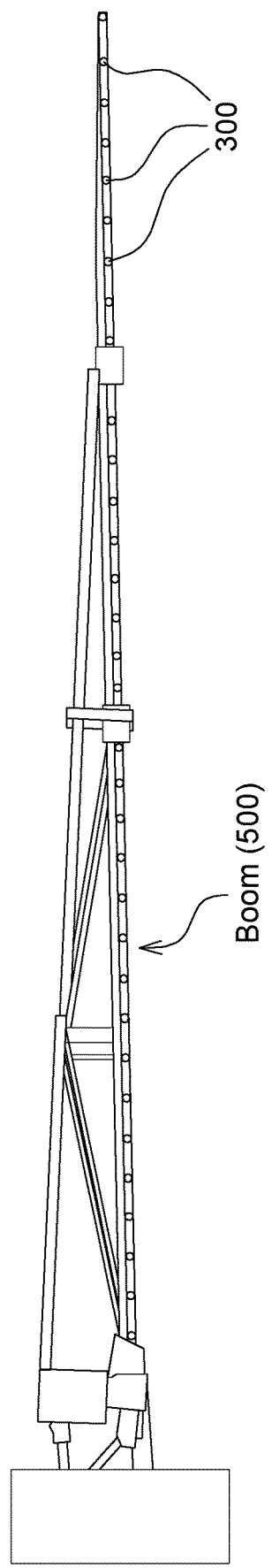
FIG. 33 depicts example nozzles mounted on an example sprayer boom or arm.
Figure 34:
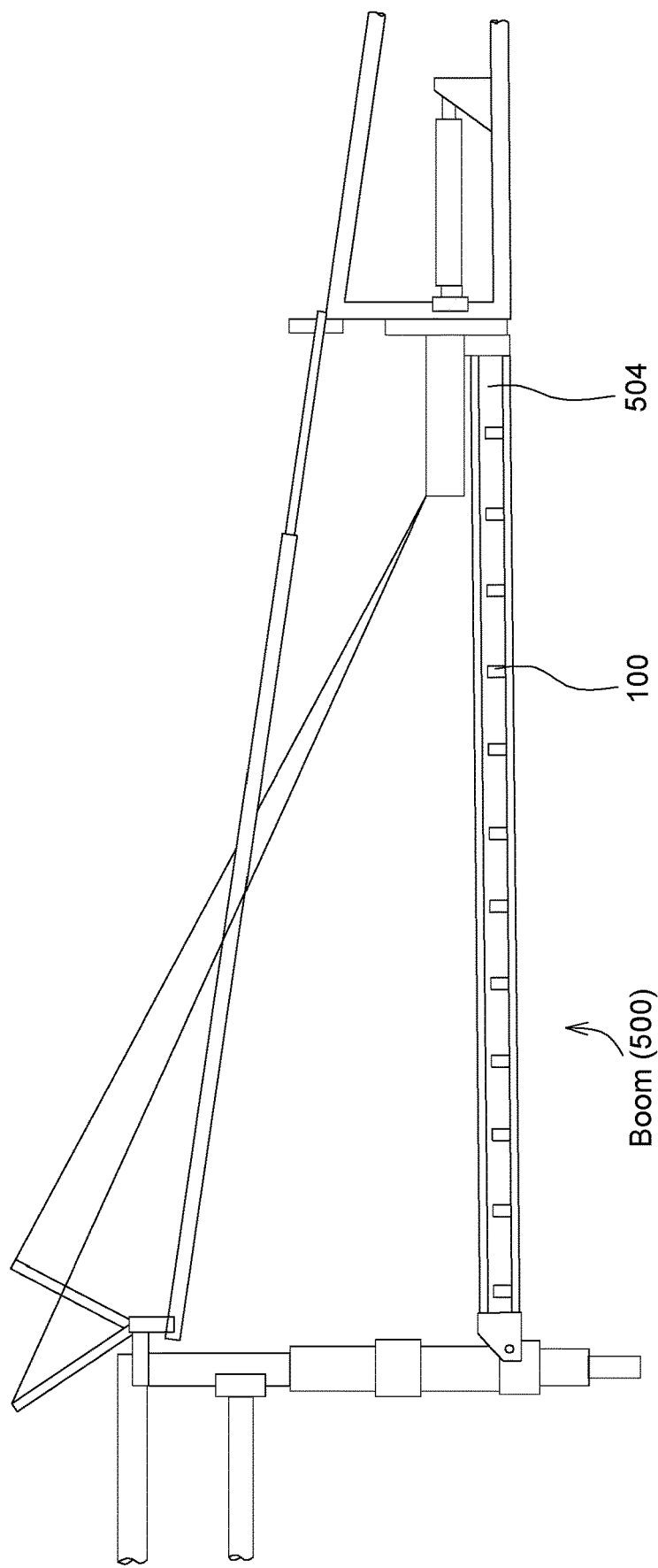
FIG. 34 depicts example nozzles mounted on an example sprayer boom or arm.

After much testing and design revisions, it was found that by including two or more closing (open and close movement) valves to direct the fluid flow from one chamber of a nozzle body (e.g. 4A) to another chamber, along with the use of PWM or continuous flow control (e.g. to increase frequency), the example nozzle bodies 4A then have enough flexibility of operation so as to be compatible with a multitude of boom designs, and either lightweight or heavier boom designs. Examples of booms 500 include those with a truss 520 structure such as shown FIG. 31. Other boom embodiments include a suspension, segmented tube, as shown in FIGS. 33 and 34 that are suspended from a sprayer center frame boom mount, like a suspension bridge with cables emanating from the main (primary) post to the deck beams. Tubular booms without sufficient braces or trusses 520 tend to flex more so that faster spray release such as from nozzle body 4A compensates for any increase in vibration from the boom that disturbs the spray pattern. Alternatively, since nozzle body 4A can release spray faster or slower and is tunable (modulation), its performance can be optimized (tuned) to be more compatible with the motion of the boom. By modulating and having multiple options for the outlets, the dynamic performance of nozzle body 4A covers a wider range of possible performance (e.g. to accommodate a wider range of pressure, flow rate, angle and spray area). For embodiments with lighter weight booms, a sprayer can instead carry more weight in other ways such as through more application material or fluids. For example, a larger tank can be used or a second spray tank is optionally mounted or docked on the spray vehicle to accommodate more spray material. The additional amount of fluids/chemicals sustains a yet faster spray rate or higher flow rate that can be accomplished by the interleaving of PWM signal controlled valves for nozzle bodies 4A.

Figure 31:
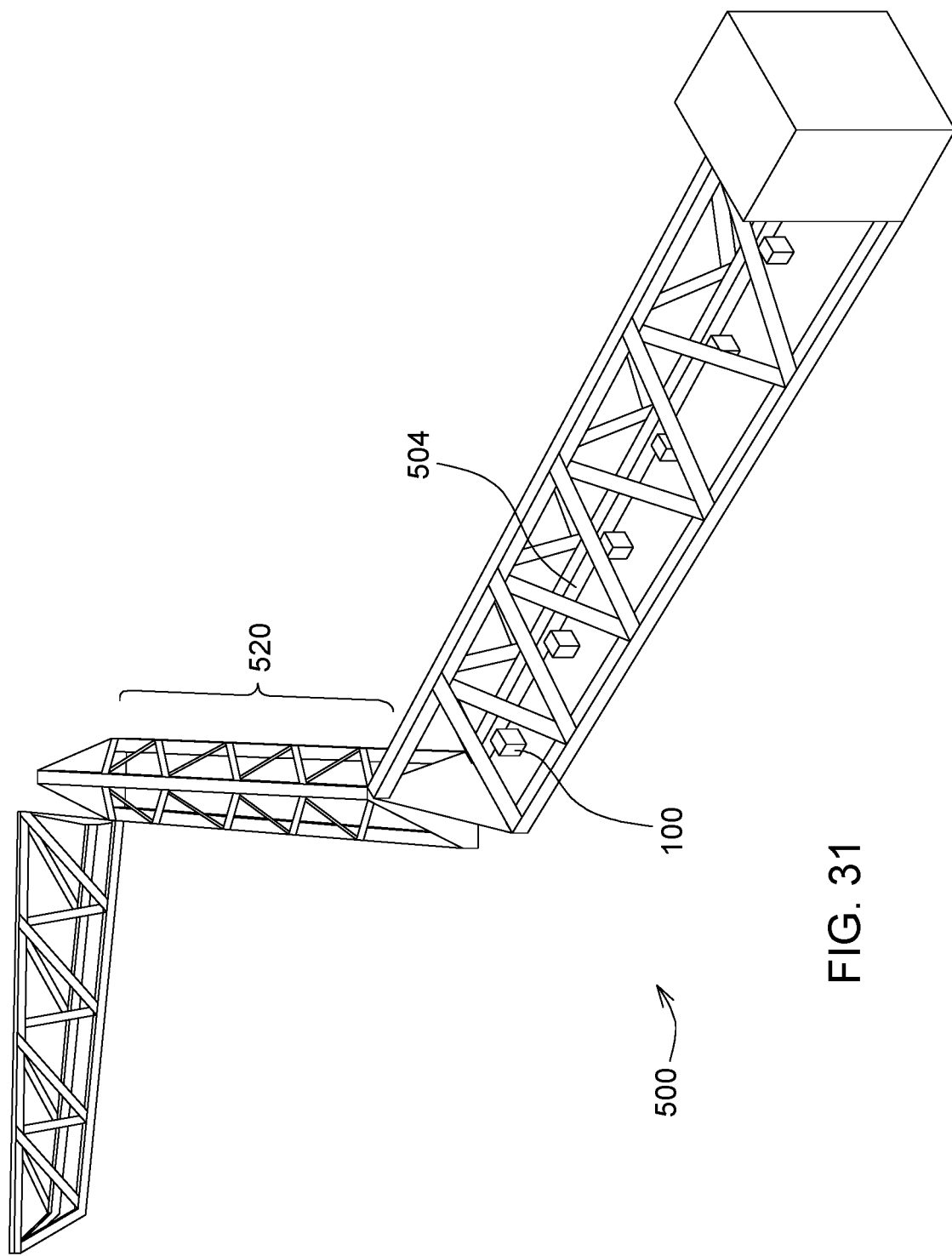
FIG. 31 depicts example nozzles mounted on an example sprayer boom or arm.
Figure 32:
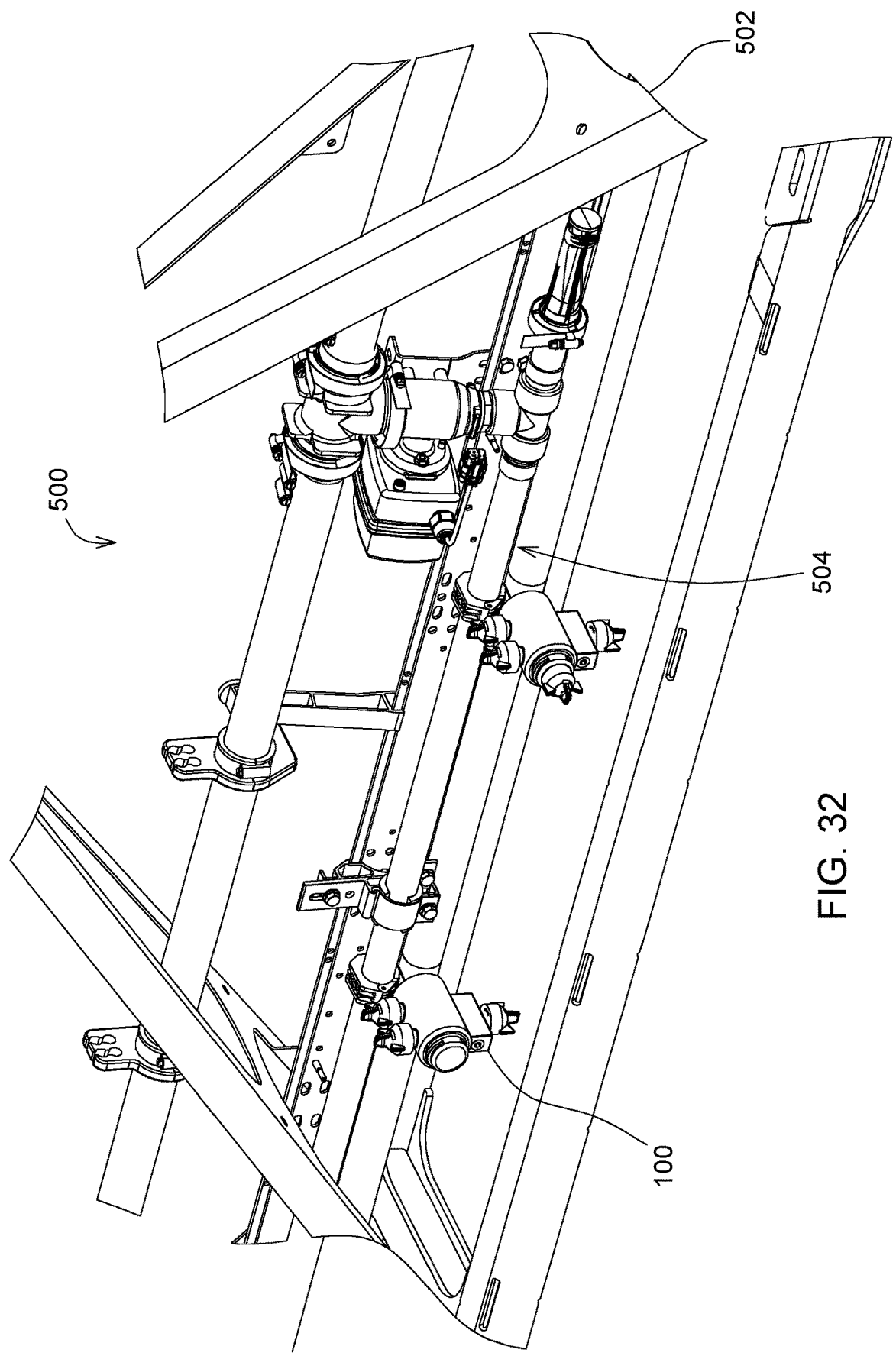
FIG. 32 depicts example nozzles mounted on an example sprayer boom or arm.
Figure 36:
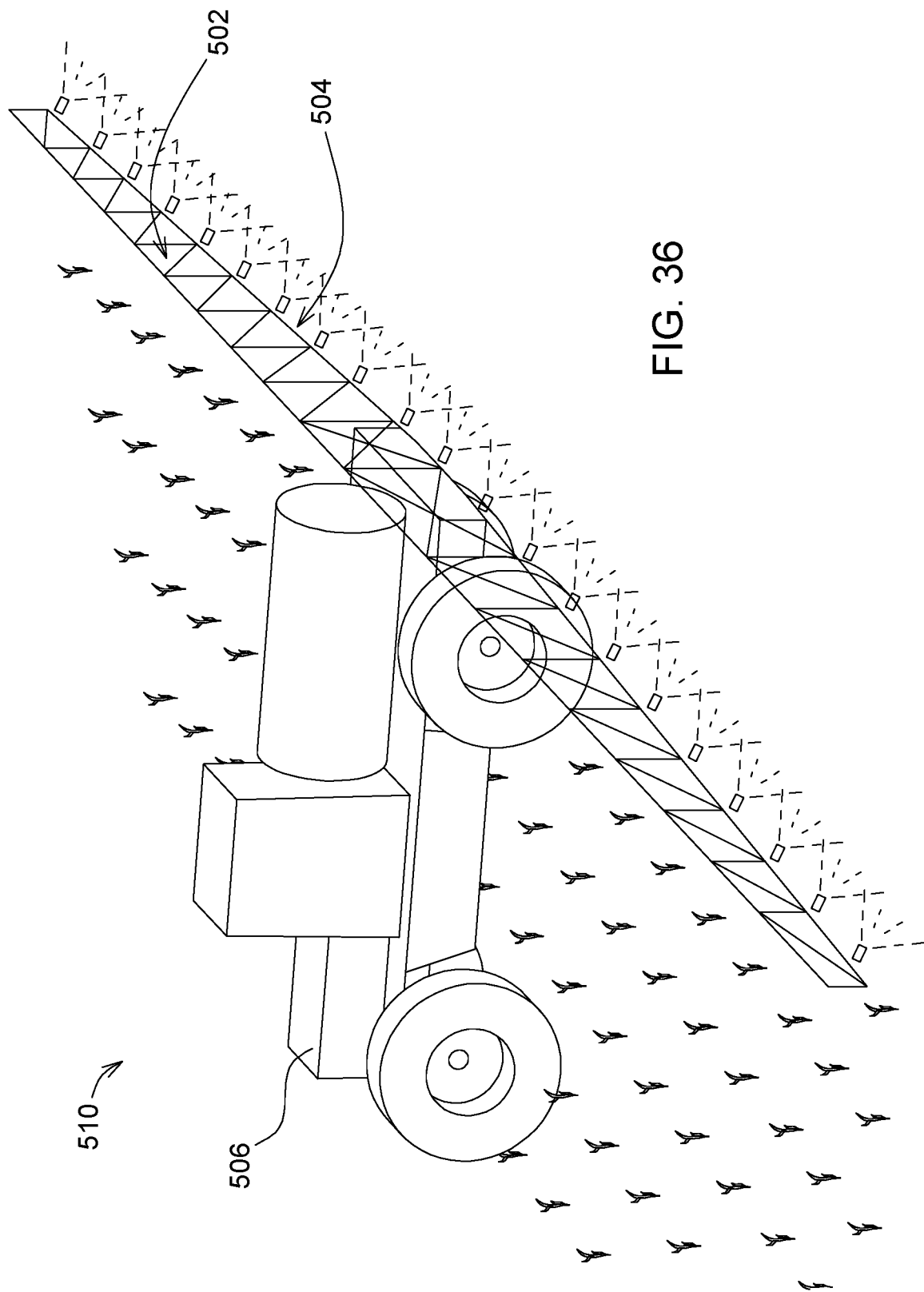
FIG. 36 depicts an agricultural vehicle having a sprayer boom on which the example nozzles are mounted.
Figure 37:
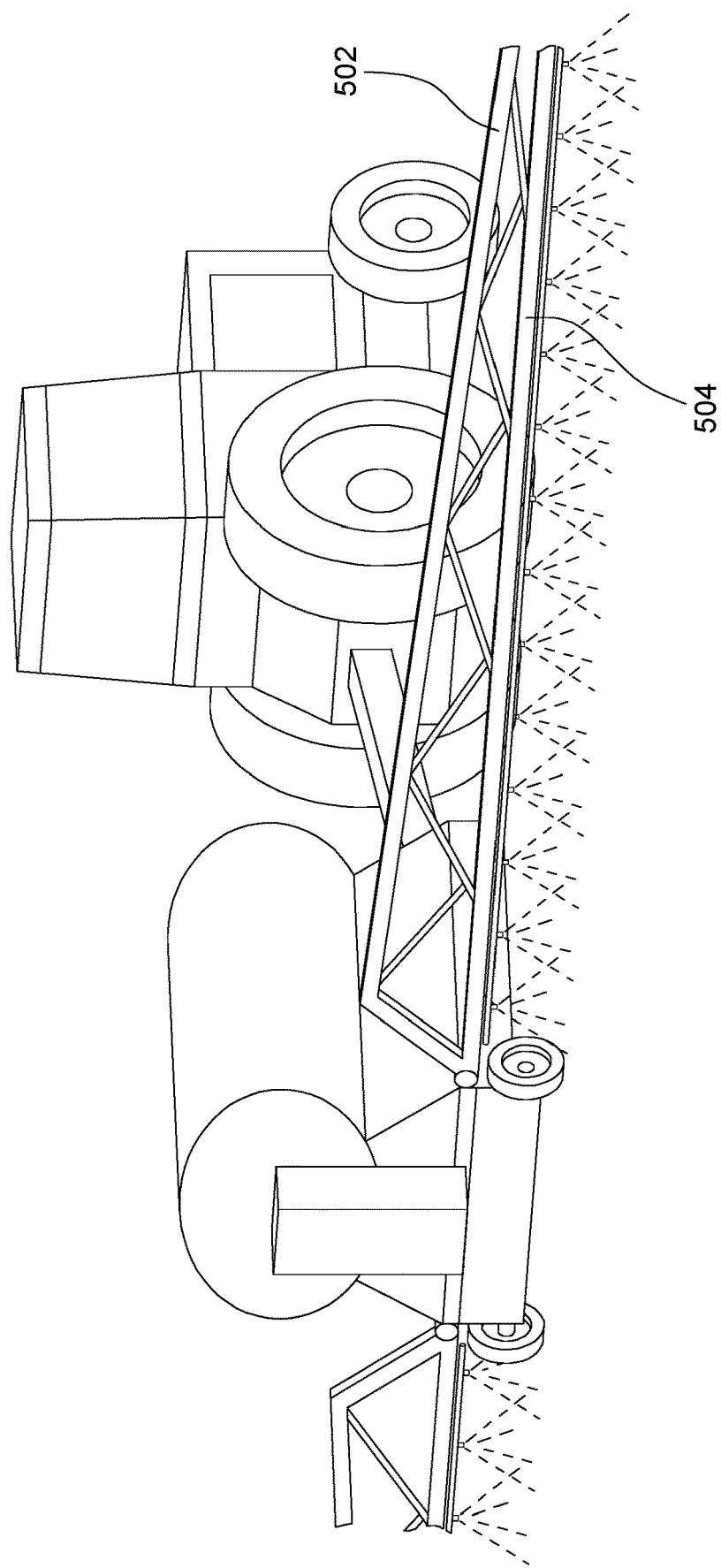
FIG. 37 depicts an agricultural vehicle towing a sprayer boom on which the example nozzles are mounted.
Figure 38:
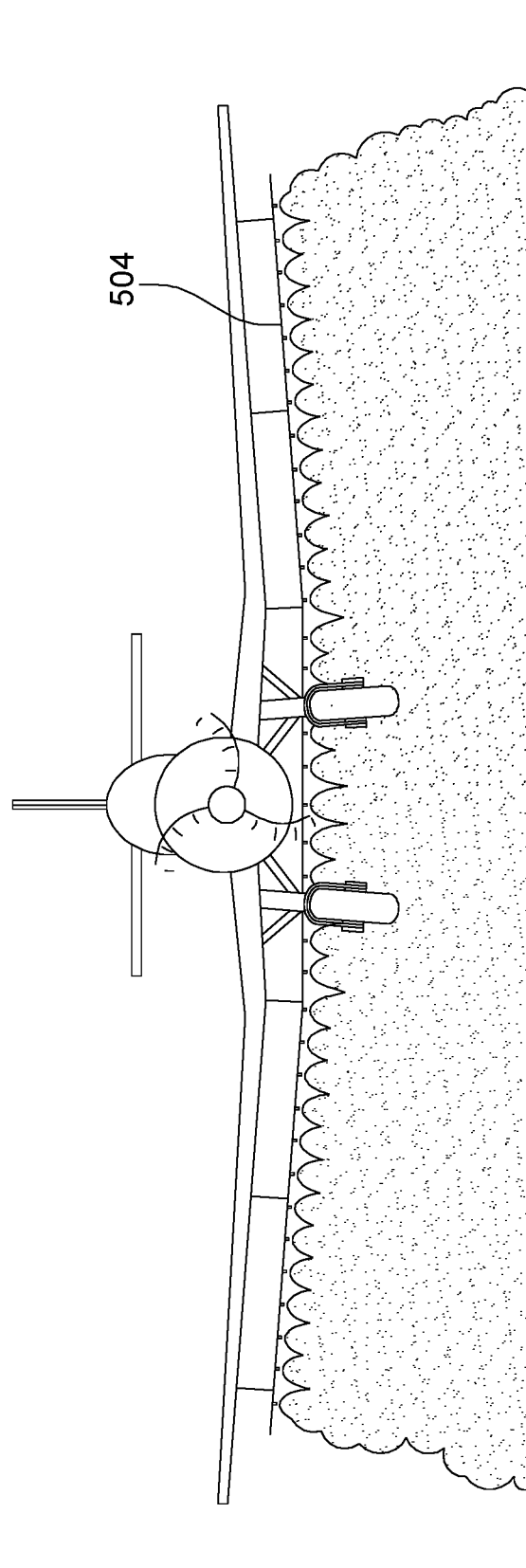
FIG. 38 depicts an air vehicle having an attached frame on which example nozzles are mounted.

FIGS. 31 and 32 depict nozzle bodies (e.g. 4A) mounted on or clamped to a boom assembly 500 that is in turn mounted on a dolly platform, or a vehicle such as a tractor or self propelled sprayer (e.g. FIGS. 36-38). The hosing (not shown) that carries the fluid are mounted externally to or located internally to the boom assembly 500. Alternatively, the vehicle includes an aircraft (e.g. FIG. 38) for aerial spraying or hand-operated or lever-operated knapsack sprayers. Tractor 510 type spraying include low-pressure (e.g. 20-50 psi) sprayers that apply about 5-50 gallons per acre. Other tractors 510 include tractor-mounted spray machinery (e.g. tank, pump or flow regulator driven by a hydraulic motor or compressor. Boom assemblies 500 are mounted in the front, rear or one-or-both sides of the tractor 510. In alternative embodiments, tractor 510 mounted sprayer units are combined with other equipment such as planters, cultivators or tillage implements. Nozzle bodies 4A can be mounted to the ends of a row crop drop that would enable the nozzle bodies 4A to spray lower, nearer to the crops, especially after the crops have just emerged. By contrast, FIG. 36 depicts a high-clearance sprayer tall enough to clear the height of taller crops such as corn. Mounted on either the front or the back of a vehicle, the spray boom assembly 500 is lowered or raised, depending on crop height and application conditions. Alternatively, FIG. 37 depicts a trailer-mounted sprayer attached to a wheeled liquid tank and towed through the field by a tractor or a truck or other utility vehicle. Tank capacity ranges up to 1000 to 1500 gallons; a pump is mounted on tractor 506 and driven by a tractor PTO shaft or other hydraulic motor. For industrial applications, nozzle bodies 4A are mounted to a boom or to individualized fluid pump holder so that there may be only one nozzle. Nozzle body 4A can be used for boomless broadcast spraying for either agricultural or industrial spraying, or even for manually operated or handheld spray systems.

In FIG. 32, the boom assemblies 500 have a "wet" boom or spray line 504 to which a plurality of nozzle bodies (e.g. 4A) are attached; the spray line 504 supplies fluids to each of the nozzle bodies 4A that are spaced apart by 5-20 inches distance, depending on the amount of desired spray overlap. Depending on the size of the boom and fluid pipes, the number of nozzles range from 20 to about 120. In other embodiments, nozzle bodies 4A are attached to a "dry" boom, where hose carry fluids to each nozzle. Like the nozzles, the boom assemblies 500 or their elements such as the spray line are made in a variety of styles (FIGS. 31-34, with or without trusses 520 and different folding mechanisms) and comprise materials such as steel, aluminum, alloys, a composite, carbon fiber, flax fiber, rubber, fiberglass, polymers, plastic, combination of these materials and so on. Rivets and connectors that hold together the boom 500 segments, struts 502, channels, are often metallic but may also be of man-made materials. Rivets and connectors or channels made of heavier material such as alloys and metals are sometimes added also to act as weights to stabilize boom assemblies 500 made of lighter material.

FIGS. 32 and 34 depict example designs for spray pipes 504 that are rigid enough even when expanded to enable uniform spraying and response to a spray controller. In order to adjust the direction of spray, spray pipe 504 is rotatable about one of its longitudinal axis and is mounted on a step rotator or something similar to rotate spray pipe 504 so that nozzle bodies (e.g. 4A) are pointing in different directions relative to the targeted spray objects. Further, the master spray controller can cantilever sections of the spray pipe 504 in order to adjust for slopes in the terrain or for uneven soil. FIG. 32 depicts an example of the spray pipe 504 being strapped or riveted to one of a long metallic beams inside boom 500. The nozzles 100 are located at intervals along the metallic beam. For a tubular, suspension boom 500 such as depicted in FIG. 33, the spray pipe 504 is mounted behind the boom. The spray pipe 504 is attached to the joints of the boom as well as being strapped to sections of the boom 500; the rigid sections of the spray pipe 504 are attached by bolts and hinges; at the joint where the boom 500 folds, the spray pipe 504 is a flexible tube. The nozzle bodies 4A are mounted to the spray pipe 504 at a location ranging from below the center line of the boom 500 to the top of the boom 500. The suspension type booms 500 generally have a diameter that is larger than the size of the nozzles 100 (i.e. larger than the 115-135 mm size of the nozzle) so that the boom 500 should touch the ground before a nozzle body 4A would. At the end of the boom 500, where the breakaway section has tapered boom sections and the diameter of the boom becomes comparable to the size of a nozzle body 4A, the spray pipe 504 is mounted above the centerline of the breakaway section.

Alternatively, the spray pipe 504 is mounted to the joint sections and below the boom 500. The spray pipe 504 is strapped to the boom 500, along sections of the boom 500. To avoid possible damage to the nozzle bodies 4A when the boom 500 gets close to the ground, sections of the boom 500 such as the breakaway has a prop or protrusion at right angles from the boom so that the extension would touch the ground before a nozzle body 4A would. The prop or protrusion folds when the boom folds because there is a tension wire running along the end of the extension that automatically pulls in the protruded piece.

Although this disclosure focuses on macroscopic and large sprayers such as those used in an outdoor field, smaller sprayers and nozzles for industrial manufacturing or even microelectro-mechanical (MEMs) sized sprayers also benefit from these ideas. For instance, industrial uses also include a relative motion between a sprayer and the target object that may be irregular in shape or have sharp edges, thus may also desire rapid changes in the pattern or amount of spray released.

Finally, the orientation and directions stated and illustrated in this disclosure should not be taken as limiting. Many of the orientations stated in this disclosure and claims are with reference to the direction of travel of the equipment. But, the directions, e.g. "behind" can also are merely illustrative and do not orient the embodiments absolutely in space. That is, a structure manufactured on its "side" or "bottom" is merely an arbitrary orientation in space that has no absolute direction. Also, in actual usage, for example, the nozzles and boom equipment may be operated or positioned at an angle because the implements may move in many directions on a hill; and then, "top" is pointing to the "side." Thus, the stated directions in this application may be arbitrary designations.

What is claimed is:

1. A spray apparatus comprising:
a nozzle having a nozzle tube rotatably coupled to a turret, the nozzle tube having a fluid inlet coupled to a first passageway and to a second passageway, wherein the turret is cylindrical having a nozzle output including a combined nozzle output or separate individual nozzle outputs arranged to surround a perimeter of a cylinder arranged within the turret, and wherein the nozzle output point in a direction substantially parallel to a fluid flow of the fluid inlet;
a first valve coaxially aligned with a second valve along a valve axis arranged perpendicular to a longitudinal axis of the turret, wherein the first passageway is opened by the first valve and wherein the second passageway is opened by the second valve; and
a controller operatively coupled to each of the first valve and the second valve and that generates (i) a first control signal to actuate the first valve to open the first passageway at a first duty cycle and (ii) a second control signal to actuate the second valve to open the second passageway at a second duty cycle, wherein:
the controller interleaves the first control signal and the second control signal to form an aggregate pulse train, and
an aggregate duty cycle of the aggregate pulse train is greater than the first duty cycle and the second duty cycle so as to increase a flow rate of the fluid released from the nozzle.

2. A spray apparatus comprising:
a nozzle having a turret rotatably coupled to the nozzle, the nozzle having a fluid inlet coupled to a first passageway and to a second passageway, the turret having a nozzle output including a combined nozzle output or separate individual nozzle outputs arranged around the perimeter of the turret;
a first valve controlling the flow in the first passageway and a second valve controlling the flow in the second passageway, the first and second valves operating to open the first and second passageways respectively to release an amount of fluid corresponding to a first input and second input of the turret; and
a controller operatively coupled to the first and second valves and configured to:
generate a first control signal to operate the first valve at a first frequency;
generate a second control signal to operate the second valve at a second frequency;
interleave the first control signal with the second control signal to generate an aggregate control signal having a frequency that is greater than each of the first frequency and the second frequency to produce a higher flow rate of the fluid released from the nozzle output than either of the first and second passageways.

3. A spray apparatus comprising:
a nozzle having a turret rotatably coupled to the nozzle, the nozzle having a fluid inlet coupled to a first passageway and to a second passageway, the turret having a nozzle output including a combined nozzle output positioned on the perimeter of the turret;
a first valve controlling the flow in the first passageway and a second valve controlling the flow in the second passageway, the first and second valves operating to open the first and second passageways respectively to release an amount of fluid to the nozzle output; and
a controller circuit (i) operatively coupled to the first and second valves (ii) configured to interleave the opening of the first and second valves to produce a higher flow rate of fluid from the nozzle output than in either the first or second passageways.

* * * * *